US011871085B2

(12) United States Patent
Cole et al.

(10) Patent No.: US 11,871,085 B2
(45) Date of Patent: Jan. 9, 2024

(54) METHODS AND APPARATUS FOR DELIVERING CONTENT AND/OR PLAYING BACK CONTENT

(71) Applicant: Nevermind Capital LLC, Wilmington, DE (US)

(72) Inventors: David Cole, Aliso Viejo, CA (US); Alan McKay Moss, Laguna Beach, CA (US)

(73) Assignee: Nevermind Capital LLC, Wilmington, DE (US)

( * ) Notice: Subject to any disclaimer, the term of this patent is extended or adjusted under 35 U.S.C. 154(b) by 0 days.

(21) Appl. No.: 17/658,203

(22) Filed: Apr. 6, 2022

(65) Prior Publication Data

US 2022/0232293 A1    Jul. 21, 2022

Related U.S. Application Data

(63) Continuation of application No. 15/920,164, filed on Mar. 13, 2018, now Pat. No. 11,336,966, which is a (Continued)

(51) Int. Cl.
*H04N 7/18* (2006.01)
*H04N 21/482* (2011.01)
(Continued)

(52) U.S. Cl.
CPC .......... *H04N 21/482* (2013.01); *G06F 3/017* (2013.01); *H04L 65/61* (2022.05); *H04N 13/117* (2018.05);
(Continued)

(58) Field of Classification Search
None
See application file for complete search history.

(56) References Cited

U.S. PATENT DOCUMENTS 6,466,254 B1    10/2002   Furlan
7,694,319 B1     4/2010   Hassell
(Continued)

FOREIGN PATENT DOCUMENTS

CN    102740154 A    10/2012
CN    103533340 A     1/2014
(Continued)

OTHER PUBLICATIONS

Alface, et al., "Interactive Omnidirectional Video Delivery: A Bandwidth-Effective Approach," Bell Labs Technical Journal, vol. 16, No. 4, Mar. 1, 2012, XP055034585, Doi: 10.1002/bltj.20538.
(Continued)

*Primary Examiner* — Carl Adams
(74) *Attorney, Agent, or Firm* — Blank Rome LLP

(57) ABSTRACT

Content delivery and playback methods and apparatus are described. The methods and apparatus are well suited for delivery and playback of content corresponding to a 360 degree environment and can be used to support streaming and/or real time delivery of 3D content corresponding to an event, e.g., while the event is ongoing or after the event is over. Portions of the environment are captured by cameras located at different positions. The content captured from different locations is encoded and made available for delivery. A playback device selects the content to be received based in a user's head position.

16 Claims, 29 Drawing Sheets

Related U.S. Application Data continuation of application No. 14/726,431, filed on May 29, 2015, now Pat. No. 9,918,136.

(60) Provisional application No. 62/004,547, filed on May 29, 2014, provisional application No. 62/167,891, filed on May 28, 2015.

(51) Int. Cl.

| | | |
|---|---|---|
| *H04N 13/117* | (2018.01) | |
| *H04N 13/161* | (2018.01) | |
| *H04N 13/194* | (2018.01) | |
| *H04N 13/243* | (2018.01) | |
| *H04N 13/344* | (2018.01) | |
| *H04N 13/371* | (2018.01) | |
| *H04N 19/597* | (2014.01) | |
| *H04N 19/134* | (2014.01) | |
| *H04N 19/37* | (2014.01) | |
| *H04N 19/146* | (2014.01) | |
| *H04N 19/39* | (2014.01) | |
| *H04L 65/61* | (2022.01) | |
| *G06F 3/01* | (2006.01) | |
| *H04N 19/587* | (2014.01) | |
| *H04N 19/59* | (2014.01) | |

(52) U.S. Cl.
CPC ......... *H04N 13/161* (2018.05); *H04N 13/194* (2018.05); *H04N 13/243* (2018.05); *H04N 13/344* (2018.05); *H04N 13/371* (2018.05); *H04N 19/134* (2014.11); *H04N 19/146* (2014.11); *H04N 19/37* (2014.11); *H04N 19/39* (2014.11); *H04N 19/597* (2014.11); *H04N 19/587* (2014.11); *H04N 19/59* (2014.11)

(56) References Cited

U.S. PATENT DOCUMENTS

| | | | |
|---|---|---|---|
| 8,717,360 B2 | 5/2014 | Vesely | |
| 9,918,136 B2 | 3/2018 | Cole | |
| 2004/0104935 A1 | 6/2004 | Williamson | |
| 2009/0256904 A1 | 10/2009 | Krill | |
| 2010/0223627 A1 | 9/2010 | Sharma | |
| 2010/0257252 A1 | 10/2010 | Dougherty | |
| 2011/0149043 A1 | 6/2011 | Koh | |
| 2011/0164105 A1* | 7/2011 | Lee | H04N 7/142 348/14.02 |
| 2013/0002813 A1 | 1/2013 | Vaught | |
| 2013/0083173 A1* | 4/2013 | Geisner | G02B 27/017 348/51 |
| 2013/0219012 A1 | 8/2013 | Suresh | |
| 2014/0002587 A1 | 1/2014 | Aguren | |
| 2014/0267388 A1 | 9/2014 | Smyth | |
| 2015/0205106 A1 | 7/2015 | Norden | |
| 2015/0346812 A1 | 12/2015 | Cole | |
| 2015/0346832 A1 | 12/2015 | Cole | |

FOREIGN PATENT DOCUMENTS

| | | |
|---|---|---|
| EP | 1162830 A2 | 12/2001 |
| FR | 2988964 A1 | 10/2013 |
| JP | H11027577 A | 1/1999 |
| JP | 2005065051 A | 3/2005 |
| JP | 2009017064 A | 1/2009 |
| JP | 2011027577 A | 2/2011 |
| JP | 2013521743 A | 6/2013 |
| KR | 20120120332 A | 11/2012 |
| WO | 2011109101 A1 | 9/2011 |

OTHER PUBLICATIONS

Grunheit, et al., "Efficient representation and interactive streaming of high-resolution panoramic views," International Conference on Image Processing (ICIP), vol. 1, Jan. 1, 2022, XP055534111, DOI: 10.1109/ICIP.2002.1038942.

Heymann, et al., "Representation, Coding and Interactive Rendering of High-Resolution Panoramic Images and Video Using MPEG-4," Panoramic Photography Workshop, Feb. 28, 2005.

\* cited by examiner

| EVENT NAME | COVERED REGION/ZONE | DATA RATE | MULTICAST GROUP ID | STREAM IDENTIFIER | STREAM DESCRIPTOR | ACCESS INFORMATION |
|---|---|---|---|---|---|---|
| SOCCER | FRONT (270° TO 90°) | D1 | M1 | $S_1D_1$ | $V_1C_1D_1F_1$ | A123 |
| SOCCER | FRONT (270° TO 90°) | D2 | M2 | $S_1D_2$ | $V_1C_2D_2F_2$ | B123 |
| SOCCER | FRONT (270° TO 90°) | D3 | M3 | $S_1D_3$ | $V_1C_3D_3F_3$ | C123 |
| SOCCER | REAR RIGHT (30° TO 210°) | D1 | M4 | $S_2D_1$ | $V_2C_1D_1F_1$ | XX12 |
| SOCCER | REAR RIGHT (30° TO 210°) | D2 | M5 | $S_2D_2$ | $V_2C_2D_2F_2$ | YY12 |
| SOCCER | REAR RIGHT (30° TO 210°) | D3 | M6 | $S_2D_3$ | $V_2C_3D_3F_3$ | ZZ12 |
| SOCCER | REAR LEFT (150° TO 330°) | D1 | M7 | $S_3D_1$ | $V_3C_1D_1F_1$ | AX11 |
| SOCCER | REAR LEFT (150° TO 330°) | D2 | M8 | $S_3D_2$ | $V_3C_2D_2F_2$ | AY11 |
| SOCCER | REAR LEFT (150° TO 330°) | D3 | M9 | $S_3D_3$ | $V_3C_3D_3F_3$ | AZ11 |
| HI | FRONT (270° TO 90°) | D1 | M10 | $S_4D_1$ | $V_1C_1D_1F_1$ | AB12 |
| HI | FRONT (270° TO 90°) | D2 | M11 | $S_4D_2$ | $V_1C_2D_2F_2$ | AC11 |
| ⋮ | ⋮ | ⋮ | ⋮ | ⋮ | ⋮ | ⋮ |
| HI | REAR LEFT (150° TO 330°) | D3 | M18 | $S_6D_3$ | $V_3C_3D_3F_3$ | AZ11 |

LEGEND:
D: DATA RATE
S: STREAM
V: CAMERA VIEWING ANGLE TO WHICH STREAM CORRESPONDS
M: MULTICAST GROUP IDENTITY AND/OR ADDRESS
C: CODEC TYPE
F: FRAME RATE

FIGURE 18

METHODS AND APPARATUS FOR DELIVERING CONTENT AND/OR PLAYING BACK CONTENT

RELATED APPLICATIONS

The present application is a continuation of U.S. patent application Ser. No. 15/920,164, filed Mar. 13, 2018, which is a continuation of U.S. patent application Ser. No. 14/726,431, filed May 9, 2015, which claims the benefit of U.S. Provisional Patent Application Ser. No. 62/004,547, filed May 29, 2014, and U.S. Provisional Patent Application Ser. No. 62/167,891, filed May 28, 2015, each of which is hereby expressly incorporated by reference in its entirety.

FIELD

The present invention relates to the field of adaptive streaming of content, e.g., stereoscopic image content, and more particularly to acquiring, encoding, streaming and decoding video in a manner that facilitates combining with a simulated environment for portions of the environment for which video is not available.

BACKGROUND

Display devices which are intended to provide an immersive experience normally allow a user to turn his head and experience a corresponding change in the scene which is displayed. Head mounted displays sometimes support 360 degree viewing in that a user can turn around while wearing a head mounted display with the scene being displayed changing as the user's head position is changes.

With such devices a user should be presented with a scene that was captured in front of a camera position when looking forward and a scene that was captured behind the camera position when the user turns completely around. While a user may turn his head to the rear, at any given time a user's field of view is normally limited to 120 degrees or less due to the nature of a human's ability to perceive a limited field of view at any given time.

In order to support 360 degrees of view, a 360 degree scene may be captured using multiple cameras with the images being combined to generate the 360 degree scene which is to be made available for viewing.

It should be appreciated that a 360 degree view includes a lot more image data than a simple forward view which is normally captured, encoded for normal television and many other video applications where a user does not have the opportunity to change the viewing angle used to determine the image to be displayed at a particular point in time.

Given transmission constraints, e.g., network data constraints, associated with content being streamed, it may not be possible to stream the full 360 degree view in full high definition video to all customers seeking to receive and interact with the content. This is particularly the case where the content is stereoscopic content including image content intended to correspond to left and right eye views to allow for a 3D viewing effect.

In view of the above discussion it should be appreciated that there is a need for methods and apparatus for supporting streaming and/or playback of content in a manner which allows an individual user to alter his viewing position, e.g., by turning his or her head, and to see the desired portion of the environment. It would be desirable if the user could be provided the option of changing his/her head position and thus viewing direction while staying within data streaming constraints that may apply due to bandwidth or other delivery related constraints. While not necessary for all embodiments, it is desirable that at least some embodiments allow for multiple users at different locations to receive streams at the same time and view whatever distinct portions of the environment they desire irrespective of what portion or portions are being viewed by other users.

SUMMARY

Methods and apparatus for supporting delivery, e.g., streaming, of video or other content corresponding to a 360 degree viewing area are described. The methods and apparatus of the present invention are particularly well suited for streaming of stereoscopic and/or other image content where data transmission constraints may make delivery of 360 degrees of content difficult to deliver at the maximum supported quality level, e.g., using best quality coding and the highest supported frame rate. However, the methods are not limited to stereoscopic content.

In various embodiments a 3D model of and/or 3D dimensional information corresponding to an environment from which video content will be obtained is generated and/or accessed. Camera positions in the environment are documented. Multiple distinct camera positions may be present within the environment. For example, distinct end goal camera positions and one or more mid field camera positions may be supported and used to capture real time camera feeds.

The 3D model and/or other 3D information are stored in a server or the image capture device used to stream video to one or more users.

The 3D model is provided to a user playback device, e.g., a customer premise device, which has image rendering and synthesis capability. The customer premise device generates a 3D representation of the environment which is displayed to a user of the customer premise device, e.g., via a head mounted display.

In various embodiments, less than the full 360 degree environment is streamed to an individual customer premise device at any given time. The customer premise device indicates, based on user input, which camera feed is to be streamed. The user may select the court and/or camera position via an input device which is part of or attached to the customer premise device.

In some embodiments a 180 degree video stream is transmitted to the customer playback device, e.g., a live, real time, or near real time stream, from the server and/or video cameras responsible for streaming the content. The playback device monitors a user's head position and thus the playback device knows viewing area a user of the playback device is viewing within the 3D environment being generated by the playback device. The customer premise device presents video when available for a portion of the 3D environment being viewed with the video content replacing or being displayed as an alternative to the simulated 3D environment which will be presented in the absence of the video content. As a user of the playback device turns his or her head, portions of the environment presented to the user may be from the video content supplied, e.g., streamed, to the playback device with other portions being synthetically generated from the 3D model and/or previously supplied image content which was captured at a different time than the video content.

Thus, the playback device may display video, e.g., supplied via streaming, while a game, music concert or other event is still ongoing corresponding to, for example, a front 180 degree camera view with rear and/or side portions of the 3D environment being generated either fully synthetically or from image content of the side or rear areas of the environment at different times.

While a user may choose between camera positions by signaling a change in position to the server providing the streaming content, the server providing the streaming content may provide information useful to generating the synthetic environment for portions of the 3D environment which are not being streamed.

For example, in some embodiments multiple rear and side views are captured at different times, e.g., prior to streaming a portion of content or from an earlier point in time. The images are buffered in the playback device. The server providing the content can, and in some embodiments does, signal to the playback device which of a set of non-real time scenes or images to be used for synthesis of environmental portions which are not being supplied in the video stream. For example, an image of concert participants sitting and another image of concert participants standing behind a camera position may be supplied to and stored in the playback device. The server may signal which set of stored image data should be used at a particular point in time. Thus, when a crowed is standing the server may signal that the image corresponding to a crowd standing should be used for the background 180 degree view during image synthesis while when a crowd is sitting the server may indicate to the customer premise device that it should use an image or image synthesis information corresponding to a crowd which is sitting when synthesizing side or rear portions of the 3D camera environment.

In at least some embodiments the orientation of the cameras at each of the one or more positions in the 3D environment is tracked during image capture. Markers and/or identifying points in the environment may be used to facilitate alignment and/or other mapping of the captured images, e.g., live images, to the previously modeled and/or mapped 3D environment to be simulated by the customer premise device.

Blending of synthetic environment portions and real (streamed video) provides for an immersive video experience. Environments can and sometimes are measured or modeled using 3d photometry to create the 3D information used to simulate the environment when video is not available, e.g., where the environment was not previously modeled.

Use of fiducial markers in the real world space at determined locations assist with calibration and alignment of the video with the previously generated 3D model.

Positional tracking of each camera is implemented as video is captured. Camera position information relative to the venue, e.g., that maps X, Y, Z and yaw in degrees (so we know where each camera is pointed). This allows for easy detection of what portion of the environment the captured image corresponds to and allows, when communicated to the playback device along with captured video, for the playback to automatically overlay our video capture with the synthetic environment generated by the playback device during image presentation, e.g., playback to the user. The streamed content can be limited to less than a 360 degree view, e.g. a captured 180 degree view of the area in front of the camera position. As the viewer looks around, the viewer will see the simulated background (not a black void) when turned to the rear and the viewer will see the video when turned to the front.

The synthetic environment can be, and in some embodiment is, interactive. In some embodiments, multiple actual viewers, e.g., users of different customer premise devices, are included in the simulated environment so that a user can watch the game with his/her friends in the virtual 3D environment, and it seems that the users are actually at the stadium.

The images of the users may be, and in some embodiments are, captured by cameras included with or attached to the customer premise devices, supplied to the server and provided to the other users, e.g., members of a group, for use in generating the simulated environment. The user images need not be real time images but may be real time images.

The methods can be used to encode and provide content in real time or near real time but are not limited to such real time applications. Given the ability to support real time and near real time encoding and streaming to multiple users, the methods and apparatus described herein are well suited for streaming scenes of sporting events, concerts and/or other venues where individuals like to view an event and observe not only the stage or field but be able to turn and appreciate views of the environment, e.g., stadium or crowd. By supporting 360 degree viewing and 3D the methods and apparatus of the present invention are well suited for use with head mounted displays intended to provide a user a 3D immersive experience with the freedom to turn and observe a scene from different viewing angles as might be the case if the user was present in the environment and the user's head turned to the left, right or rear.

Methods and apparatus for communicating image content, e.g., content corresponding to a 360 degree field of view are described. In various embodiments the field of view corresponds to different portions of an environment, e.g., a front portion, at least one back portion, a top portion and a bottom portion. In some embodiments left and right rear, e.g., back portions) of the environment are generated and/or communicated separately. A playback device monitors the position of a users head and generates images, e.g., stereoscopic images corresponding to the portion of the environment a user is looking at a given time which are then displayed to the user. In the case of stereoscopic playback, separate left and right eye images are generated. The generated images can, and in some embodiments do, corresponding to one or more scene, e.g., environment portions.

At start up of playback, a user's forward looking head level position is set to correspond, as a default, to the forward scene portion. As a user turns his/her head and or raises or lowers his or her head, other portions of the environment may come into the user's field of view.

Bandwidth and image decoding capabilities on many playback devices are limited by the processing capacity of the device and/or the bandwidth for receiving image content. In some embodiments, the playback device determines which portion of the environment corresponds to the user's main field of view. The device then selects that portion to be received at a high rate, e.g., full resolution with the stream being designated, from a priority perspective, as a primary steam. Content from one or more other streams providing content corresponding to other portions of the environment may be received as well, but normally at a lower data rate. Content delivery for a particular stream may be initiated by the playback device, e.g., by sending a signal used to trigger content delivery. The signal may be used to join a multicast group providing content corresponding to a portion of an environment or initiating delivery of a switched digital broadcast. In the case of broadcast content not requiring a request or other signal such as a multicast group join signal, the device may initiate reception by tuning to a channel on which the content is available.

Given that users are normally interested primarily in the forward view portion of the environment since this is where the main action is normally ongoing particularly when the content corresponds to a sporting event, rock concert, fashion show or a number of different events, in some embodiments the forward view portion of the environment is given data transmission priority. In at least some embodiments, images corresponding to the forward viewing position are streamed at a higher rate than one or more other portions of the 360 degree environment. Images corresponding to other portions of the environment are sent at a lower data rate or are sent as static images. For example one or more static images of the top, e.g., sky, and bottom, e.g., ground, may be sent.

In some embodiments multiple static captured images are sent for one or more portions of the environment, e.g., rear view portion(s) or sky portion. In some embodiments control information is sent indicating which one of the static images for a portion of the environment should be used at a given time. In the case where static images for a portion of the environment are sent, they may be sent in encoded form and then stored in memory in decoded form for use in combining with other image content. In this way, decoding resources required during an event can be reduced since multiple streams need not be decoded in parallel at the same frame rate. The static images may be sent prior to streaming the content of the main event. Alternatively a few images may be sent for different portions of the environment and stored in the event they are needed during playback given a change in the user's head position from the forward viewing position. The static or infrequent images may be encoded and sent as part of a content stream providing the content for the primary, e.g., forward, viewing direction or may be sent as a separate content stream.

The static images corresponding to the rear may be, and sometimes are, images captured prior to an event while the content corresponding to the forward portion of the environment may, and in many cases does, include content that is captured and streamed while an event is ongoing, e.g., in real time.

Consider for example a case where two different rear view scenes are communicated and stored in the playback device. One scene may corresponding to a crowd which is an standing position and another image may correspond to a crowd which is in a seated position. The control information may, and in some embodiments does, indicate whether the seating or standing position crowd image is used at a given time should a user turn his/her head to a position where a rear portion of the environment is visible.

Similarly, multiple images of the sky may be communicated to the playback device and stored in the playback device in encoded or decoded form. In some embodiments which image of the sky portion is to be used at a given time is communicated in control information. In other embodiments which scene of the sky is to be used is automatically determined based on the luminance of one or more images corresponding to the forward scene area with a sky portion consistent with or close to the forward environmental scene portion being selected, e.g., a bright forward scene area can be detected and used to control selection of a bright sky image with few clouds. Similarly detection of a dark forward environmental area in some embodiments will result in a dark overcast sky image being used.

In cases where an image for a portion of the environment in a field of view is not available, the scene portion can be synthesized, e.g., from information or content from other portions of the environment which are available. For example, if the rear image portion is not available, the content form the left and/or right sides of the forward scene area may be copied and used to fill in for missing rear portions of the environment. Blurring and/or other image processing operations in addition to content duplication may be used to fill in for missing portions of the environment in some embodiments. Alternatively, in some embodiments drawing information is provided in the content stream and the playback device generates completely synthetic images for the missing portions. As with video game content such content may be realistic in nature and may include a wide variety of image effects and/or content which is generated from drawing and/or other image creation rules stored in the playback device.

An exemplary method of operating a playback system, in accordance with some embodiments includes determining a head position of a viewer, said head position corresponding to a current field of view; receiving a first content steam providing content corresponding to a first portion of an environment; generating one or more output images corresponding to the current field of view based on at least some received content included in said first content stream and i) stored content corresponding to a second portion of said environment or ii) a synthetic image simulating a second portion of said environment; and outputting or displaying a first output image, said first output image being one of the one or more generated output images. An exemplary content playback system, in accordance with some embodiments, includes: a viewer head position determination module configured to determine a head position of a viewer, said head position corresponding to a current field of view; a content stream receive module configured to receive a first content steam providing content corresponding to a first portion of an environment; an output image content stream based generation module configured to generate one or more output images corresponding to the current field of view based on at least some received content included in said first content stream and i) stored content corresponding to a second portion of said environment or ii) a synthetic image simulating a second portion of said environment; and at least one of: an output module configured to output said first output image or a display module configured to display said first output image.

Numerous variations and embodiments are possible and discussed in the detailed description which follows.

BRIEF DESCRIPTION OF THE DRAWINGS

FIG. 14 comprises the combination of FIG. 14A and FIG. 14B.

FIG. 18 illustrates an exemplary table including stream information corresponding to a plurality of content streams.

FIG. 20 comprises the combination of FIG. 20A, FIG. 20B, FIG. 20C, FIG. 20D and FIG. 20E.

DETAILED DESCRIPTION

Figure 1:
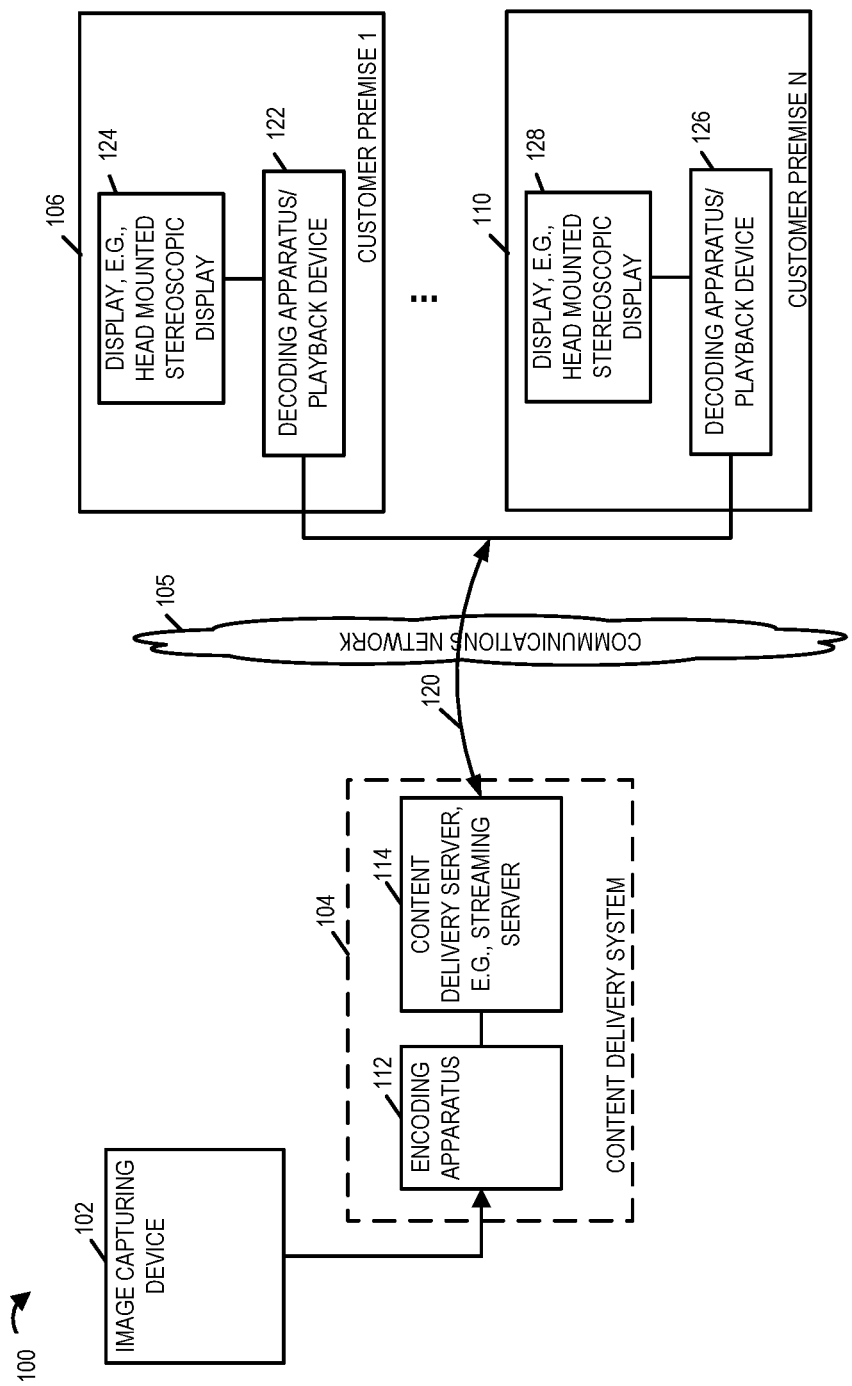
FIG. 1 illustrates an exemplary system implemented in accordance with some embodiments of the invention which can be used to capture and stream content for subsequent display by one or more users along with one or more synthesized portions of an environment.

FIG. 1 illustrates an exemplary system 100 implemented in accordance with some embodiments of the invention. The system 100 supports content delivery, e.g., imaging content delivery, to one or more customer devices, e.g., playback devices/content players, located at customer premises. The system 100 includes the exemplary image capturing device 102, a content delivery system 104, a communications network 105, and a plurality of customer premises 106, . . . , 110. The image capturing device 102 supports capturing of stereoscopic imagery. The image capturing device 102 captures and processes imaging content in accordance with the features of the invention. The communications network 105 may be, e.g., a hybrid fiber-coaxial (HFC) network, satellite network, and/or internet.

The content delivery system 104 includes an encoding apparatus 112 and a content streaming device/server 114. The encoding apparatus 112 may, and in some embodiments does, include one or a plurality of encoders for encoding image data in accordance with the invention. The encoders may be used in parallel to encode different portions of a scene and/or to encode a given portion of a scene to generate encoded versions which have different data rates. Using multiple encoders in parallel can be particularly useful when real time or near real time streaming is to be supported.

The content streaming device 114 is configured to stream, e.g., transmit, encoded content for delivering the encoded image content to one or more customer devices, e.g., over the communications network 105. Via the network 105, the content delivery system 104 can send and/or exchange information with the devices located at the customer premises 106, 110 as represented in the figure by the link 120 traversing the communications network 105.

While the encoding apparatus 112 and content delivery server 114 are shown as separate physical devices in the FIG. 1 example, in some embodiments they are implemented as a single device which encodes and streams content. The encoding process may be a 3D, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premise 106, 110 may include a plurality of devices/players, e.g., playback systems used to decode and playback/display the imaging content streamed by the content streaming device 114. Customer premise 1 106 includes a decoding apparatus/playback device 122 coupled to a display device 124 while customer premise N 110 includes a decoding apparatus/playback device 126 coupled to a display device 128. In some embodiments the display devices 124, 128 are head mounted stereoscopic display devices. In some embodiments the playback device 122/126 and the head mounted device 124/128 together form a playback system.

In various embodiments decoding apparatus 122, 126 present the imaging content on the corresponding display devices 124, 128. The decoding apparatus/players 122, 126 may be devices which are capable of decoding the imaging content received from the content delivery system 104, generate imaging content using the decoded content and rendering the imaging content, e.g., 3D image content, on the display devices 124, 128. Any of the decoding apparatus/playback devices 122, 126 may be used as the decoding apparatus/playback device 800 shown in FIG. 8. A system/playback device such as the one illustrated in FIGS. 8 and 19 can be used as any of the decoding apparatus/playback devices 122, 126.

Figure 2:
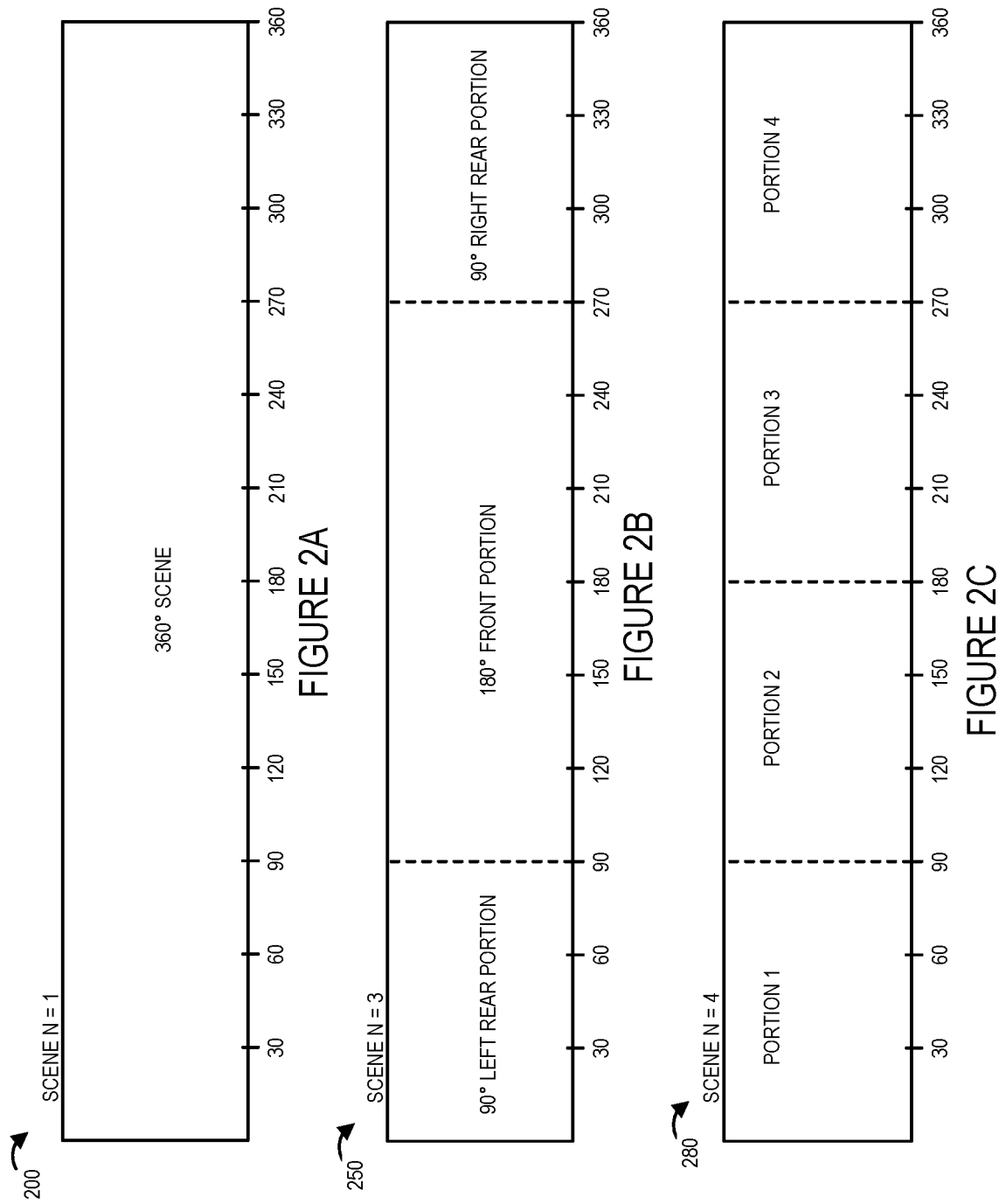
FIG. 2A illustrates an exemplary stereoscopic scene, e.g., a full 360 degree stereoscopic scene which has not been partitioned.
FIG. 2B illustrates an exemplary stereoscopic scene which has been partitioned into 3 exemplary scenes in accordance with one exemplary embodiment.
FIG. 2C illustrates an exemplary stereoscopic scene which has been partitioned into 4 scenes in accordance with one exemplary embodiment.

FIG. 2A illustrates an exemplary stereoscopic scene 200, e.g., a full 360 degree stereoscopic scene which has not been partitioned. The stereoscopic scene may be and normally is the result of combining image data captured from multiple cameras, e.g., video cameras, often mounted on a single video capture platform or camera mount.

FIG. 2B illustrates a partitioned version 250 of the exemplary stereoscopic scene 200 where the scene has been partitioned into 3 (N=3) exemplary portions, e.g., a front 180 degree portion, a left rear 90 degree portion and a right rear 90 degree portion in accordance with one exemplary embodiment.

FIG. 2C illustrates another partitioned version 280 of the exemplary stereoscopic scene 200 which has been partitioned into 4 (N=4) portions in accordance with one exemplary embodiment.

While FIGS. 2B and 2C show two exemplary partitions, it should be appreciated that other partitions are possible. For example the scene 200 may be partitioned into twelve (n=12) 30 degree portions. In one such embodiment, rather than individually encoding each portion, multiple portions are grouped together and encoded as a group. Different groups of portions may be encoded and streamed to the user with the size of each group being the same in terms of total degrees of scene but corresponding to a different portions of an image which may be streamed depending on the user's head position, e.g., viewing angle as measured on the scale of 0 to 360 degrees.

Figure 3:
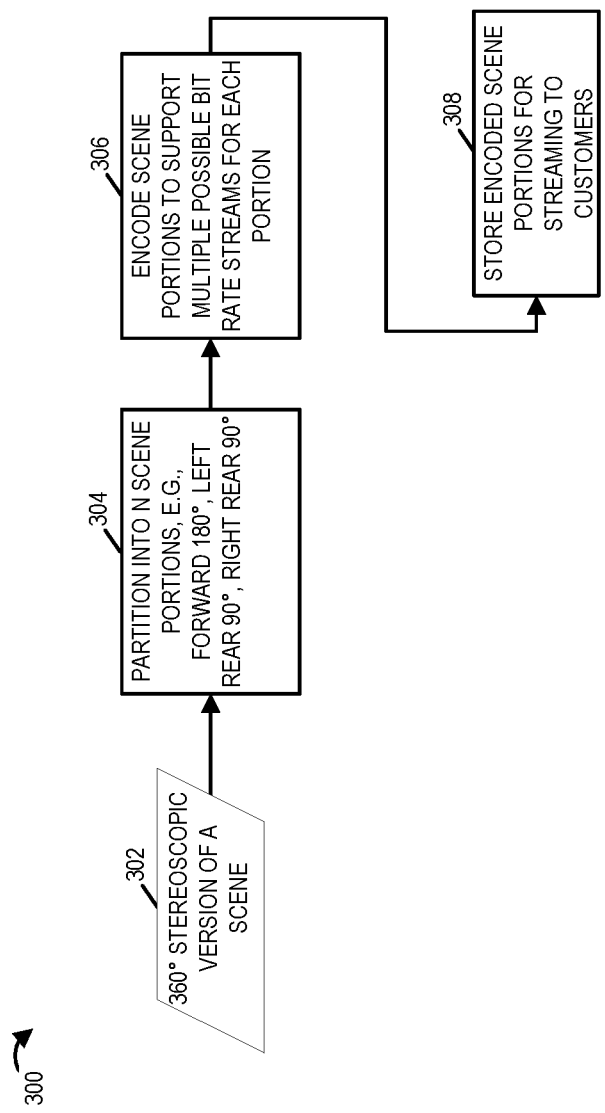
FIG. 3 illustrates an exemplary process of encoding an exemplary 360 degree stereoscopic scene in accordance with one exemplary embodiment.

FIG. 3 illustrates an exemplary process of encoding an exemplary 360 degree stereoscopic scene in accordance with one exemplary embodiment. The input to the method 300 shown in FIG. 3 includes 360 degree stereoscopic image data captured by, e.g., a plurality of cameras arranged to capture a 360 degree view of a scene. The stereoscopic image data, e.g., stereoscopic video, may be in any of a variety of known formats and includes, in most embodiments, left and right eye image data used to allow for a 3D experience. While the methods are particularly well suited for stereoscopic video, the techniques and methods described herein can also be applied to 2D images, e.g., of a 360 degree or small scene area.

In step 304 the scene data 302 is partitioned into data corresponding to different scene areas, e.g., N scene areas corresponding to different viewing directions. For example, in one embodiment such as the one shown in FIG. 2B the 360 degree scene area is portioned into three partitions a left rear portion corresponding to a 90 degree portion, a front 180 degree portion and a right rear 90 degree portion. The different portions may have been captured by different cameras but this is not necessary and in fact the 360 degree scene may be constructed from data captured from multiple cameras before dividing into the N scene areas as shown in FIGS. 2B and 2C.

In step 306 the data corresponding the different scene portions is encoded in accordance with the invention. In some embodiments each scene portion is independently encoded by multiple encoders to support multiple possible bit rate streams for each portion. In step 308 the encoded scene portions are stored, e.g., in the content delivery server 114 of the content delivery system 104, for streaming to the customer playback devices.

Figure 4:
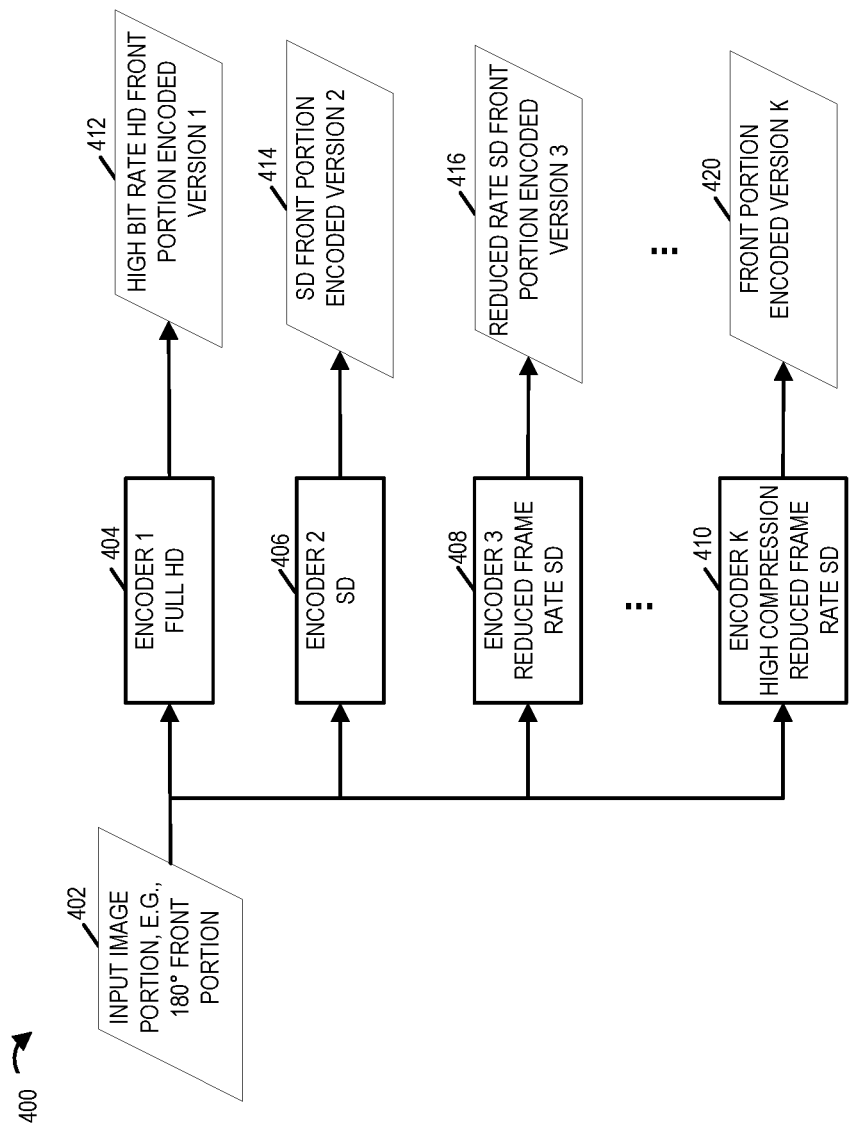
FIG. 4 illustrates an example showing how an input image portion is encoded using a variety of encoders to generate different encoded versions of the same input image portion.

FIG. 4 is a drawing 400 illustrating an example showing how an input image portion, e.g., a 180 degree front portion of a scene, is encoded using a variety of encoders to generate different encoded versions of the same input image portion.

As shown in drawing 400, an input scene portion 402 e.g., a 180 degree front portion of a scene, is supplied to a plurality of encoders for encoding. In the example there are K different encoders which encode input data with different resolutions and using different encoding techniques to generate encoded data to support different data rate streams of image content. The plurality of K encoders include a high definition (HD) encoder 1 404, a standard definition (SD) encoder 2 406, a reduced frame rate SD encoder 3 408, . . . , and a high compression reduced frame rate SD encoder K 410.

The HD encoder 1 404 is configured to perform full high definition (HD) encoding to produce high bit rate HD encoded image 412. The SD encoder 2 406 is configured to perform low resolution standard definition encoding to produce a SD encoded version 2 414 of the input image. The reduced frame rate SD encoder 3 408 is configured to perform reduced frame rate low resolution SD encoding to produce a reduced rate SD encoded version 3 416 of the input image. The reduced frame rate may be, e.g., half of the frame rate used by the SD encoder 2 406 for encoding. The high compression reduced frame rate SD encoder K 410 is configured to perform reduced frame rate low resolution SD encoding with high compression to produce a highly compressed reduced rate SD encoded version K 420 of the input image.

Thus it should be appreciated that control of spatial and/or temporal resolution can be used to produce data streams of different data rates and control of other encoder settings such as the level of data compression may also be used alone or in addition to control of spatial and/or temporal resolution to produce data streams corresponding to a scene portion with one or more desired data rates.

Figure 5:
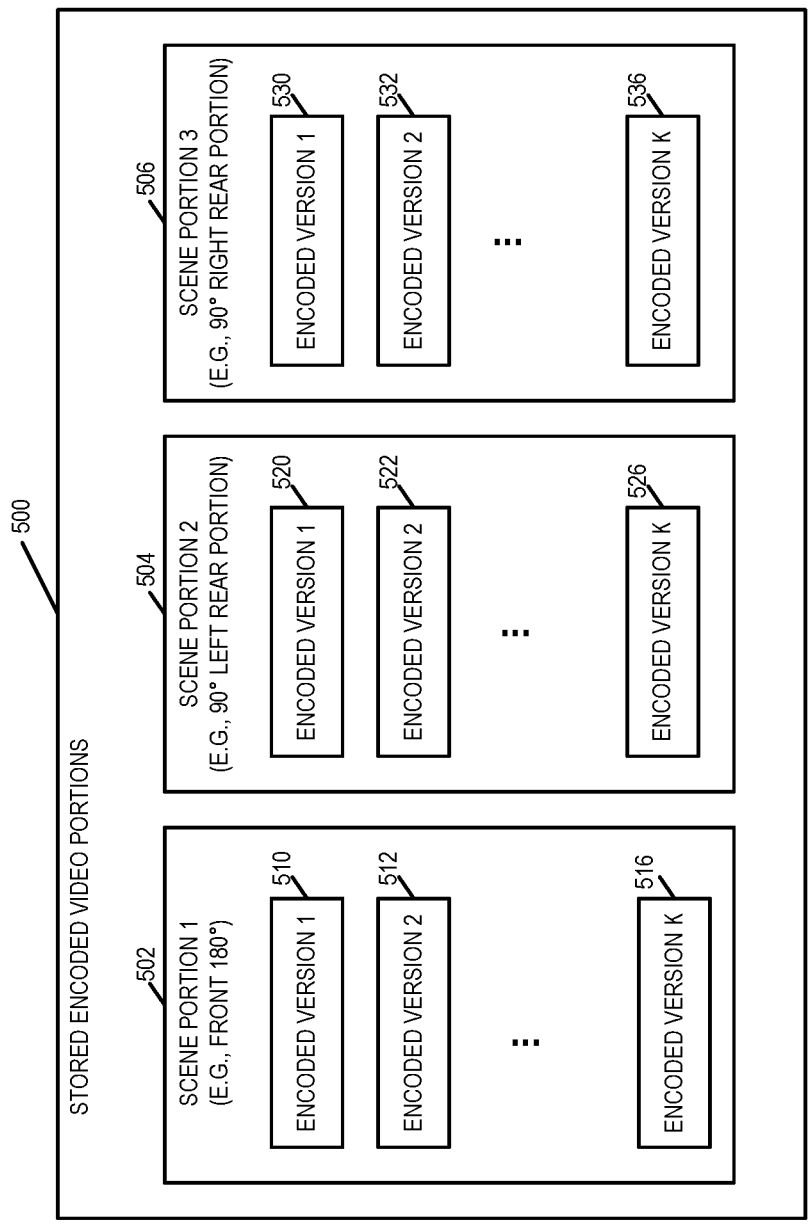
FIG. 5 illustrates stored encoded portions of an input stereoscopic scene that has been partitioned into 3 portions.

FIG. 5 illustrates stored encoded portions 500 of an input stereoscopic scene that has been partitioned into 3 exemplary portions. The stored encoded portions may be stored in the content delivery system 104, e.g., as data/information in the memory. The stored encoded portions 500 of the stereoscopic scene includes 3 different sets of encoded portions, where each portion corresponding to a different scene area and each set including a plurality of different encoded versions of the corresponding scene portion. Each encoded version is a version of encoded video data and thus represents multiple frames which have been coded. It should be appreciated that each encoded version 510, 512, 516 being video corresponds to multiple periods of time and that when streaming, the portion, e.g., frames, corresponding to the period of time being played back will used for transmission purposes.

As illustrated and discussed above with regard to FIG. 4, each scene portion, e.g., front, rear scene portions, may be encoded using a plurality of different encoders to produce K different versions of the same scene portion. The outputs of each encoder corresponding to a given input scene are grouped together as a set and stored. The first set of encoded scene portions 502 corresponds to the front 180 degree scene portion, and includes encoded version 1 510 of the front 180 degree scene, encoded version 2 512 of the front 180 degree scene, ..., and encoded version K 516 of the front 180 degree scene. The second set of encoded scene portions 504 corresponds to the scene portion 2, e.g., 90 degree left rear scene portion, and includes encoded version 1 520 of the 90 degree left rear scene portion, encoded version 2 522 of the 90 degree left rear scene portion, ..., and encoded version K 526 of the 90 degree left rear scene portion. Similarly the third set of encoded scene portions 506 corresponds to the scene portion 3, e.g., 90 degree right rear scene portion, and includes encoded version 1 530 of the 90 degree right rear scene portion, encoded version 2 532 of the 90 degree right rear scene portion, ..., and encoded version K 536 of the 90 degree right rear scene portion.

The various different stored encoded portions of the 360 degree scene can be used to generate various different bit rate streams for sending to the customer playback devices.

Figure 6:
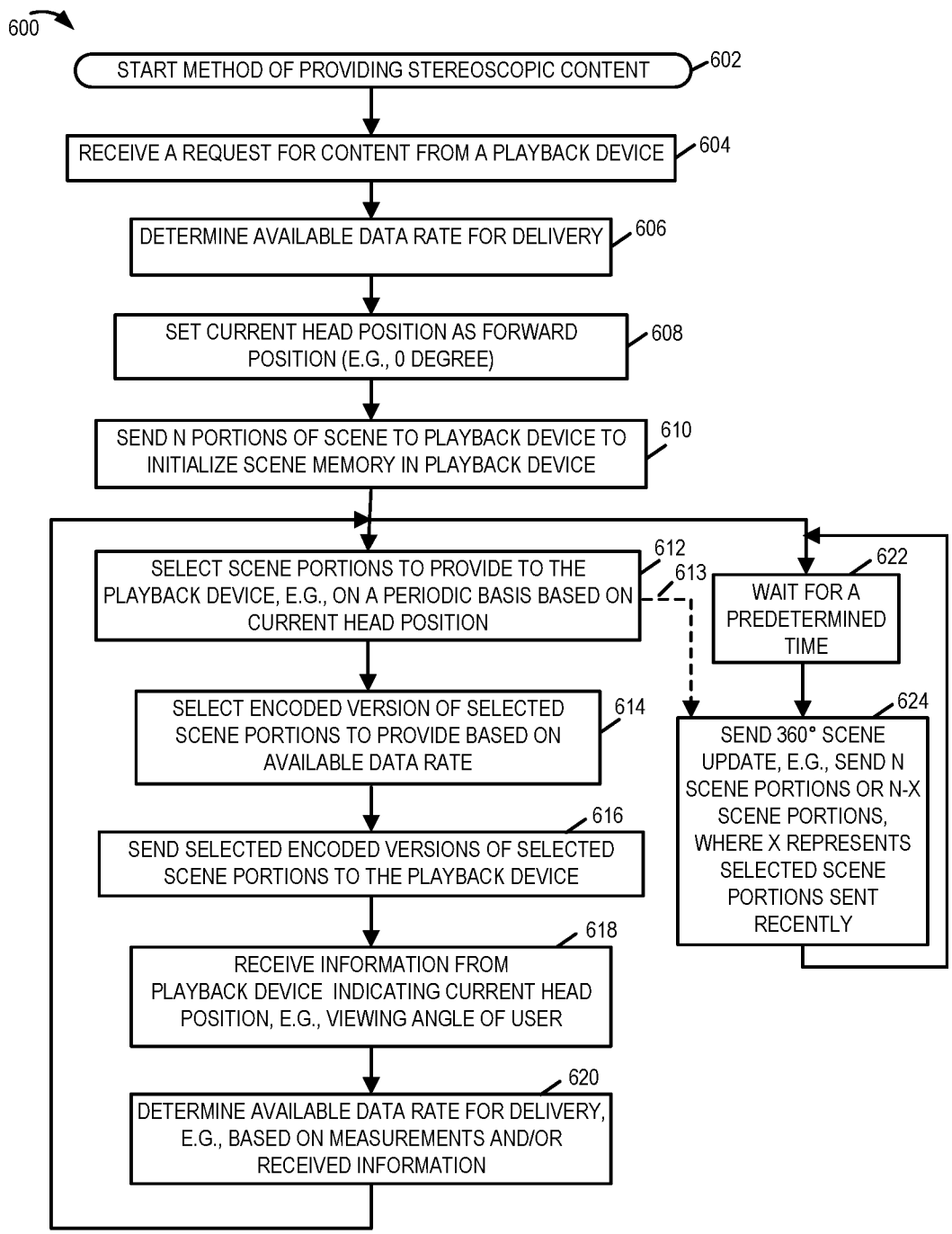
FIG. 6 is a flowchart illustrating the steps of an exemplary method of streaming content in accordance with an exemplary embodiment implemented using the system of FIG. 1.

FIG. 6 is a flowchart 600 illustrating the steps of an exemplary method of providing image content, in accordance with an exemplary embodiment. The method of flowchart 600 is implemented in some embodiments using the capturing system shown in FIG. 1.

The method starts in step 602, e.g., with the delivery system being powered on and initialized. The method proceeds from start step 602 to steps 604. In step 604 the content delivery system 104, e.g., the server 114 within the system 104, receives a request for content, e.g., a request for a previously encoded program or, in some cases, a live event being encoded and steamed in real or near real time, e.g., while the event is still ongoing.

In response to the request, in step 606, the server 114 determines the data rate available for delivery. The data rate may be determined from information included in the request indicating the supported data rates and/or from other information such as network information indicating the maximum bandwidth that is available for delivering content to the requesting device. As should be appreciated the available data rate may vary depending on network loading and may change during the period of time in which content is being streamed. Changes may be reported by the user device or detected from messages or signals indicating that packets are being dropped or delayed beyond a desired amount of time indicating that the network is having difficulty supporting the data rate being used and that the currently available data rate is lower than the original data rate determined to be available for use.

Operation proceeds from step 606 to step 608 where the current head position of the user device from which the request for content is initialized, e.g., the current head position at the time of the request is to be the 0 degree position. The 0 degree or forward looking position may be re-initialized in some embodiments by the user with the playback device signaling that a re-initialization is to occur. Over time the user's head position and/or changes in the user's head position, e.g., relative to the original head position, are reported to the content delivery system 104 and the updated position is used as will be discussed below to make content delivery decisions.

Operation proceeds from step 608 to step 610 in which portions of a 360 degree scene corresponding to the requested content are sent to initialize the playback device. In at least some embodiments the initialization involves sending a full 360 degree set of scene data, e.g., N portions where the 360 degree scene is divided into N portions.

As a result of the initialization in step 610, the playback device will have scene data corresponding to each of the different portions of 360 degree possible viewing area. Accordingly, if the user of the playback device suddenly turns to the rear, at least some data will be available to display to the user even if it is not as up to date as the portion the user was viewing prior to turning his head.

Operation proceeds from step 610 to steps 612 and step 622. Step 622 corresponds to a global scene update path which is used to make sure the playback device receives an updated version of the entire 360 degree scene at least once every global update period. Having been initialized in step 610 the global update process is delayed in wait step 622 for a predetermined period of time. Then in step 624 a 360 degree scene update is performed. The dashed arrow 613 represents the communication of information on which scene portions were communicated to the playback device during the aid period corresponding to step 622. In step 624 an entire 360 degree scene may be transmitted. However, in some embodiments not all portions are transmitted in step 624. Portions of the scene which were updated during the wait period 622 are omitted in some embodiments from the update performed in step 624 since they were already refreshed during the normal streaming processes which sends at least some portions of the scene based on the user's head position.

Operation proceeds from step 624 back to wait step 622 where a wait is performed prior to the next global update. It should be appreciated that by adjusting the wait period used in step 622 different global refresh rates can be supported. In some embodiments, the content server selects a wait period and thus global reference period, based on the type of scene content being provided. In the case of sporting events where the main action is in the forward facing area and one of the reasons for the refresh is possible changes in outdoor lighting conditions, the wait period may be relatively long, e.g., on the order of a minute or minutes. In the case of a rock concert where the action and activity in the crowd may change frequently as different songs are performed the global refresh rate may be, and sometimes is, higher than for sporting events since a user may want to turn and see the crowds reaction and get a feel for what is going on in the crowd in addition to what is going on in the front stage viewing area.

In some embodiments the global reference period is changed as a function of the portion of the presentation being streamed. For example, during a game portion of a sporting event the global refresh rate may be relatively low but during a post touchdown moment or during a time out or intermission where a person at the event or viewing the event via the playback device is more likely to turn his or her head from the forward main area, the global reference rate may, and in some embodiment is, increased by reducing the wait, e.g., refresh period control, used in step 622.

While the global refresh process has been described with reference to steps 622 and 624, the normal supply of portions of scene are described. As should be appreciated the normal refresh of a scene or scene portion will occur for at least one portion, data rate permitting, at the supported video frame rate. Thus, with regard to at least one frame portion, e.g., the portion which his/or her head is indicated to be facing, will be supplied at the full video streaming frame rate assuming the available data rate is sufficient.

In step 612 scene portions are selected to be provided based on the indicated head position, e.g., viewing angle, of the user. The selected portions are transmitted, e.g., streamed, to the playback device, e.g., on a periodic basis. The rate at which the data corresponding to the portions are streamed depends on, in some embodiments, the video frame rate. For example, at least one selected portion will be streamed at the full frame rate being supported. While at least one scene portion is selected in step 612, normally multiple scene portions are selected, e.g., the scene portion which the user is facing as well as the next nearest scene portion. Additional scene portions may also be selected and supplied if the data rate available is sufficient to support communication of multiple frame portions.

After the scene portions to be streamed are selected in step 612, operation proceeds to step 614 wherein the encoded version of the selected stream portions are selected, e.g., based on the available data rate and the viewing position of the user. For example a full rate high resolution version of the scene portion which the user is facing as indicated by the current reported head portion may and normally will be streamed. One more scene portions to the left and/or right of the current head position may be selected to be streamed as a lower resolution, lower temporal rate or using another encoding approach which reduces the amount of bandwidth required to transmit the scene area not currently being viewed. Selection of the encoded version of the adjacent scene portion will depend on the amount of bandwidth reaming after a high quality version of the scene portion currently being viewed is transmitted. While scene portions which are not currently being viewed may be sent as a lower resolution encoded version or as an encoded version with a greater temporal distance between frames, a full resolution high quality version may be sent periodically or frequently if there is sufficient bandwidth available.

In step 616 the selected encoded versions of the selected scene portions are sent to the playback device which requested the content. Thus, in step 616 the encoded content corresponding to one or more portions, e.g., stereoscopic video content corresponding to multiple sequential frames, is streamed to the playback device.

Operation proceeds from step 616 to step 618 in which information indicating a current head position of a user is received. This information may be sent from the playback device periodically and/or in response to detecting a change in head position. In addition to changes in head position, changes in the available data rate may affect what content is streamed. Operation proceeds from step 618 to step 620 in which a determination of the current data rate which can be used for content delivery to the playback device is made. Thus, the content delivery system can detect changes in the amount of bandwidth available to support streaming to the requesting device.

Operation proceeds from step 620 to step 612 with streaming continuing until the content is fully delivered, e.g., the program or event ends, or until a signal is received from the playback device which requested the content indicating that the session is to be terminated or the failure to receive an expected signal from the playback device such as a head position update is detected indicating that the playback device is no longer in communication with the content server 114.

From the scene data delivered in the manner described above, the playback device will have at least some data corresponding to each scene portion available to it to display in the event a user quickly turns his or her head. It should be appreciated that users rarely turn their heads completely around in a very short period of time since this is an uncomfortable change in viewing position for many people. Accordingly, while the full 360 degree scene may not be transmitted at all times, a high quality version of the scene portion(s) most likely to be viewed at any given time may be streamed and made available to the user.

The content delivery system 104 can support a large number of concurrent users since, the encoding process allows the N portions of a scene to be transmitted and processed differently to different users without having to encode the content separately for each individual user. Thus, while a number of parallel encoders may be used to support real time encoding to allow for real or near real time streaming of sports or other events, the number of encoders used tends to be far less than the number of playback devices to which the content is streamed.

While the portions of content are described as portions corresponding to a 360 degree view it should be appreciated that the scenes may, and in some embodiments do, represent a flattened version of a space which also has a vertical dimension. The playback device is able to map the scene portions using a model of the 3D environment, e.g., space, and adjust for vertical viewing positions. Thus, the 360 degrees which are discussed in the present application refer to the head position relative to the horizontal as if a user changed his viewing angle left or right while holding his gaze level.

Figure 7:
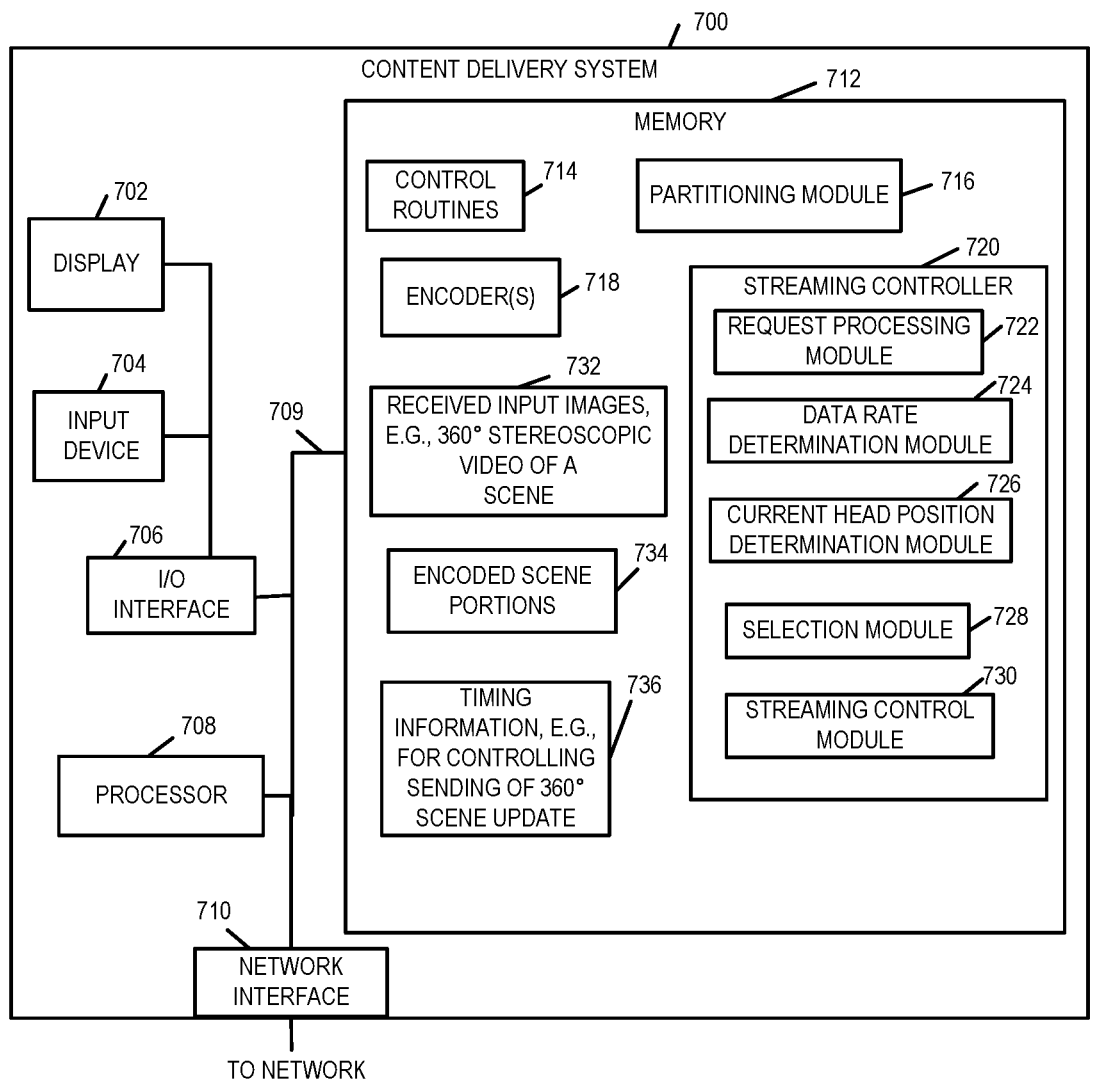
FIG. 7 illustrates an exemplary content delivery system including encoding capability that can be used to encode and stream content in accordance with the features of the invention.

FIG. 7 illustrates an exemplary content delivery system 700 with encoding capability that can be used to encode and stream content in accordance with the features of the invention.

The system may be used to perform encoding, storage, and transmission and/or content output in accordance with the features of the invention. In some embodiments the system 700 or the elements therein perform the operation corresponding to the process illustrated in FIG. 6. The content delivery system 700 may be used as the system 104 of FIG. 1. While the system shown in FIG. 7 is used for encoding, processing and streaming of content, it should be appreciated that the system 700 may also include the ability to decode and display processed and/or encoded image data, e.g., to an operator.

The system 700 includes a display 702, input device 704, input/output (I/O) interface 706, a processor 708, network interface 710 and a memory 712. The various components of the system 700 are coupled together via bus 709 which allows for data to be communicated between the components of the system 700.

The memory 712 includes various modules, e.g., routines, which when executed by the processor 708 control the system 700 to implement the partitioning, encoding, storage, and streaming/transmission and/or output operations in accordance with the invention.

The memory 712 includes various modules, e.g., routines, which when executed by the processor 708 control the computer system 700 to implement the immersive stereoscopic video acquisition, encoding, storage, and transmission and/or output methods in accordance with the invention. The memory 712 includes control routines 714, a partitioning module 716, encoder(s) 718, a streaming controller 720, received input images 732, e.g., 360 degree stereoscopic video of a scene, encoded scene portions 734, and timing information 736. In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

The control routines 714 include device control routines and communications routines to control the operation of the system 700. The partitioning module 716 is configured to partition a received stereoscopic 360 degree version of a scene into N scene portions in accordance with the features of the invention.

The encoder(s) 718 may, and in some embodiments do, include a plurality of encoders configured to encode received image content, e.g., 360 degree version of a scene and/or one or more scene portions in accordance with the features of the invention. In some embodiments encoder(s) include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 718 is the encoded scene portions 734 which are stored in the memory for streaming to customer devices, e.g., playback devices. The encoded content can be streamed to one or multiple different devices via the network interface 710.

The streaming controller 720 is configured to control streaming of encoded content for delivering the encoded image content to one or more customer devices, e.g., over the communications network 105. In various embodiments various steps of the flowchart 600 are implemented by the elements of the streaming controller 720. The streaming controller 720 includes a request processing module 722, a data rate determination module 724, a current head position determination module 726, a selection module 728 and a streaming control module 730. The request processing module 722 is configured to process a received request for imaging content from a customer playback device. The request for content is received in various embodiments via a receiver in the network interface 710. In some embodiments the request for content includes information indicating the identity of requesting playback device. In some embodiments the request for content may include data rate supported by the customer playback device, a current head position of the user, e.g., position of the head mounted display. The request processing module 722 processes the received request and provides retrieved information to other elements of the streaming controller 720 to take further actions. While the request for content may include data rate information and current head position information, in various embodiments the data rate supported by the playback device can be determined from network tests and other network information exchange between the system 700 and the playback device.

The data rate determination module 724 is configured to determine the available data rates that can be used to stream imaging content to customer devices, e.g., since multiple encoded scene portions are supported the content delivery system 700 can support streaming content at multiple data rates to the customer device. The data rate determination module 724 is further configured to determine the data rate supported by a playback device requesting content from system 700. In some embodiments the data rate determination module 724 is configured to determine available data rate for delivery of image content based on network measurements.

The current head position determination module 726 is configured to determine a current viewing angle and/or a current head position of the user, e.g., position of the head mounted display, from information received from the playback device. In some embodiments the playback device periodically sends current head position information to the system 700 where the current head position determination module 726 receives ad processes the information to determine the current viewing angle and/or a current head position.

The selection module 728 is configured to determine which portions of a 360 degree scene to stream to a playback device based on the current viewing angle/head position information of the user. The selection module 728 is further configured to select the encoded versions of the determined scene portions based on available data rate to support streaming of content.

The streaming control module 730 is configured to control streaming of image content, e.g., multiple portions of a 360 degree stereoscopic scene, at various supported data rates in accordance with the features of the invention. In some embodiments the streaming control module 730 is configured to control stream N portions of a 360 degree stereoscopic scene to the playback device requesting content to initialize scene memory in the playback device. In various embodiments the streaming control module 730 is configured to send the selected encoded versions of the determined scene portions periodically, e.g., at a determined rate. In some embodiments the streaming control module 730 is further configured to send 360 degree scene update to the playback device in accordance with a time interval, e.g., once every minute. In some embodiments sending 360 degree scene update includes sending N scene portions or N-X scene portions of the full 360 degree stereoscopic scene, where N is the total number of portions into which the full 360 degree stereoscopic scene has been partitioned and X represents the selected scene portions recently sent to the playback device. In some embodiments the streaming control module 730 waits for a predetermined time after initially sending N scene portions for initialization before sending the 360 degree scene update. In some embodiments the timing information to control sending of the 360 degree scene update is included in the timing information 736. In some embodiments the streaming control module 730 is further configured identify scene portions which have not been transmitted to the playback device during a refresh interval; and transmit an updated version of the identified scene portions which were not transmitted to the playback device during the refresh interval.

In various embodiments the streaming control module 730 is configured communicating at least a sufficient number of the N portions to the playback device on a periodic basis to allow the playback device to fully refresh a 360 degree version of said scene at least once during each refresh period.

Figure 8:
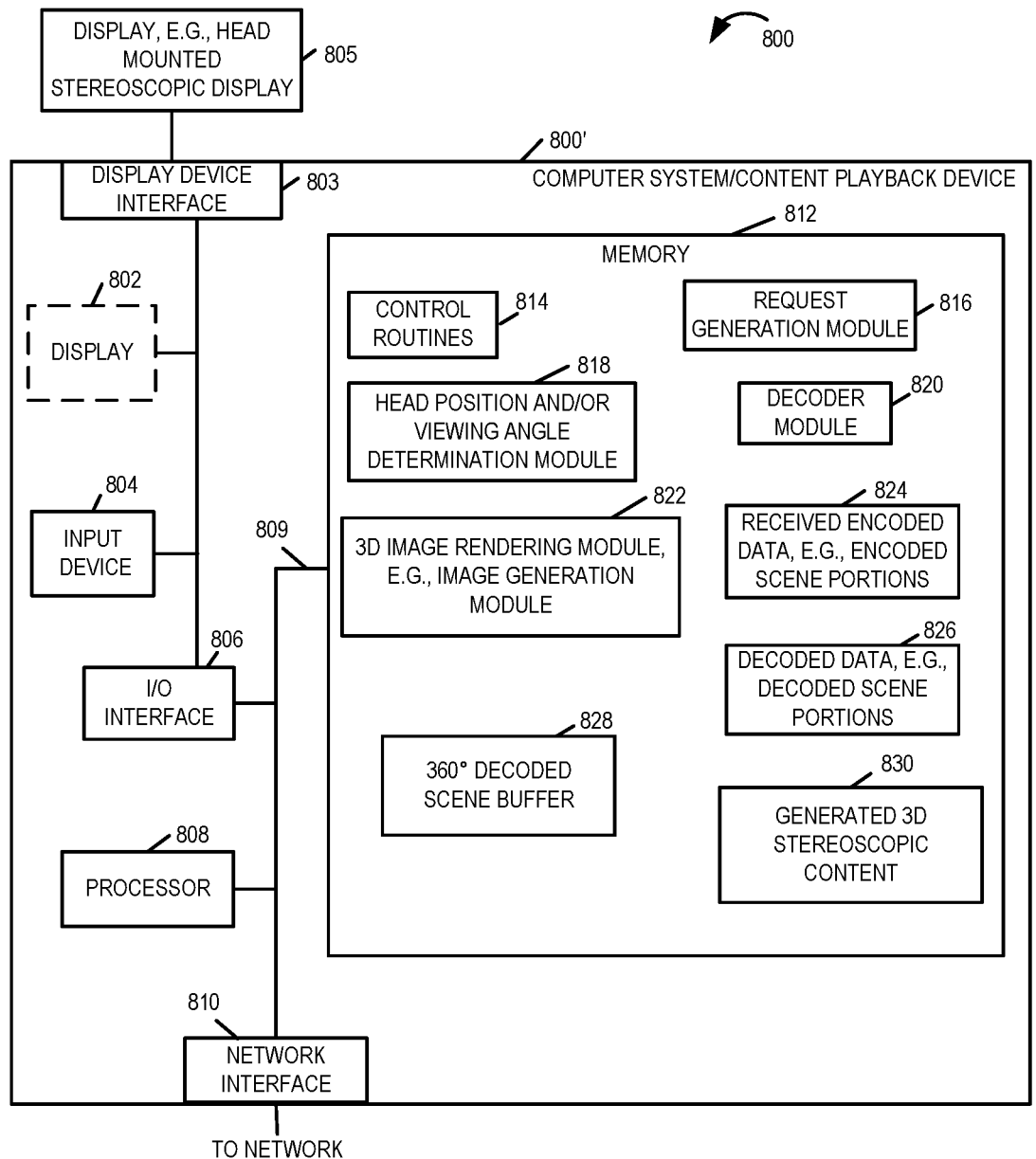
FIG. 8 illustrates an exemplary content playback system that can be used to receive, decode and display the content streamed by the system of FIG. 7.

FIG. 8 illustrates a playback system 800 implemented in accordance with the present invention which can be used to receive, decode, store and display imaging content received from a content delivery system such as the one shown in FIGS. 1 and 7. The system 800 can be implemented is a single playback device 800' which includes a display 802 or as a combination of elements such as an external display, e.g., a head mounted display 805, coupled to a computer system 800'.

The playback system 800, in at least some embodiments includes a 3D head mounted display. The head mounted display maybe implemented using the OCULUS RIFT™ VR (virtual reality) headset which may include the head mounted display 805. Other head mounted displays may also be used. In some embodiments the head mounted helmet or other head mounting device in which one or more display screens are used to display content to a user's left and right eyes. By displaying different images to the left and right eyes on a single screen with the head mount being configured to expose different portions of the single screen to different eyes, a single display can be used to display left and right eye images which will be perceived separately by the viewers left and right eyes. In some embodiments a cell phone screen is used as the display of the head mounted display device. In at least some such embodiments a cell phone is inserted into the head mounting device and the cell phone is used to display images.

The playback system 800 has the ability to decode received encoded image data, e.g., left and right eye images and/or mono (single images) corresponding to different portions of an environment or scene and generate 3D image content for display to the customer, e.g., by rendering and displaying different left and right eye views which are perceived by the user as a 3D image. The playback system 800 in some embodiments is located at a customer premise location such as a home or office but may be located at an image capture site as well. The system 800 can perform signal reception, decoding, display and/or other operations in accordance with the invention.

The system 800 includes a display 802, a display device interface 803, input device 804, input/output (I/O) interface 806, a processor 808, network interface 810 and a memory 812. The various components of the system 800 are coupled together via bus 809 which allows for data to be communicated between the components of the system 800 and/or by other connections or through a wireless interface. While in some embodiments display 802 is included as an optional element as illustrated using the dashed box, in some embodiments an external display device 805, e.g., a head mounted stereoscopic display device, can be coupled to the playback device via the display device interface 803.

For example, in a case where a cell phone processor is used as the processor 808 and the cell phone generates and displays images in a head mount, the system may include as part of the head mount device the processor 808, display 802 and memory 812. The processor 808, display 802 and memory 812 may all be part of the cell phone. In other embodiments of the system 800, the processor 808 may be part of a gaming system such as an XBOX or PS4 with the display 805 being mounted in a head mounting device and coupled to the gaming system. Whether the processor 808 or memory 812 are located in the device which is worn on the head or not is not critical and, as can be appreciated, while in some cases it may be convenient to co-locate the processor in the headgear, from a power, heat and weight perspective it can be desirable, in at least some cases, to have the processor 808 and memory 812 coupled to the head gear which includes the display.

While various embodiments contemplate a head mounted display 805 or 802, the method and apparatus can also be used with non-head mounted displays which can support 3D image. Accordingly, while in many embodiments the system 800 includes a head mounted display, it can also be implemented with a non-head mounted display.

The memory 812 includes various modules, e.g., routines, which when executed by the processor 808 control the playback device 800 to perform decoding and output operations in accordance with the invention. The memory 812 includes control routines 814, a request for content generation module 816, a head position and/or viewing angle determination module 818, a decoder module 820, a stereoscopic image rendering module 822 also referred to as a 3D image generation module, and data/information including received encoded image content 824, decoded image content 826, a 360 degree decoded scene buffer 828, and generated stereoscopic content 830.

The control routines 814 include device control routines and communications routines to control the operation of the device 800. The request generation module 816 is configured to generate a request for content to send to a content delivery system for providing content. The request for content is sent in various embodiments via the network interface 810. The head position and/or viewing angle determination module 818 is configured to determine a current viewing angle and/or a current head position of the user, e.g., position of the head mounted display, and report the determined position and/or viewing angle information to the content delivery system 700. In some embodiments the playback device 800 periodically sends current head position information to the system 700.

The decoder module 820 is configured to decode encoded image content 824 received from the content delivery system 700 to produce decoded image data 826. The decoded image data 826 may include decoded stereoscopic scene and/or decoded scene portions.

The 3D image rendering module 822 generates 3D image, e.g., left and right eye images which are displayed in a manner that will be perceived as a 3D image, in accordance with the features of the invention, e.g., using the decoded image content 826, for display to the user on the display 802 and/or the display device 805. The generated stereoscopic image content 830 is the output of the 3D image generation module 822. Thus the rendering module 822 renders the 3D image content 830 to the display. In some embodiments the display device 805 may be part of a 3D display apparatus such as an Oculus Rift. The operator of the playback device 800 may control one or more parameters via input device 804 and/or select operations to be performed, e.g., select to display 3D scene.

Figure 9:
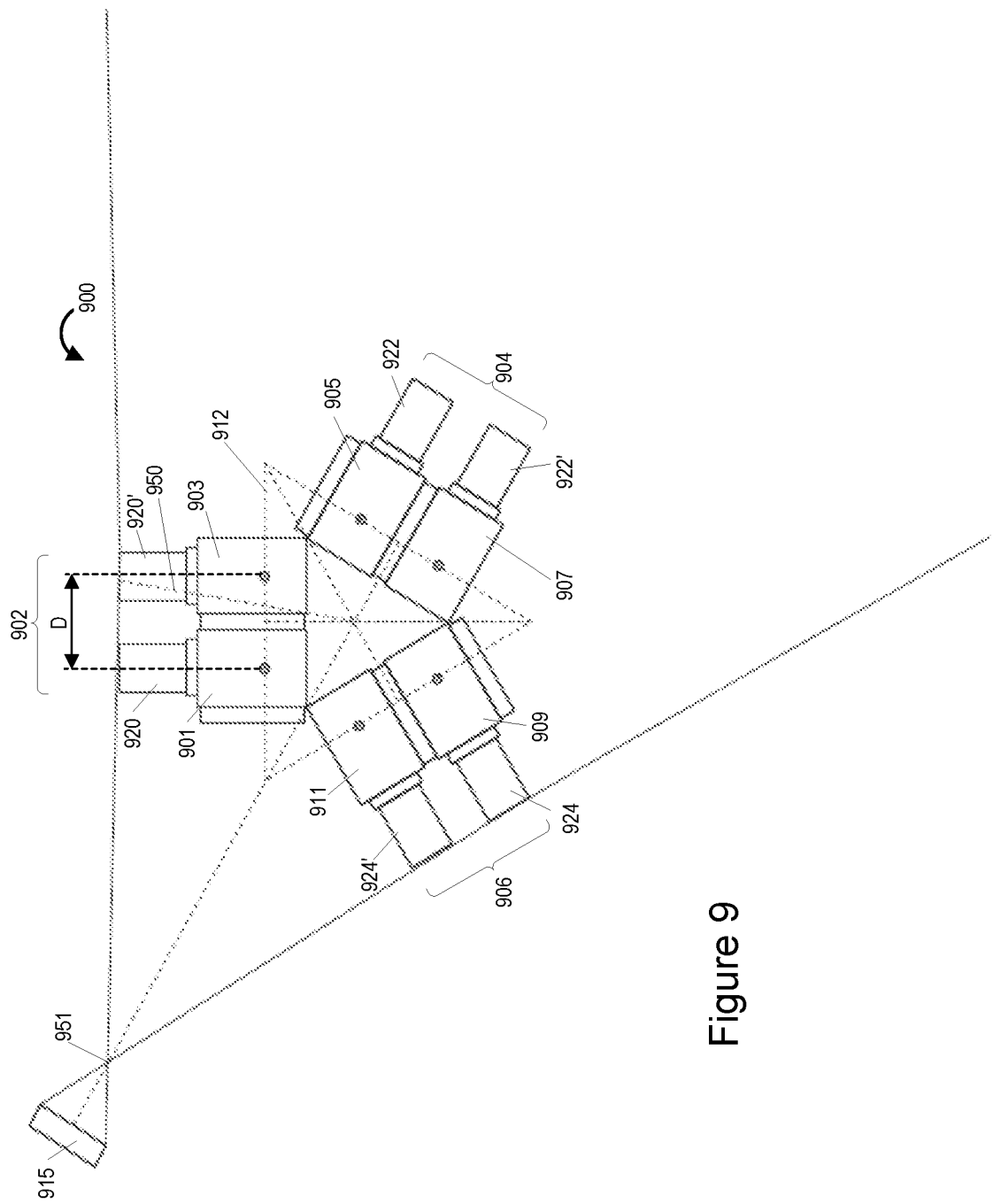
FIG. 9 illustrates a drawing showing an exemplary camera rig with 3 camera pairs mounted in 3 different mounting positions along with a calibration target which may be used to for calibrating the camera rig.

FIG. 9 illustrates a drawing showing an exemplary camera assembly 900, also sometimes referred to as a camera rig or camera array, with 3 camera pairs 902, 904, 906 mounted in 3 different mounting positions and a calibration target 915 which may be used to for calibrating the camera assembly 900. The camera rig 900 is used to capture image content in accordance with some embodiments of the invention. In some embodiments the camera rig 900 is used as the image capture apparatus 102 of FIG. 1. The camera rig 900 includes a support structure (shown in FIG. 11) which holds the cameras in the indicated positions, 3 pairs 902, 904, 906 of stereoscopic cameras (901, 903), (905, 907), (909, 911) for a total of 6 cameras. The support structure includes a base 1120 also referred to herein as a mounting plate (see element 1120 shown in FIG. 11) which supports the cameras and to which plates on which the cameras are mounted can be secured. The support structure maybe made of plastic, metal or a composite material such as graphite or fiberglass, and is represented by the lines forming the triangle which is also used to show the spacing and relationship between the cameras. The center point at which the doted lines intersect represents the center nodal point around which the camera pairs 902, 904, 906 can be rotated in some but not necessarily all embodiments. The center nodal point corresponds in some embodiments to a steel rod or threaded center mount, e.g., of a tripod base, around which a camera support frame 912 represented by the triangular lines can be rotated. The support frame may be a plastic housing in which the cameras are mounted or tripod structure.

In FIG. 9, each pair of cameras 902, 904, 906 corresponds to a different camera pair position. The first camera pair 902 corresponds to a 0 degree forward to front facing position. This position normally corresponds to the main scene area of interest, e.g., a field upon which a sports game is being played, a stage, or some other area where the main action is likely to occur. The second camera pair 904 corresponds to a 120 degree camera position and is used to capture a right rear viewing area. The third camera pair 906 corresponds to a 240 degree position (with respect to 0 degree position) and a left rear viewing area. Note that the three camera positions are 120 degrees apart. Each camera viewing position includes one camera pair in the FIG. 9 embodiment, with each camera pair including a left camera and a right camera which are used to capture images. The left camera captures what are sometimes referred to as a left eye images and the right camera captures what is sometime referred to as right eye images. The images may be part of a view sequence or still image captured at one or more times. Normally at least the front camera position corresponding to camera pair 902 will be populated with high quality video cameras. The other camera positions may be populated with high quality video cameras, lower quality video cameras or a single camera used to capture still or mono images. In some embodiments the second and third camera embodiments are left unpopulated and the support plate on which the cameras are mounted is rotated allowing the first camera pair 902 to capture images corresponding to all three camera positions but at different times. In some such embodiments left and right rear images are captured earlier and stored and then video of the forward camera position is captured during an event. The captured images may be encoded and streamed in real time, e.g. while an event is still ongoing, to one or more playback devices.

The first camera pair shown in FIG. 9 includes a left camera 901 and a right camera 903. The left camera 901 has a first lens assembly 920 secured to the first camera and the right camera 903 has a second lens assembly 920' secured to the right camera 903. The lens assemblies 920, 920' include lenses which allow for a wide angle field of view to be captured. In some embodiments each lens assembly 920, 920' includes a fish eye lens. Thus each of the cameras 902, 903 can capture a 180 degree field of view or approximately 180 degrees. In some embodiments less than 180 degrees is captured but there is still at least some overlap in the images captured from adjacent camera pairs in some embodiments. In the FIG. 9 embodiment a camera pair is located at each of the first (0 degree), second (120 degree), and third (240 degree) camera mounting positions with each pair capturing at least 120 degrees or more of the environment but in many cases with each camera pair capturing 180 degrees or approximately 180 degrees of the environment.

Second 904 and third 906 camera pairs are the same or similar to the first camera pair 902 but located at 120 and 240 degree camera mounting positions with respect to the front 0 degree position. The second camera pair 904 includes a left camera 905 and left lens assembly 922 and a right camera 907 and right camera lens assembly 922'. The third camera pair 906 includes a left camera 909 and left lens assembly 924 and a right camera 911 and right camera lens assembly 924'.

In FIG. 9, D represents the inter-axial distance of the first stereoscopic pair of cameras 901, 903. In the FIG. 9 example D is 117 mm which is the same or similar to the distance between pupils of the left and right eyes of an average human being. Dashed line 950 in FIG. 9 depicts the distance from the panoramic array's center point to the entrance pupil of the right camera lens 920' (aka nodal offset). In one embodiment corresponding to the FIG. 9 example the distance indicated by reference number 950 is 315 mm but other distances are possible.

In one particular embodiment the footprint of the camera rig 900 is relatively small with the horizontal area being 640 mm$^2$ or less. Such a small size allows the camera rig to be placed in an audience, e.g., at a seating position where a fan or attendance might normally be located or positioned. Thus in some embodiments the camera rig is placed in an audience area allowing a viewer to have a sense of being a member of the audience where such an effect is desired. The footprint in some embodiments corresponds to the size of the base to which the support structure including, in some embodiments a center support rod is mounted or support tower is located. As should be appreciated the camera rigs in some embodiments can rotate around the center point of the base which corresponds to the center point between the 3 pairs of cameras. In other embodiments the cameras are fixed and do not rotate around the center of the camera array.

The camera rig is capable of capturing relatively close as well as distinct object. In one particular embodiment the minimum imaging distance of the camera array is 649 mm but other distances are possible and this distance is in no way critical.

The distance from the center of the camera assembly to the intersection point 951 of the views of the first and third camera parts represents an exemplary calibration distance which can be used for calibrating images captured by the first and second camera pairs. Note that target 915 may be placed at a known distance from the camera pairs located at or slightly beyond the area of maximum distortion. The calibration target include a known fixed calibration pattern. The calibration target can be and is used for calibrating the size of images captured by cameras of the camera pairs. Such calibration is possible since the size and position of the calibration target is known relative to the cameras capturing the image of the calibration target 915.

Figure 10:
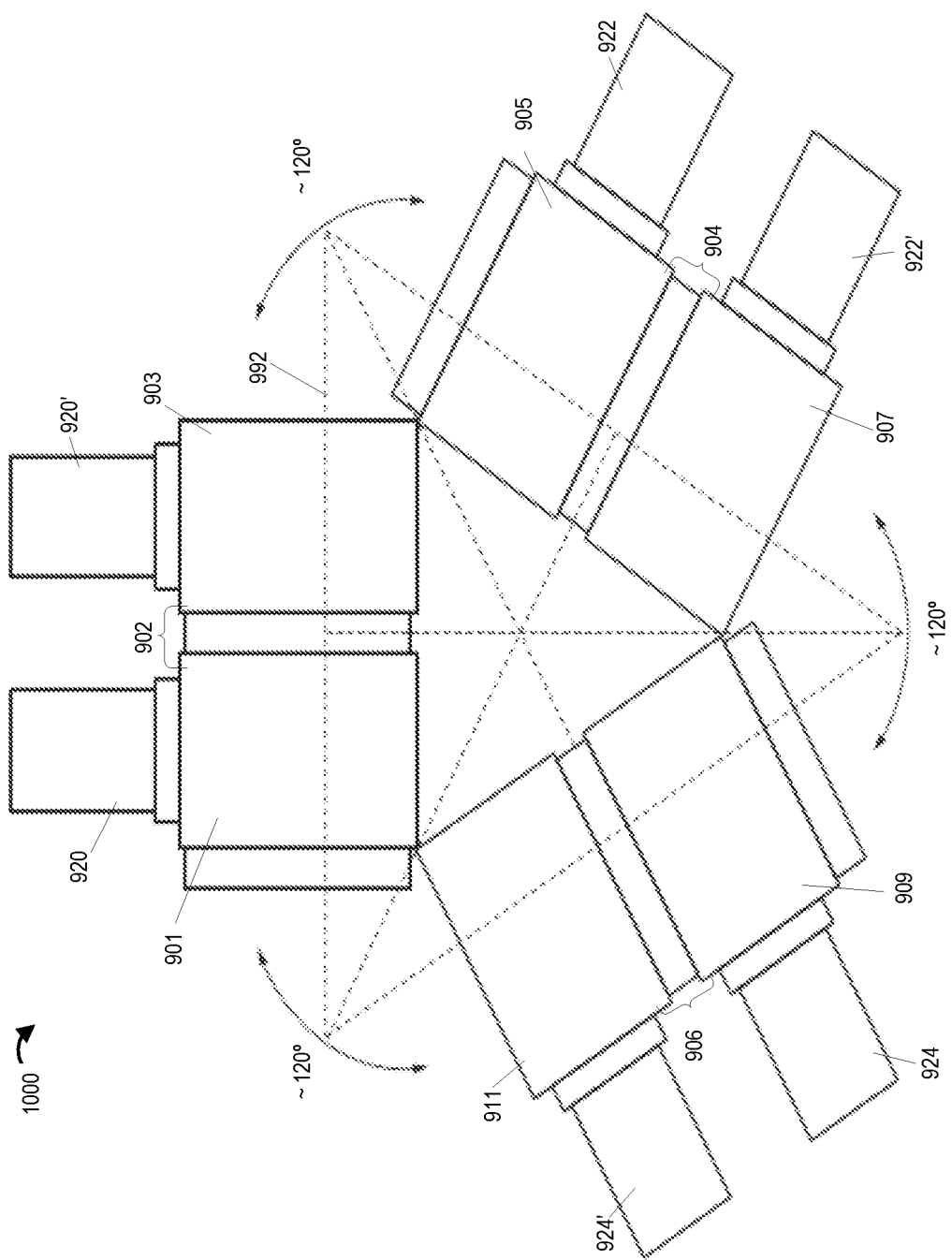
FIG. 10 illustrates a drawing that shows a more focused view of the camera rig with the 3 camera pairs mounted in the camera rig.

FIG. 10 is a diagram 1000 of the camera array shown in FIG. 9 in greater detail. While the camera rig is again shown with 6 cameras, in some embodiment the camera rig is populated with only two cameras, e.g., camera pair 902. As shown there is a 120 degree separation between each camera pair mounting positions. Consider for example if the center between each camera pair corresponds to the direction of the camera mounting position, in such a case the first camera mounting position corresponds to 0 degrees, the second camera mounting position corresponds to 120 degrees and the third camera mounting position corresponding to 240 degrees. Thus each camera mounting position is separated by 120 degrees. This can be seen if the center line extending out through the center of each camera pair 902, 904, 906 was extended and the angle between the lines measured.

In the FIG. 10 example, the pair 902, 904, 906 of cameras can, and in some embodiments do, rotate around the center point of the camera rig allowing for different views to be captured at different times without having to alter the position of the camera rig base. That is, the cameras can be rotated around the center support of the rig and allowed to capture different scenes at different times allowing for a 360 degree scene capture using the rig shown in FIG. 10 while it is populated with only two cameras. Such a configuration is particularly desirable from a cost perspective given the cost of stereoscopic cameras and is well suited for many applications where it may be desirable to show a background captured from the same point of view but at a different time than the time at which the front scene including the main action during a sporting event or other event may occur. Consider for example that during the event objects may be placed behind the camera that it would be preferable not to show during the main event. In such a scenario the rear images may be, and sometimes are, captured prior to the main event and made available along with the real time captured images of the main event to provide a 360 degree set of image data.

Figure 11:
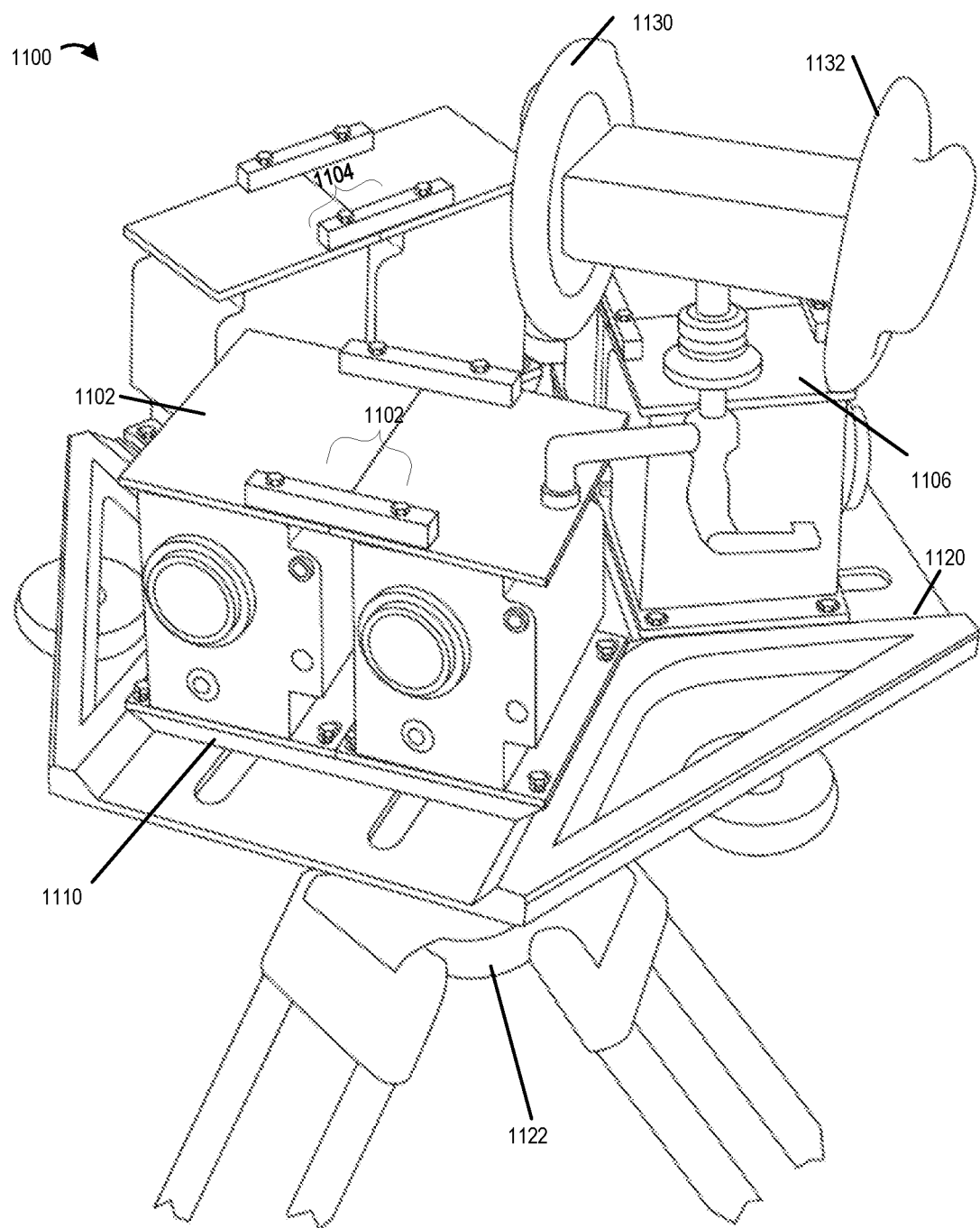
FIG. 11 shows a detailed illustration of an exemplary camera rig implemented in accordance with one exemplary embodiment.

FIG. 11 shows a detailed illustration of an exemplary camera rig 1100 implemented in accordance with one exemplary embodiment. As can be appreciated from FIG. 11, the camera rig 1100 includes 3 pairs of cameras 1102, 1104 and 1106 which in some but not all embodiments are stereoscopic cameras. Each camera pair includes two cameras in some embodiments. The camera pairs 1102, 1104 and 1106 are the same or similar to the camera pairs 902, 904, 906 discussed above with regard to FIGS. 9-10. In some embodiments the camera pairs 1102, 1104 and 1106 are mounted on a support structure 1120 of the camera rig 1100. In some embodiments the three pairs (six cameras) of cameras 1102, 1104 and 1106 are mounted on the support structure 1120 via respective camera pair mounting plates. The support structure 1120 includes three mounting positions for mounting the stereoscopic camera pairs, with each mounting position corresponding to a different 120 degree viewing area. In the illustrated embodiment of FIG. 11, the first pair of stereoscopic cameras 1102 is mounted in a first one of the three mounting positions, e.g., front position, and corresponds to 120 degree front viewing area. The second pair of stereoscopic cameras 1104 is mounted in a second one of the three mounting positions, e.g., background position rotating 120 degrees clockwise with respect the front position, and corresponds to a different 120 degree viewing area. The third pair of stereoscopic cameras 1106 is mounted in a third one of the three mounting positions, e.g., background position rotating 240 degrees clockwise with respect the front position, and corresponds to another 120 degree viewing area. While the three camera mounting positions on the camera rig 1100 are offset by 120 degrees with respect to each other, in some embodiments each camera mounted on the camera rig has a field of view of around 180 degrees. In some embodiments this expanded field of view is achieved by using fish eye lens in on the camera devices.

While all of the mounting plates are not visible in the illustrated drawing, camera mounting plate 1110 used for mounting camera pair 1102 is shown. The mounting plates for the cameras have slots for screws to go through the slots in the support base 1120 and into threaded holes in the mounting plate from the bottom. This allows the mounting plate for the pair to be adjusted by loosening the screws which are accessible from the bottom and then tightening the screws to secure the camera pair mounting plate to the support structure. The individual camera positions can be adjusted as well and then locked down after adjustments. In some embodiments the individual cameras can be adjusted/secured to the mounting plate from the top and the camera mounting plates can be adjusted/secured from the bottom.

In various embodiments the camera rig 1100 includes a base 1122 to which the support structure 1120 is rotatably mounted. Thus in various embodiments the camera assembly on the support structure 1120 can be rotated 360 degrees around an axis that passes through the center of the base. In some embodiments the base 1122 may be part of a tripod or another mounting device. The support structure may be made of plastic, metal or a composite material such as graphite or fiberglass. The camera pairs can be rotated around a central point, sometimes referred to as center nodal point, in some embodiments.

In addition to the above elements in some embodiments the camera rig 1100 further includes two simulated ears 1130, 1132. These simulated ears 1130, 1132 imitate human ears and in some embodiments are made from silicone molded in the shape of a human ear. Simulated ears 1130, 1132 include microphones with the two ears being separated from each other by a distance equal to, or approximately equal to, the separation between human ears of an average human. The microphones mounted in the simulated ears 1130, 1132 are mounted on the front facing camera pair 1102 but could alternatively be mounted on the support structure, e.g., platform, 1120. The simulated ears 1130, 1132 are positioned perpendicular to the front surface of the camera pair 1102 in a similar manner as human ears are positioned perpendicular to the front surface of eyes on a human head. Holes in the side of the simulated ears 1130, 1132 act as an audio entry hole in the side of the simulated ears with the simulated ears and hole operating in combination to direct audio towards a microphone mounted in each one of the simulated ears much as a human ear directs audio sounds into the eardrum included in a human ear. The microphones in the left and right simulated ears 1130, 1132 provide for stereo sound capture similar to what a human at the location of the camera rig 1100 would perceive via the human's left and right ears if located at the position of the camera rig.

While FIG. 11 illustrates one configuration of the exemplary camera rig 1100 with three stereoscopic camera pairs, it should be appreciated that other variations are possible and within the scope. For example, in one implementation the camera rig 1100 includes a single camera pair, e.g. a pair of stereoscopic cameras which can rotate around the center point of the camera rig allowing for different portions of the 360 degree scene to be captured at different times. Thus a single camera pair can be mounted on the support structure and rotated around the center support of the rig and allowed to capture different scenes at different times allowing for a 360 degree scene capture.

Figure 12:
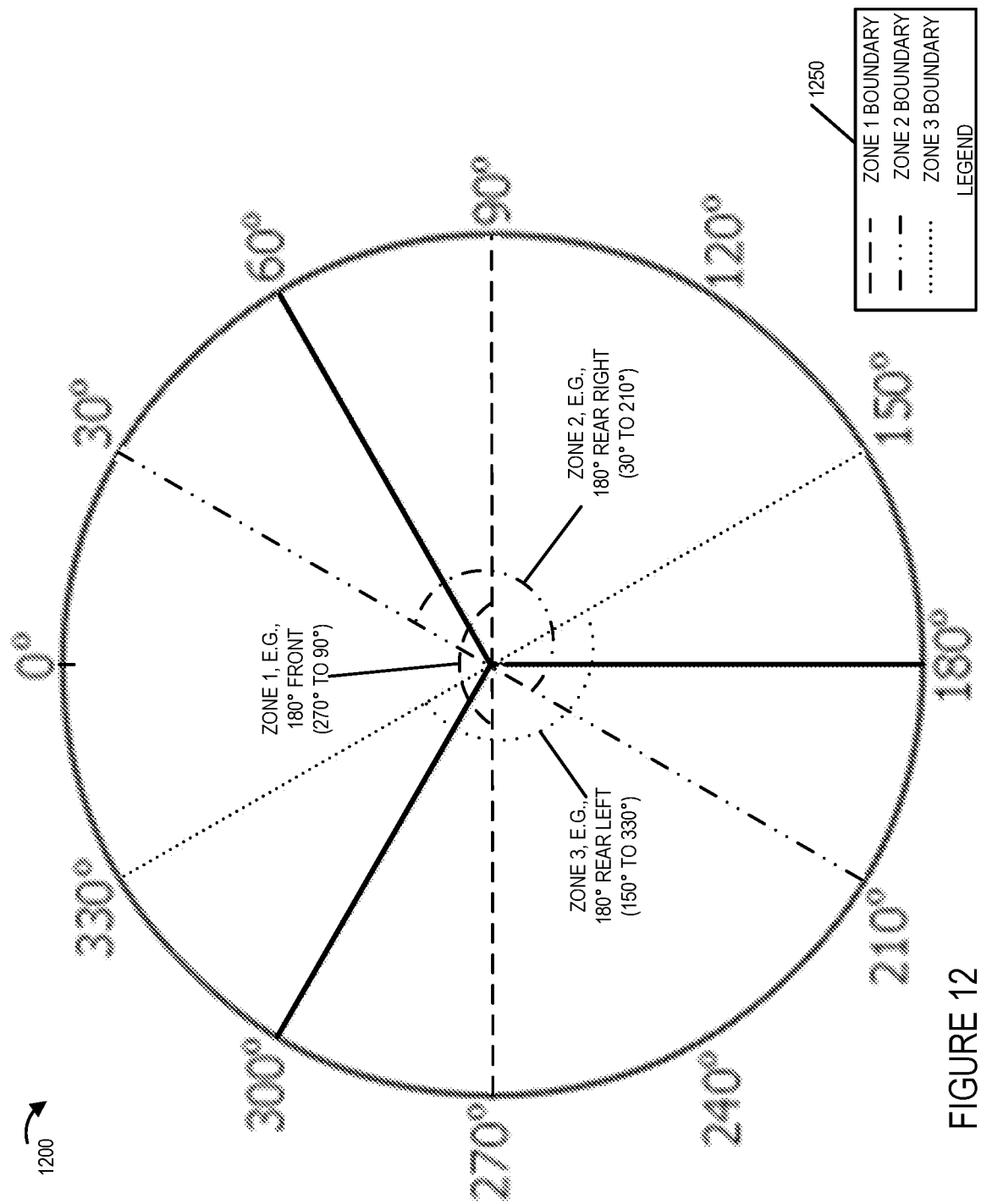
FIG. 12 illustrates an exemplary 360 scene environment, e.g., 360 scene area, which can be partitioned into different viewing areas/portions corresponding to different camera positions of the respective cameras that capture the different portions of the 360 degree scene.

FIG. 12 illustrates an exemplary 360 scene environment 1200, e.g., 360 scene area, which can be partitioned into different viewing areas/portions corresponding to different camera positions of the respective camera that capture the different portions of the 360 degree scene. In the illustrated example, the 360 scene area 1200 is divided into three portions corresponding to three 180 degree zones which are captured by three different camera/camera pairs, e.g., such as the cameras mounted on the camera rig 1100 and positioned as illustrated in FIGS. 9, 10 and 11. The 0 degree mark on the 360 degree scene 1200 may be considered to be the center of the scene. In some embodiments where the fish eye lens is not used the field of view of each camera is about 120 degrees thus allowing the camera to capture approximately 120 degree scene area. In such embodiments the boundary of different 120 degree scene portions is shown in the figure using solid black lines which partition that 360 degree scene are into 3 portion of 120 degree each. In the embodiments where cameras are fitted with a fish eye lens the field of view of each camera expands to about 180 degrees (+−5 degrees) thus allowing the camera to capture approximately 180 degree (+−5 degrees) scene area.

The first zone (Zone 1 corresponding to 180 degree front scene area from 270 to 90) covering 90 degrees to the left and right of the 0 degree mark can be captured by a first camera, e.g., camera pair 1102 positioned to capture front scene area, fitted with a fish eye lens that allows the camera device to have a field of view of approximately 180 degrees. The second zone (Zone 2) corresponds to 180 degree rear right scene area from 30 to 210 that may be captured by a second camera, e.g., camera pair 1104 positioned to capture the rear right scene area, fitted with a fish eye lens and the third zone (Zone 3) corresponds to 180 degree rear left scene area from 150 to 330 that may be captured by a third camera, e.g., camera pair 1106 positioned to capture rear left scene area, fitted with a fish eye lens. Legend 1250 includes information identifying the different line patterns used to indicate different zone boundaries, e.g., marking start and end of scene area covered under different zones. It can be appreciated from the figure that there is a substantial overlap between the scene areas under the three different zones covered by the different cameras. In the illustrated example of FIG. 12 the overlap between Zone 1 and Zone 2 is 60 degrees, i.e., the scene area under 30 to 90, the overlap between Zone 2 and Zone 3 is again 60 degrees, i.e., the scene area under 150 to 210 and the overlap between Zone 3 and Zone 1 is 60 degrees, i.e., the scene area under 270 to 330. While in the illustrated example the overlap is 60 degrees it should be appreciated that different varying overlaps are possible. In some embodiments the overlap between two different scene coverage areas is between 30 degrees to 60 degrees.

In some embodiments the content provider publishes, e.g., multicasts, content stream including content corresponding to different portions of the 360 degree scene areas captured by different cameras to customer playback devices. In some embodiments multiple versions of content corresponding to different scene areas which have been encoded differently are multicast by the content provider and the playback device that supports and/or prefers a particular version may select the appropriate content stream to decode and playback. In accordance with one aspect of some embodiments the playback device tracks a current head position indicating a current field of view of the user and decides which one or more of the available content streams including content corresponding to a portion of the 360 degree scene area to select to receive for use in playback. For example if the user head position indicates the user is looking/viewing straight ahead then the playback device decodes the stream communicating 180 degree front portion of the 360 degree scene but when it is detected that the user's head position and viewing angle has changed the playback device decodes a stream corresponding to the scene portion that suits the user's current viewing angle, e.g., rear right, rear left, back of the 360 degree scene area. In some embodiments a stream including content corresponding to a first portion of the 360 degree scene area, e.g., front 180 degree, includes scene area captured by left and right cameras of a front facing camera pair used to capture the front portion of the 360 degree scene.

Figure 13:
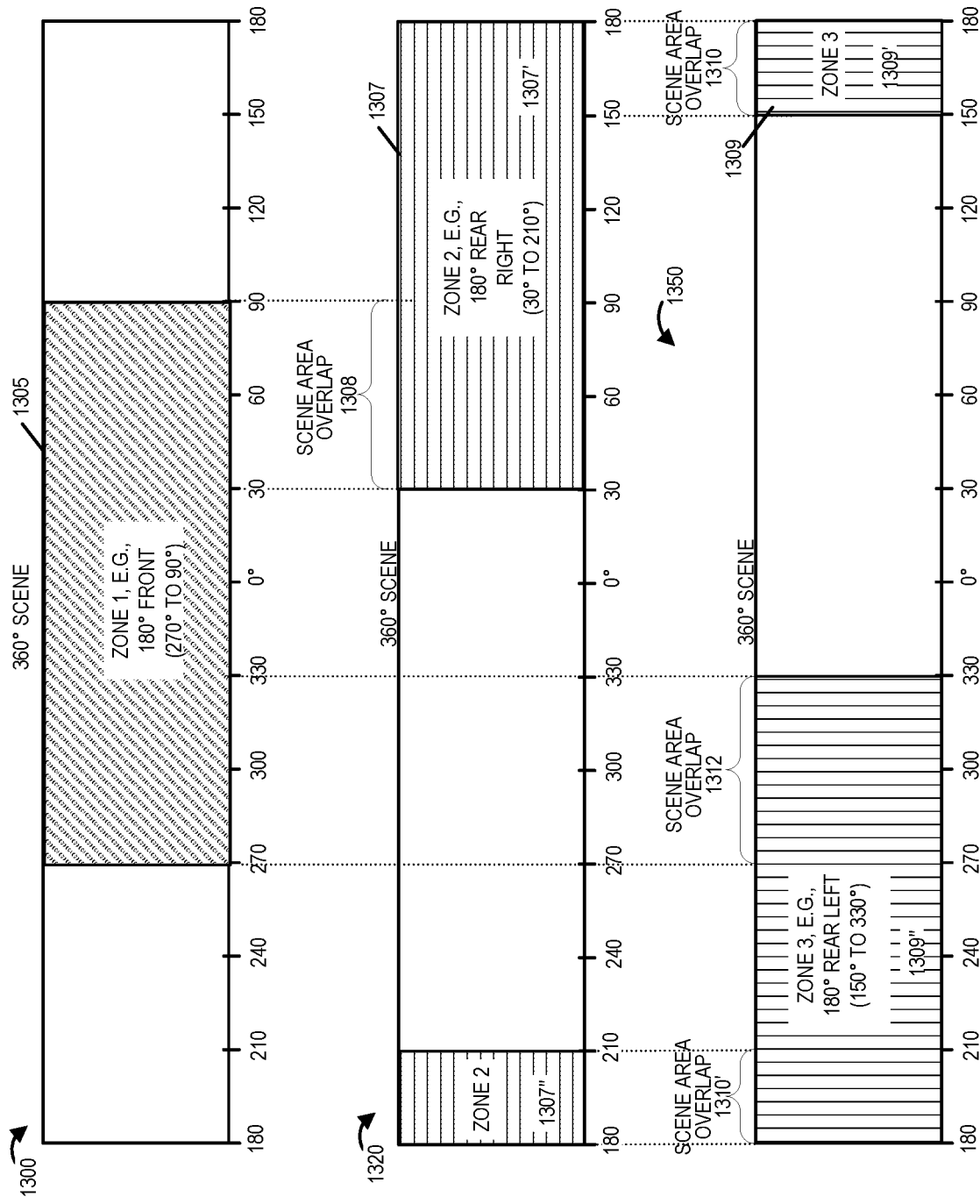
FIG. 13 includes three different drawings showing different portions of the exemplary 360 scene area of FIG. 12 which may be captured by different cameras that correspond to and/or positioned to cover the viewing areas/portions of the exemplary 360 scene area.

FIG. 13 illustrates an example showing different portions of the exemplary 360 scene area of FIG. 12 which may be captured by different cameras, e.g., on the exemplary camera rig 1100, that may be positioned to cover the viewing areas/portions of the exemplary 360 scene area. The FIG. 13 example includes drawings 1300, 1320 and 1350 which show different portions of the exemplary 360 scene area. However as can be appreciated from the drawings at least portions of each of the different portions of the scene captured by different cameras overlaps in some embodiments. Different shading patterns have been used in each of the drawings 1300, 1320, 1350 to show the portions of the scene area corresponding to different camera positions. In some embodiments the different scene portions shown in drawings 1300, 1320, 1350 are communicated via different content streams providing content corresponding to different viewing directions. While in FIG. 13 example the scene portions are shown to cover approximately 180 degree viewing area, in some embodiments the scene portions may cover between 120 degrees to 180 degrees.

Drawing 1300 illustrates a first exemplary scene portion 1305 of the 360 degree scene 1200. The first exemplary scene portion 1305 corresponds to the front viewing direction and covers 180 degree or approximately 180 degree viewing area out of the 360 degree scene environment. The first scene portion 1305 may be captured by, e.g., a first camera pair 902 or 1102, positioned at the 0 degree camera position. The area under the first exemplary scene portion 1305 is shown in drawing 1300 using a diagonal line pattern. The first exemplary scene portion 1305 may be communicated by a first stream communicating frames of content corresponding to a first, e.g., front, viewing direction.

Drawing 1320 illustrates a second exemplary scene portion 1307 (which includes portion 1307' and 1307" shown in the drawing 1320) of the 360 degree scene 1200. The second exemplary scene portion 1307 corresponds to the rear right viewing direction and covers 180 degree or approximately 180 degree viewing area out of the 360 degree scene environment extending from 30 to 210. The second scene portion 1307 may be captured by, e.g., a second camera pair 904, positioned at the 120 degree camera position as shown in FIGS. 9-10. The area under the second exemplary scene portion 1307 is shown in drawing 1300 using a horizontal line pattern. Consider drawings 1300 and 1320. Note the overlapping portion 1308 of the scene area between the first and second scene portions 1305 and 1307. The overlapping portion 1308 shows a portion of captured scene area that is common to both the first and second scene portions 1305, 1307 of the scene area 1200. In some embodiments the overlap between the first and second scene portions 1305, 1307 is between 30 degrees to 60 degree with plus minus 2-3 degree variation. In the illustrated example of FIG. 13 the overlap portion 1308 is 60 degrees, e.g., area from 30 to 90. Thus in some embodiments at least a portion of the scene areas corresponding to different viewing directions provided by different content streams and/or captured by different cameras, overlap. In some other embodiments there is no overlap between the scene areas corresponding to different viewing directions captured by different cameras. In some embodiment the second exemplary scene portion 1307 may be communicated by a second stream communicating frames of content corresponding to a second viewing direction.

Drawing 1350 illustrates a third exemplary scene portion 1309 (including portions 1309' and 1309" shown in the drawing 1350) of the 360 degree scene 1200. The third exemplary scene portion 1309 corresponds to the rear left viewing direction and covers 180 degree or approximately 180 degree viewing area out of the 360 degree scene environment extending from 150 to 330. The third scene portion 1309 maybe captured by, e.g., a third camera pair 906, positioned at the 240 degree camera position as shown in FIGS. 9-10. The area under the third exemplary scene portion 1309 is shown in drawing 1300 using a vertical line pattern. Consider drawings 1320 and 1350. Note the overlapping portions 1310, 1310' which in combination make up the overlapping area portion between the second and third scene portions 1307 and 1309. The area jointly under the overlapping portions 1310, 1310' shows portion of captured scene area that is common to both the second and third scene portions 1307, 1309 of the scene area 1200. In some embodiments the overlap between the second and third scene portions 1307, 1309 is between 30 degrees to 60 degree with plus minus 2-3 degree variation. In the illustrated example of FIG. 13 the overlap portions 1310, 1310' together include cover about 60 degrees, e.g., area from 150 to 210. Now further consider drawings 1300 and 1350. Note the overlapping portion 1312 which indicates the overlapping area portion between the first and third scene portions 1305 and 1309. In some embodiment the third exemplary scene portion 1309 may be communicated by a third stream communicating frames of content corresponding to a third viewing direction.

While drawings shown as part of FIG. 13 example illustrate an example to facilitate understanding of some aspects of the present invention, it should be appreciated that other variations are possible and within the scope of the disclosure.

Figure 14A:
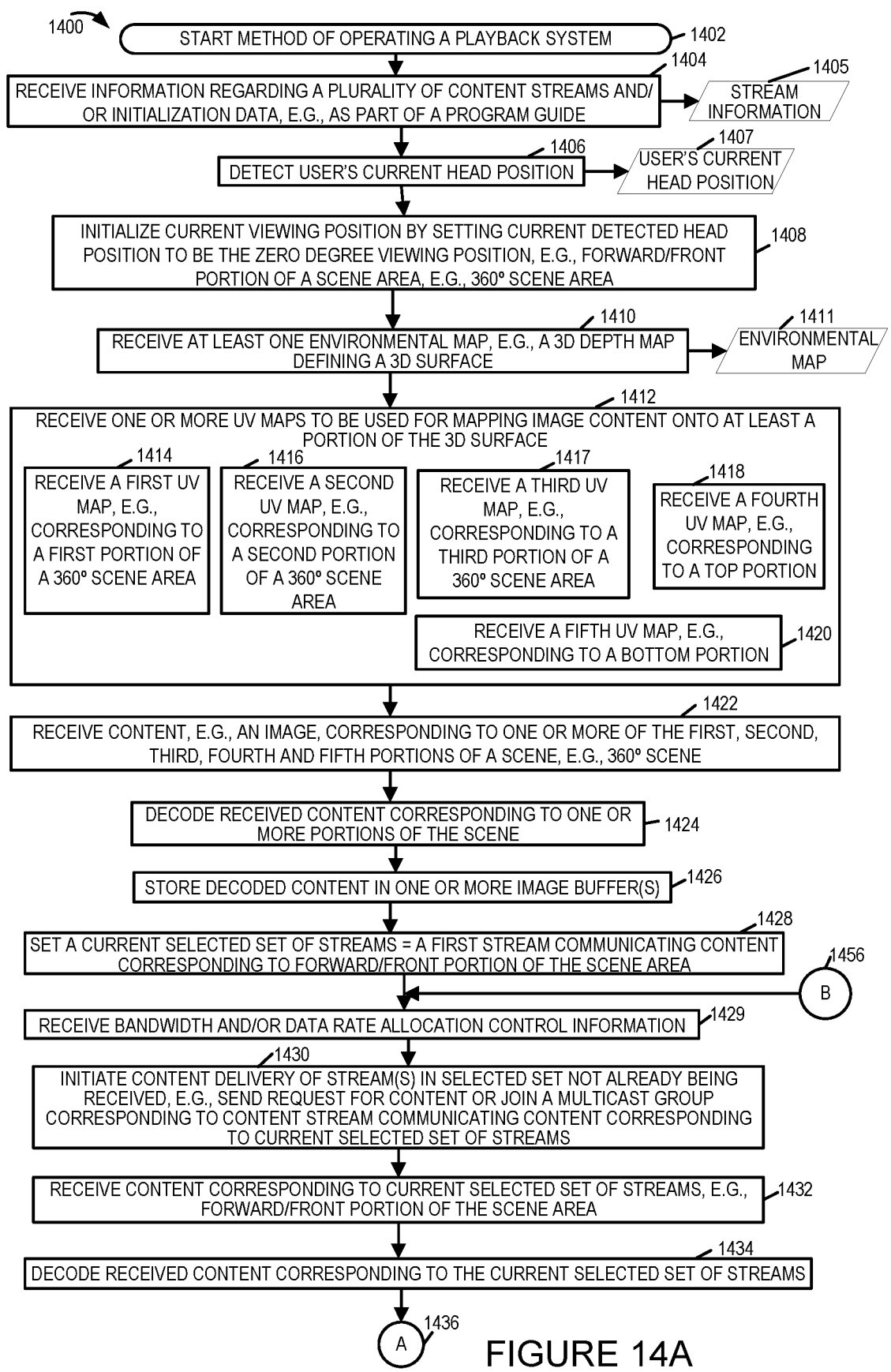
FIG. 14A is a first part of a flowchart illustrating the steps of an exemplary method of operating a playback device, in accordance with an exemplary embodiment of the invention.
Figure 14B:
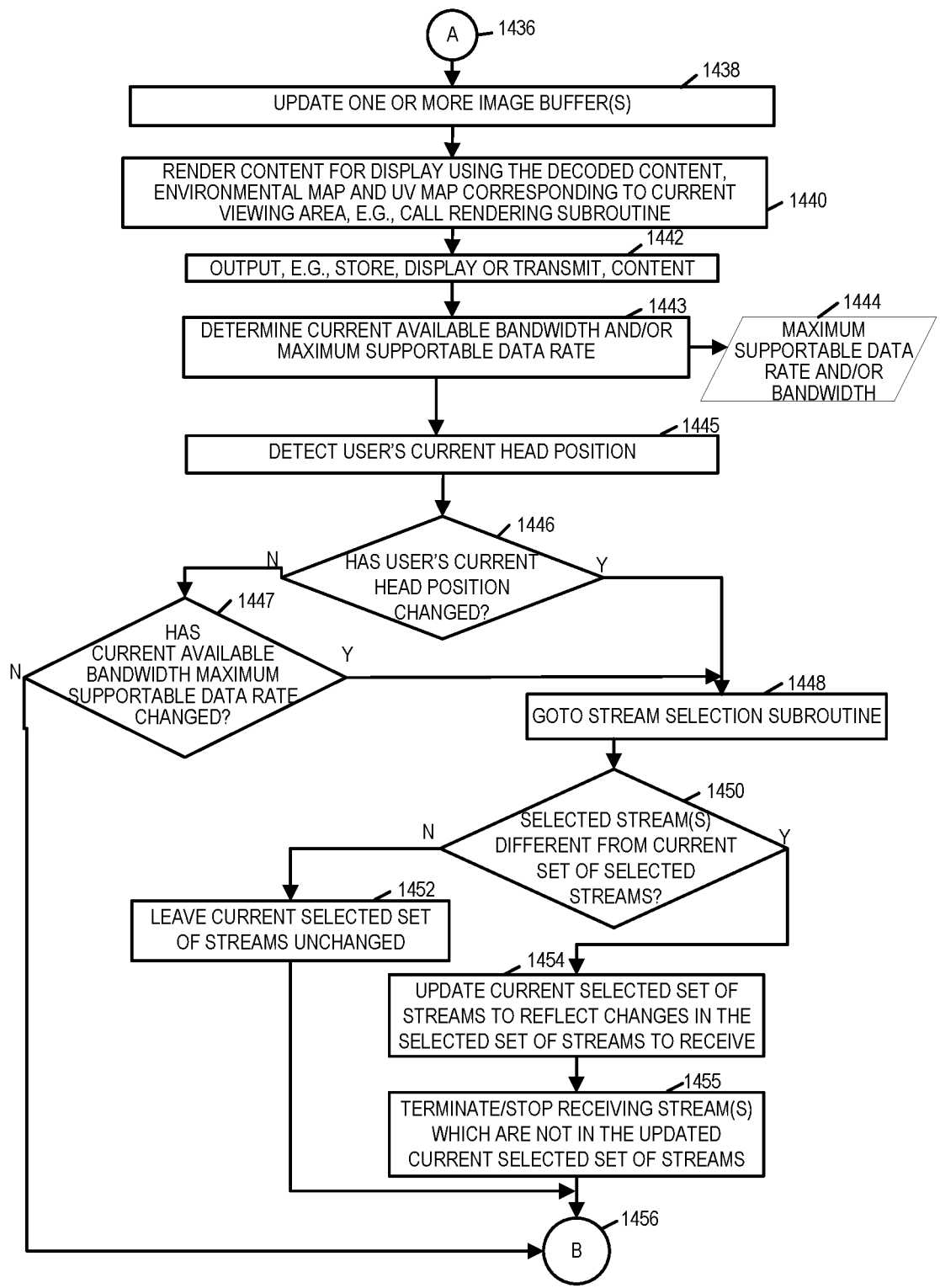
FIG. 14B is a second part of the flowchart illustrating the steps of an exemplary method of operating a playback device, in accordance with an exemplary embodiment of the invention.

FIG. 14, which comprises the combination of FIGS. 14A and 14B, is a flowchart 1400 illustrating the steps of an exemplary method of operating a playback system, in accordance with an exemplary embodiment of the invention. The system may be the playback system 800 shown in FIG. 8 or the playback system of any of the other figures shown in the application.

Figure 19:
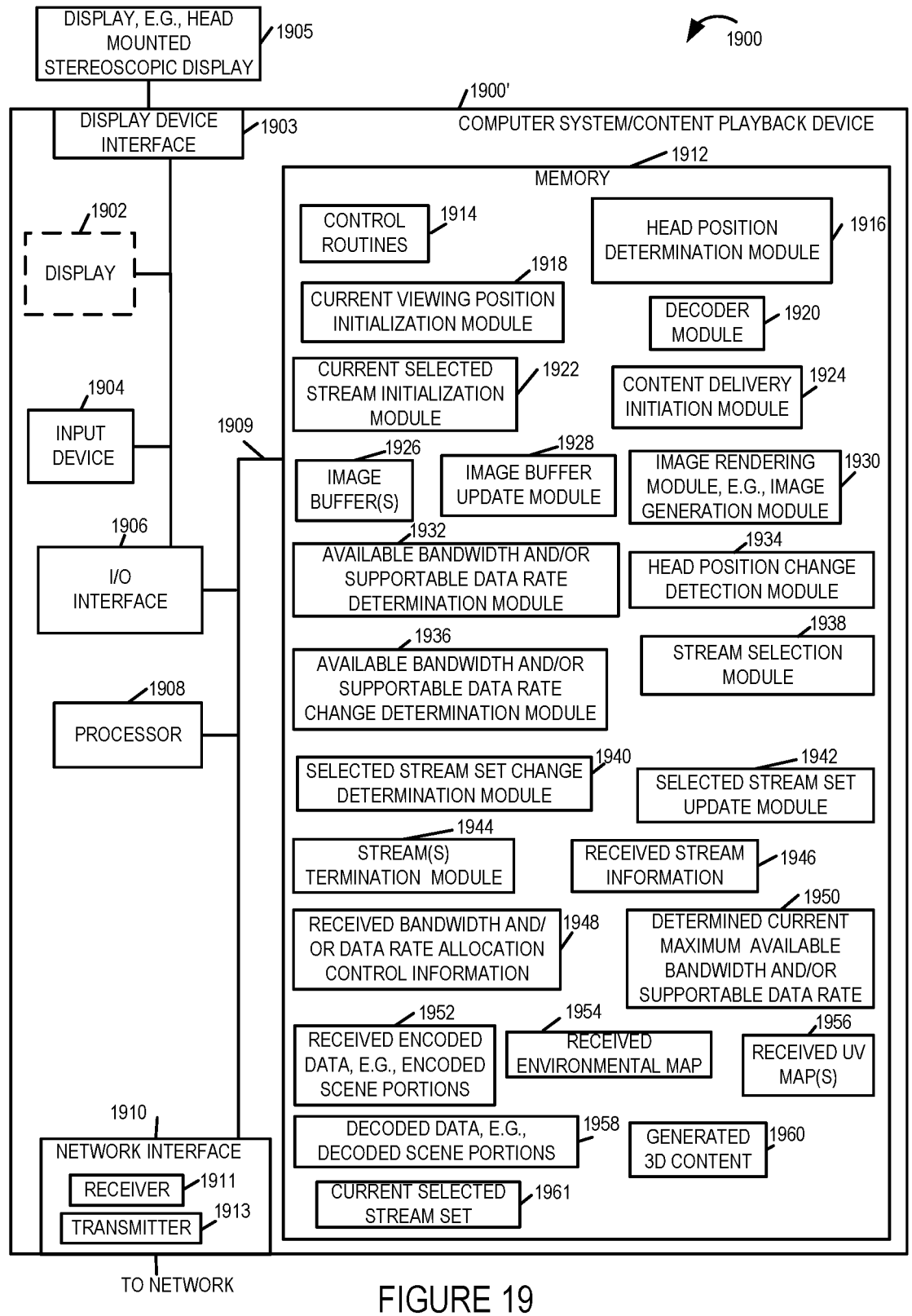
FIG. 19 illustrates an exemplary playback system implemented in accordance with the present invention.
Figure 20A:
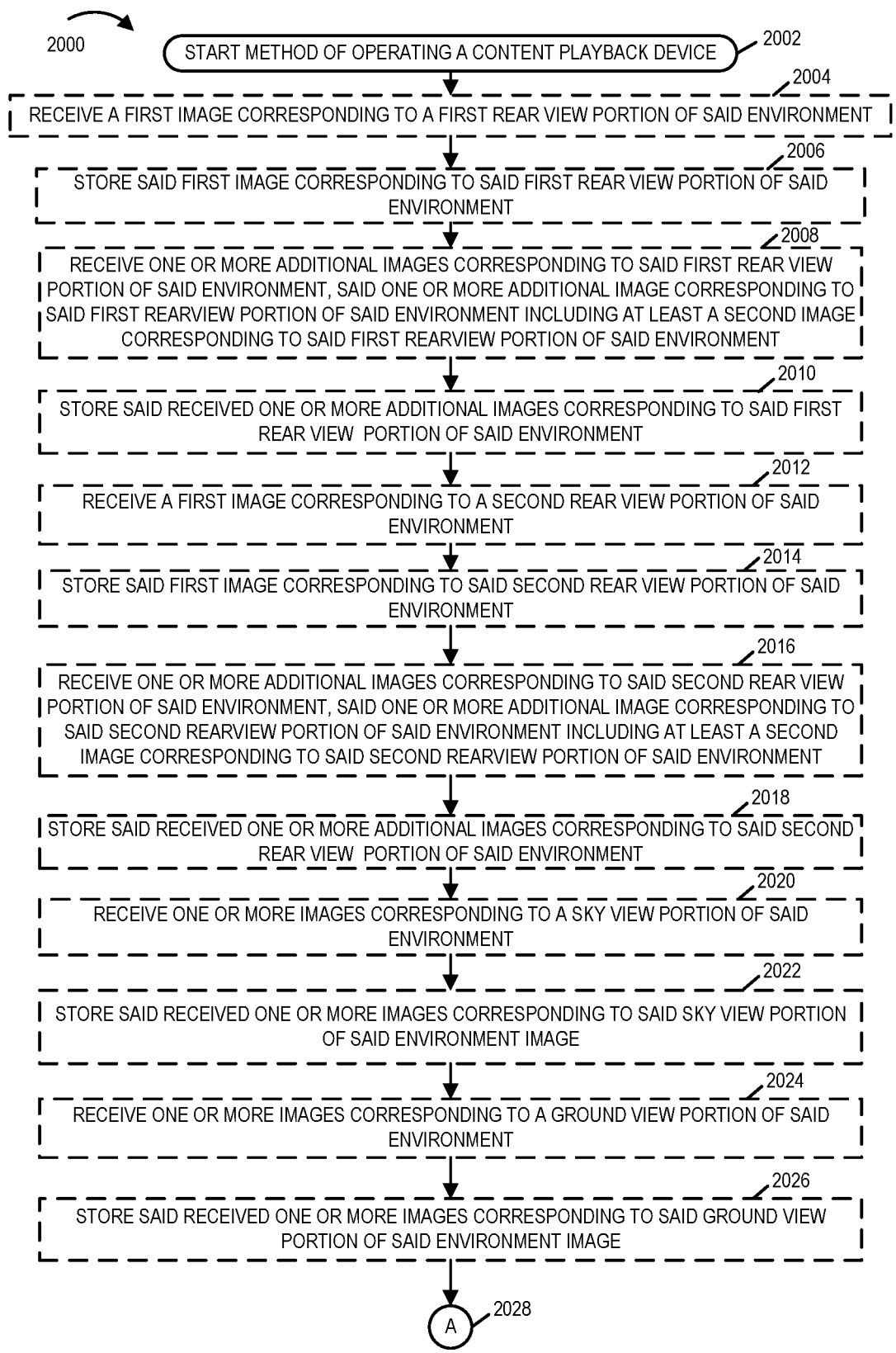
FIG. 20A is a first part of a flowchart of an exemplary method of operating a content playback system in accordance with an exemplary embodiment.
Figure 20B:
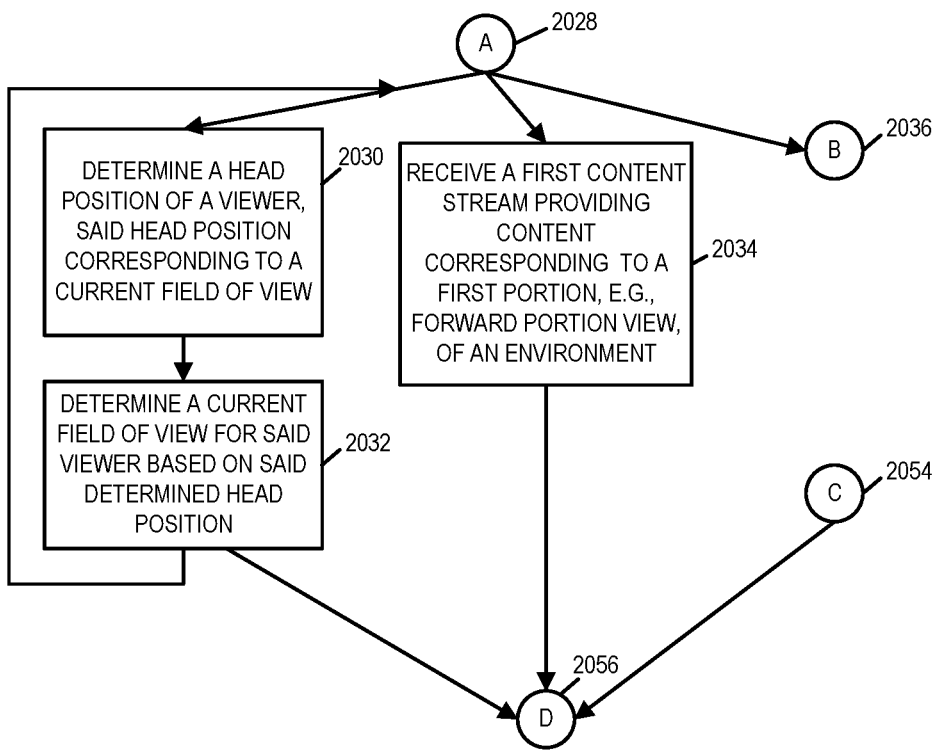
FIG. 20B is a second part of a flowchart of an exemplary method of operating a content playback system in accordance with an exemplary embodiment.
Figure 20C:
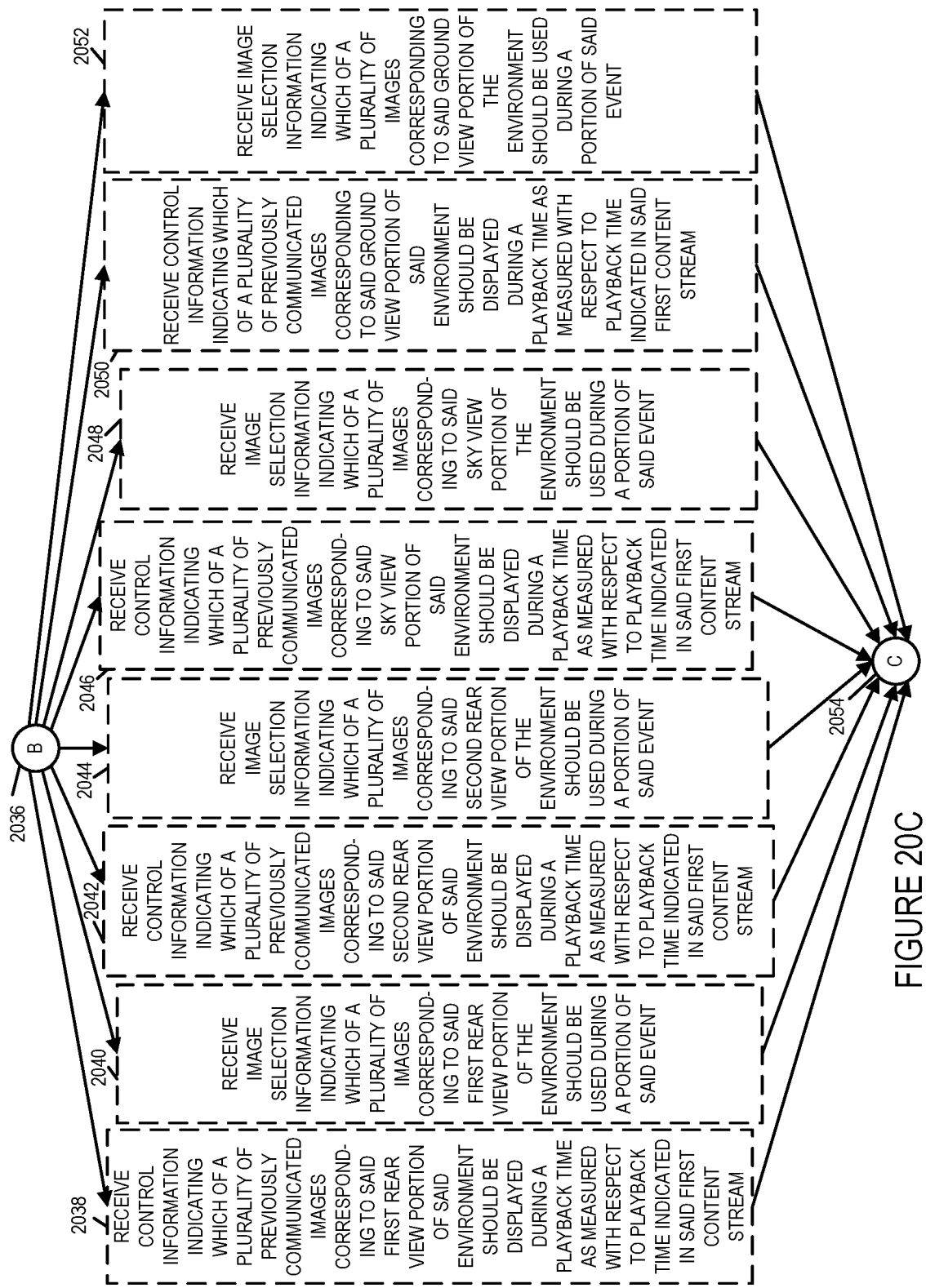
FIG. 20C is a third part of a flowchart of an exemplary method of operating a content playback system in accordance with an exemplary embodiment.
Figure 20D:
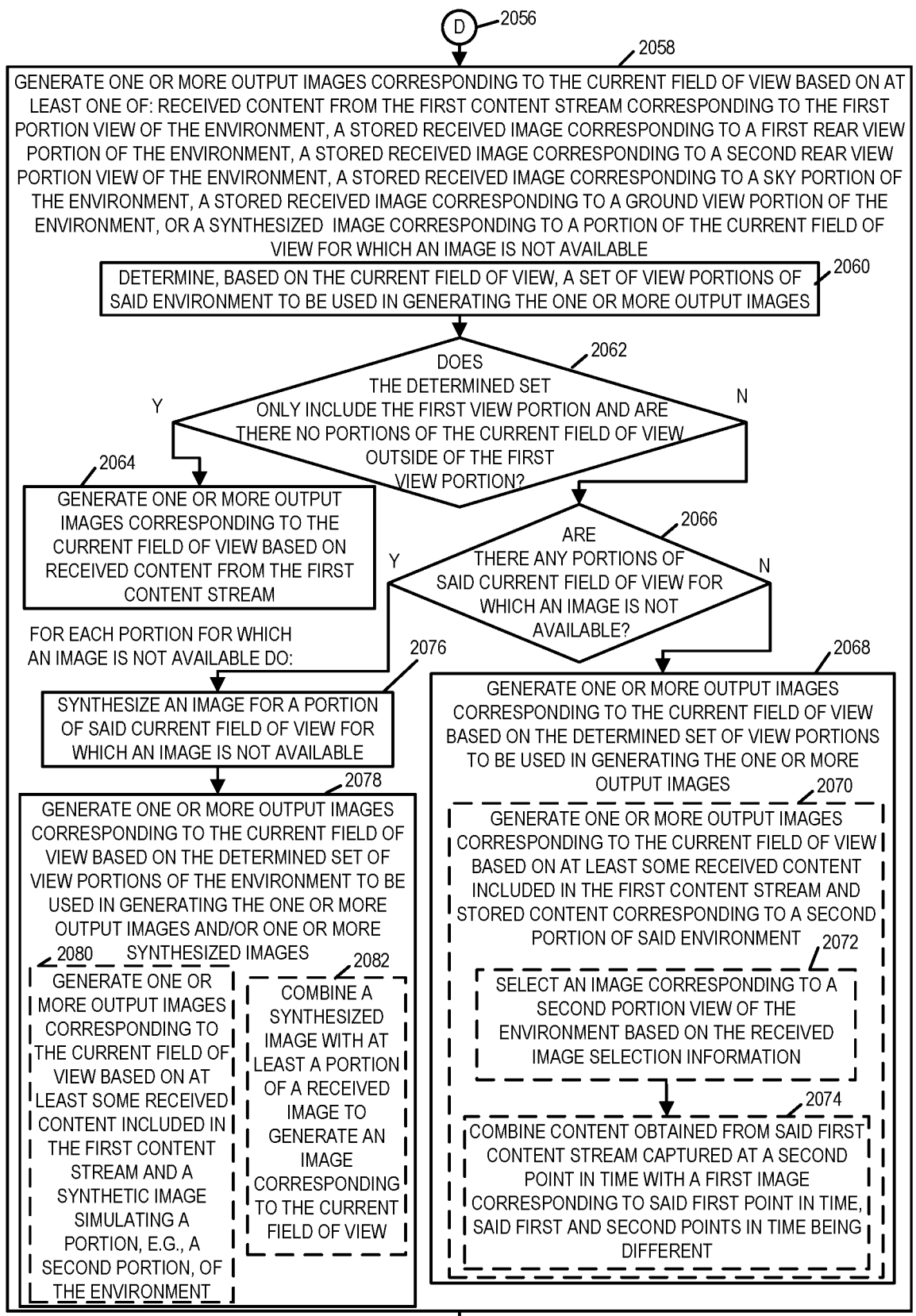
FIG. 20D is a fourth part of a flowchart of an exemplary method of operating a content playback system in accordance with an exemplary embodiment.
Figure 20E:
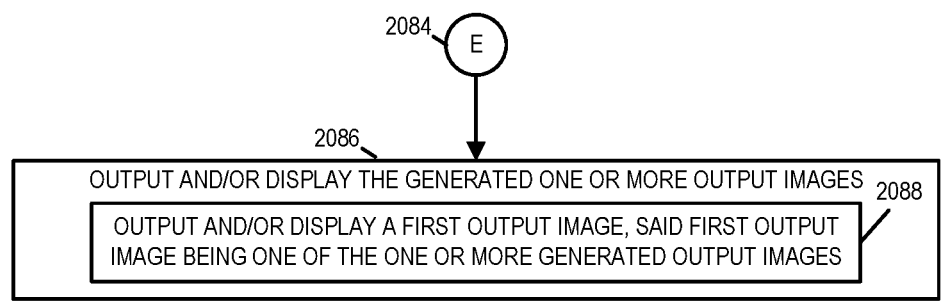
FIG. 20E is a fifth part of a flowchart of an exemplary method of operating a content playback system in accordance with an exemplary embodiment.

The exemplary method starts in step 1402, with the playback device, e.g., playback device 1900 of FIG. 19 or the playback device of any of the other figures being turned on and initialized. For the purposes of discussion consider that the playback system includes the computer system 1900' coupled to a head mounted display device 1905 which includes a display on which the image content is presented, e.g., with left and right eyes of a user being presented with different images in the case of stereoscopic content. While the computer system 1900' is shown external to the head mounted device which includes the display, the computer system 1900' could be incorporated into the head mounted display rather than external thereto.

Operation proceeds from start step 1402 to step 1404. In step 1404 the playback system 1900 receives information regarding a plurality of content streams and/or initialization data, e.g., as part of a program guide. The received information may be of the type shown in FIG. 18 and includes information indicating which content streams are or will be available along with information that can be used to receive the streams such as a multicast group identifier or other identifier that can be used to request the content or tune to the content. For example, a multicast address associated with a content stream may be included in the received information or a program identifier which can be used to request the content when the content is being supplied via switched digital video. In the case of broadcast content, the received information may, and sometimes does, include tuning information indicating the channel and/or frequency the playback device should tune to in order to receive a particular content stream.

The information received in step 1404 may include information for one or more programs. For a given program, e.g., sporting event, concert, etc, different streams may be available providing content corresponding to different viewing directions with respect to a camera position at the environment to which the content corresponds. The camera position corresponds to a viewing position during playback. Thus, viewing angles of a user during playback correlate to portions of the environment represented in the content which can be received. Different portions of the environment may be communicated in different streams. For each portion of the environment, e.g., portion of the 360 degree environment, one or more streams corresponding to different data rates may be listed in the information which is provided. Top and bottom portions of the environment may also be provided. The content of individual streams in some embodiments is stereoscopic content with different information being provided for left and right eye images thereby allowing different images to be displayed to a user to provide a desired 3D effect. In some embodiments top and bottom portions of a spherical environment are provided as mono images with the left and right eye views being the same thus requiring only one image to be supplied rather than two images.

Information about the program, portion of the environment, and data rate of a stream can be, and in some embodiments is, used by the playback system to prioritize which stream to be received given limited bandwidth that is available to stream content. Prioritization and selection of which stream to receive at a given time may be and in some embodiments is based on a users head position and/or the user's current or past direction of head rotation.

In the case of streaming of stereoscopic content, given limited bandwidth and/or data constraints, selection of the appropriate stream to receive can be important for a satisfying and high quality viewing experience. The information received in step 1404, e.g., steam information 1405, which can be the same or similar to the information shown in FIG. 18, is stored in memory and used for selection of a stream or streams to receive at a particular point in time and to initiate delivery of a selected stream, e.g., by joining the multicast group corresponding to selected stream, tuning to a channel providing the selected stream, and/or requested delivery of the stream by indicating to a network device a switched digital video channel to be supplied to the playback device, over which the desired stream is communicated.

Operation proceeds from step 1404 to step 1406. In step 1406, during initialization, the users current head position is detected. The user, aware that the head position detected during the initialization phase will be assumed to be a forward looking position, normally maintains his head at a comfortable level forward facing position during step 1406.

Operation proceeds from step 1406 to step 1408. In step 1408 the user's head position 1407 detected in step 1406 is treated as the forward (0 degree) environmental viewing position and the view displayed when the user has his/her head in this position will correspond to the 0 degree environment position, i.e., the forward position captured by the cameras used to captures images which are then encoded and included in the content stream corresponding to the particular portion of the environment. In the case of a sporting event this position will normally correspond to the main area of action in the environment, e.g., the stage in the case where the stream or streams correspond to a concert and the center of a field in the case where the streams correspond to a sporting event. Thus, in step 1408, the user's viewing position will be set to be interpreted as the zero degree viewing position, e.g., the forward/front portion of a scene area. Note that the portions of the 360 degree view corresponding to horizontal viewing positions with different portions being visible if the user rotates his/her head. By moving the users head up or down the user may see a sky portion and/or a ground portion alone or in combination with one or more other portions. Since the primary scene area is divided into portions along a 360 degree rotation assuming a level head position, the streams corresponding to such portions are normally allocated more bandwidth and the top/bottom scene portions maybe presented using static images or which change infrequently.

Operation proceeds from step 1408 to step 1410 in which an environmental depth map is received. The depth map defines the surface of the 3D environment onto which images of a content stream are to be mapped. In the absence of receiving a depth map, a sphere is the default assumed shape of the environment with the inside surface of the sphere being the surface on which the images of the environment are to be mapped during rendering prior to display. By providing and using a depth map, a more realistic experience is achieved since the images in the content stream will be mapped to surfaces which more realistically the shape and surfaces of the environment which is to be simulated. Thus, the depth map received in step 1410 corresponds to the environment to which content selected by a user to be received also corresponds. The environmental map received in step 1410, or a default map in the event a map is not received, is stored as environmental map 1411 for subsequent use in rendering images.

Operation proceeds from step 1410 to step 1412. In step 1412 one or more UV maps to be used for mapping 2D image content onto at least a portion of the 3D surface is received. In one embodiment at least one UV map is received for each portion of the environment which can be represented by different individual images. In some such embodiments when the images communicated by a content stream are captured by different cameras, e.g., left and right eye cameras, different UV maps may and sometimes are provided for the different cameras. Thus, while in the FIG. 14A example, a first UV map is received in step 1414 corresponding to a first portion of the environment such as a forward portion, in step 1416 a second UV map corresponding to a second portion of the environment such as a left rear portion is received, and in step 1417 a third UV map corresponding to a third portion of the environment such as a right rear portion is received. UV maps corresponding to top and bottom portions of the environment are received in steps 1418 and 1420, respectively. If the portions are of the same size, the same UV map may be used for multiple portions. However, in some embodiments different UV maps are used for images captured by different cameras.

Accordingly, in one such embodiment, for each portion of the environment for which stereoscopic image data is provided, e.g., left and right eye images, separate UV maps may be received and stored for each of the left and right eye images so that the UV maps can take into consideration the particular characteristics of the camera assembly used to capture the particular left or right eye image content.

Each UV map provides a map used to map the two dimensional image of a content stream to which the map corresponds, unto a corresponding portion of the surface of the 3D environment. In this way images captured by a camera can be transmitted as 2D images and then mapped as a texture onto the surface or a portion of the surface defined by the 3D model.

With the 3D model information and UV maps having been received, images which can be used as defaults in the event other content for a scene portion can be received and stored. In step 1422 content, e.g., an image, corresponding to one or more of the first, second, third and fifth scene portions is received in step 1422 and stored. In some embodiments multiple alternative images corresponding to a portion of the environment, e.g., a background portion or sky portion, are received and stored in step 1422. Control information can be received indicating which default image is to be used at a given point in time during an event for a portion for which multiple default images are stored. For example, in some embodiments a background image of a crowd sitting and a background area image of crowd standing are stored as two default images. Control information is used to indicate which background image is used to a given portion of the event. For example during a portion corresponding to a standing ovation at a play or concert, the crowd standing image would be signaled as the background image to be displayed should a user turn in the background direction. However, during a main portion of the event when the crowd would normally be sitting, control information would signal that the default image of the crowd sitting should be used if the user turns his/her head toward the background. The control information may be signaled separately from a content stream or may be included with a content stream for a portion of the environment which is different from the portion to which one or more of the default images relate. For example, a content stream corresponding to the forward direction may provide images corresponding to the forward direction, e.g., left and right eye images, as well as control information indicating which default images should be used for the sky, ground, right background portion and left background portion at various times during an event. Alternatively, the playback device may decide which background or sky portion to use based on the luminosity of similarity to one or more features of the foreground image at the particular point in time. For example, when the foreground images is dark, this may be detected and a cloudy sky image automatically detected while when the foreground image is brighter this also may be detected and a less cloudy, brighter sky image automatically selected from the available default sky images that were received and stored.

In step 1422 the default images corresponding to the different environmental portions are normally received and stored in encoded form. In step 1424 one or more of the received images are decoded and the decoded content is then stored in one or more image buffers in step 1426. In this way, default images can be decoded and stored in decoded form so that then need not be decoded again at the time they needed for rendering during playback. Since a default image may be used multiple times the decoding and storage can reduce decoding requirements which might otherwise be required to decode the image at or just prior to rendering. Given that processing resources can be in short supply the pre-decoding and storage of default images in decoded form an improve use of processor resources as compared to embodiments where images are decoded immediately prior to display and then the decoded image deleted, e.g., removed from memory, once it is no longer needed.

While the same default decoded image may be used multiple times, e.g., for the sky, etc. it may be processed prior to being combined with other received image content so that it more closely matches the other images of the environment with which it is combined to generate the viewed portion of the environment. For example in some embodiments decoded default images are subject to luminance adjustment based on the image portion with which they are being combined or blurred at least along the edges where the default image will be combined with an image corresponding to another portion of the environment. Thus, during use in at least some embodiments, image luminously and/or color characteristics are filtered or modified to make them more similar to the same characteristics of the for ground image with which they are combined.

With the initialization data and default images having been stored for future use, operation proceeds to step 1428 wherein a set of one or more streams to be received, e.g., a current selected set of streams, is initialized. Each stream may provide stereoscopic or mono image data. Optionally corresponding audio may also be received in the selected streams but more commonly in one or more separate audio streams. The description will focus on the receipt of video streams with the understanding that audio streams will normally also be received and decoded by the playback device and that the audio may include stereo audio.

In exemplary step 1428, a current selected set of streams is set equal to a first steam communicating content corresponding to the forward/front portion of the environment. This is because at start up the initial position is set to be the forward viewing position and thus as a result of the initialization the user will at start up expect to see the forward scene area.

Operation proceeds from step 1428 to step 1429. In step 1429 resource allocation information is received. The resource allocation information may be in the form of bandwidth and/or data rate allocation control information. The information received in step 1429 includes information, in some embodiments, about how much bandwidth or data communications capability should be allocated to one or more communications streams corresponding to different portions of the environment. The information may be expressed in terms of bandwidth or data rate with the understanding that data rate normally coincides to bandwidth. For example the amount of data which can be received may be a function of the amount of bandwidth taking into consideration the type of data coding used to communicate over the bandwidth.

The information received in step 1429 may indicate relative maximum amounts of available communications capacity to allocate to the reception of images corresponding to a particular portion of the environment. For example it may indicate that at most 80% of the bandwidth or supportable data rate should be allocated to a primary data stream, e.g., the forward data stream with at last 20% of the bandwidth being allocated to one or more other streams. The allocation of resources to different directions may be, and in some embodiments is, a function of the image content in a corresponding portion of the environment and/or detected audience feedback. For example, in some embodiments during intermissions, which occur during an event to which the content corresponds, the information received in step 1429 may indicate that an increased amount of resources should be allocated to receiving images corresponding to one or both rear portions of the environment. This is because during an intermission, users are more likely to turn their head and start looking away from the main field or stage and it may be desirable that some video be supplied for the rear portions so that it appears there is action going on in the audience during the intermission. For example images of people buying hot dogs at a baseball game or changing seats may be and in some embodiments are sent so that it appears that the background is live during intermissions but static at other times. Similarly images of billboards in the background may be changed during intermissions for advertising and/or entertainment purposes. Thus it may be desirable to trigger the playback device to allocate more resources to receiving background portions during intermissions than during other portions of an event. The control information received in step 1429 may be, and sometimes is, different during main portions of an event than during intermissions or other discreet portions of an event. During the main event in at least some embodiments, control information received in step 1429 causes more bandwidth and/or data rate to be allocated to the main, e.g., forward, area of the environment than the rear portion. However, during intermissions or other discrete portions the data rate allocated to one or both of the rear portions may be forced to be increased.

The split between resources allocated to a given direction may be based on content being presented in the portion of the environment, measurement of audience attention and/or the portion of the event that is ongoing, e.g., a main portion, an intermission portion, an after show portion. The control information provided in step 1429 in some embodiments specifies a maximum and/or minimum amount of bandwidth or data rate to be allocated to reception of images corresponding to one or more portions of the environment, e.g., while an event is ongoing. In some embodiments the information indicates that no bandwidth or data should be allocated to receiving ground to sky image portions during an event and thus these portions are to be populated when needed using static images in such a case.

The bandwidth/data rate allocation control information may vary overtime with different information being received at different times. The control information may be embedded into the forward content stream and/or sent separately, e.g., as a separate set of control information.

Operation proceeds from step 1429 to step 1430 wherein content delivery of stream(s) in the selected set of streams not already being received is initiated. This may involve joining a multicast group to which a selected stream corresponds, sending a message to a network device requesting delivery of the selected stream and/or tuning to a broadcast channel over which the selected stream or streams is transmitted. In the case of the first pass through step 1430 this will involve initiating delivery of a content stream corresponding to the forward portion of the environment since this was set as the initial viewing portion which will be selected for delivery. However, as a user's head position changes, e.g., a user rotates his/her head left or right, the set of streams which are selected may and normally will change. For example if a user turns his head to the left so that a portion of the forward area and right rear area come into view, the set of selected streams will be changed so that content corresponding to both the forward area and left rear portion are received. If the left rear portion was not being received and is selected, delivery of content in a stream corresponding to the left rear portion will be initiated in step 1430. If maximum data rate streams in both directions can not be supported, a lower data rate forward stream may be selected and thus initiation of both the lower data rate forward stream and left rear content stream would be initiated. Streams outside the selected set are terminated prior to receipt of the streams in the newly selected set. The termination and initiation of streams is performed in a smooth manner so that dramatic changes in content being received and/or temporarily gaps are minimized with blurring and/or filtering being used to reduce the noticeably of changes in the quality or source of images as stream switching occurs. For example, blurring maybe implemented across portions of images which are stitched together as part of the rendering or display process.

With content delivery initiated for the current set of selected streams, operation proceeds from step 1430 to step 1432. In step 1432 content is received from streams in the selected set of content streams. This may, and in various embodiments does, involve receiving content corresponding to a highest priority stream, e.g., the stream providing the content corresponding to the majority of a field of view and content corresponding to one or more other portions of the environment, e.g., portions providing a small portion of image content corresponding to the field of view. The stream providing the small portion of the content for the current field of view may be described as a secondary stream. In one embodiment where a single stream provides the content for the full field of view, 20% or less of the available bandwidth/supportable reception data rate is reserved and used for receiving one or more secondary or lower priority streams, e.g., providing content outside the field of view in case a user turns in a direction outside the field of view. In the case where the field of view is approximately evenly split between areas corresponding to two different content streams each stream may be allocated about half of the available data rate/reception data rate since they contribute in a roughly even fashion and it is unlikely a user will quickly change position to view an area of the environment outside the area for which the two streams provide images.

With content reception having been initiated, in step 1432 content, e.g., images, are received from the selected set of streams. The content in the case of the primary, e.g., highest priority, stream will normally be stereoscopic content with both left and right eye image content being received in the stream. For low priority streams and/or streams allocated a low data rate mono images may be received with a single image being received for display to both the left and right eye images. The forward scene portion is normally received as stereoscopic content but one or more rear portions may be provided as mono image streams.

Encoded image content is normally received in the streams in step 1432. In step 1434 the received content is decoded, and then in step 1438, which is reached via connecting node A 1436, the decoded content is stored in one or more image buffers. In some embodiments a decoded image buffer is maintained for each portion of the environment. Even though only a portion of a received image may ultimately displayed the full received frame is normally decoded and buffered. The decoded buffered image may be, and in some embodiments is, kept in memory until it is replaced with a more recent image for the same scene portion. Thus, at any given time a decoded image is available for each portion of the environment to use in rendering a final output image as needed based on a current field of view. Since decoded image content is maintained in memory until it is replaced by a more recent decoded image, decoding of images corresponding to each of the portions of the 360 degree environment need not occur during each frame time. Thus, while a frame rate of 30 frames per second may be supported, 150 frames need not be decoded each frame period, e.g., one for each of the top, bottom, forward, left rear, right rear portions, but rather a lower number of frames equal to or slightly higher than the frame rate to be supported may be decoded with some portions of the image coming from the previously decoded static images or previously decoded image portions which are updated at a lower rate than the portion corresponding to the main field of view.

Thus, after the update in step 1438, the current decoded frames are available for use in rendering an image based on the user's current field of view.

Operation proceeds from step 1438 to step 1440. In step 1440 content is rendered for display using the decoded content available from the image buffer(s), the environmental map which defines the surface onto which one or more image portions are to be applied, e.g., as a texture, and the UV map(s) which provide information on how to apply the 2D decoded images to the model of the 3D surface. The 3D mesh model of the environment may be in the form of a grid with points in the UV map corresponding to vertices of the mesh model defining the surface to which the images of the environment are to be applied.

As part of the rendering, image portions corresponding to content received from different streams will be combined to generate an image of the environment corresponding the user's field of view when content from a single stream can not provide a portion which will fully occupy the user's filed of view. Filtering or blurring may be, and in some embodiments is, applied across images which are joined to form the composite image corresponding to the users field of view. This tends to reduce how noticeable the seaming is to the user. In addition the luminance of image portions providing a portion of the composite image are adjusted in some embodiments to reduce luminance differences between the image portions which are combined to form the composite image with the luminance values of forward view begin given priority over the luminance values of the rear, top or side portions when making luminance adjustments to the image portions being combined to form the composite image.

The rendered image which may be a composite of one or more image portions of images received from different content streams, is stored, displayed or transmitted in step 1442. This represents the generation and display of one or more frames of content based on a current set of selected content streams.

Over time due to changes in communications channel conditions or network issues, the maximum supportable data rate may change. This can be detected in step 1443 and taken into consideration when selecting which content stream or streams should be received and processed. In step 1443 the maximum supportable data rate and/or bandwidth is determined as represented by data 1444 for used in subsequent steps. In step 1445 the user's current head position is detected. This may be done by using a position sensor on the headgear including the head mounted display.

Operation proceeds from step 1445 to step 1446 in which a determination is made as to whether the user's head position has changed. If the user's head position has not changed operation proceeds to step 1447 in which a check is made as to whether the current available maximum bandwidth or maximum supportable data rate has changed, e.g., from the last time the stream selection was made. If no change in the maximum supportable data rate or head position has been detected, the previous stream selection remains valid and no change is made to the selected set of content streams. Thus the playback system will continue to receive content corresponding to the user's current field of view which remains unchanged. In the case where no change is detected in step 1447 operation proceeds via connecting node B 1456 back to step 1429.

If however, in either of steps 1446 or 1447 a change is detected, operation proceeds to stream selection step 1448 which involves a call to stream selection subroutine. In this manner the detected changes in head position and/or supportable data rate can be taken into consideration and the selection of streams reconsidered in view of the user's head position and/or the supportable data rates which can be used to receive data, e.g., image content.

Once the streams have been selected by the stream selection subroutine, operation proceeds to step 1450 in which a check is made as to whether the selected streams are different from the current set of selected streams. If the newly selected set is the same as the current selected set of streams which is in use no changes with respect to the steams being received needs to be made, and in step 1452 the current selected set of streams is left unchanged with operation proceeding to step 1429 via connecting node B 1456. However, if the newly selected set of streams is different from the current set of selected streams, the current selected set of stream is updated in step 1454 to reflect the changes in the selected set of streams, e.g., the current selected set is set equal to the newly selected set of streams selected by the stream selection subroutine.

Operation proceeds from step 1454 to step 1455 in which the receipt of streams which are not in the updated current selected set of streams is terminated. This may involve the playback system signaling that it no longer wants to be a member of a multicast group corresponding to a stream that is no longer being received or taking another action to use resources such as a tuner which was used to receive the stream which is being terminated for another purpose, e.g., receipt of the newly selected stream or streams.

Operation proceeds from step 1455 to step 1429 via connecting node B 1456. Then, in step 1430 receipt of any newly selected streams will be initiated and the received content will be used to render one or more images. Thus, over time as a user changes his or her head position and/or the data rate which can be supported changes, the selected steams may change as well.

Figure 15:
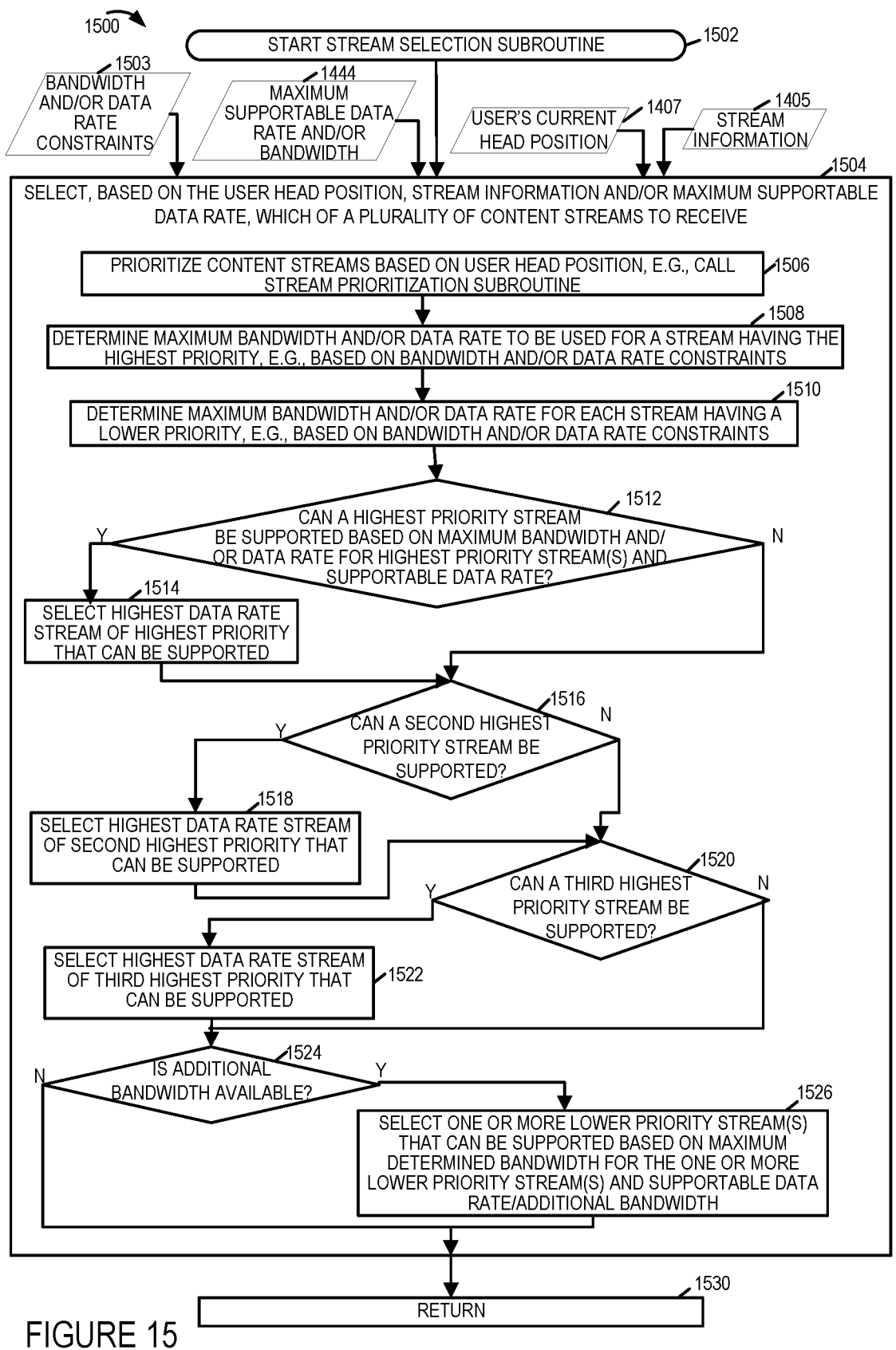
FIG. 15 is a flowchart illustrating the steps of a stream selection subroutine in accordance with an exemplary embodiment.

FIG. 15 is a flowchart illustrating the steps of a stream selection subroutine in accordance with an exemplary embodiment that may be used as the stream selection subroutine called in step 1448 of the FIG. 14 method.

The stream selection subroutine 1500 begins in step 1502 when the subroutine is called, e.g., by step 1448 of FIG. 14. Operation proceeds from start step 1502 to stream selection step 1504. Inputs to the stream selection step 1504 include bandwidth and/or data rate constraints 1503. These may include information on the maximum portion of available bandwidth or total reception data rate that should be allocated to one or more scene portions, streams and/or stream directions. The constraints may also include minimum bandwidth or data allocations to scene portions, streams and/or viewing directions. Thus the constraints can limited the maximum amount of resources allocated to receiving content corresponding to a particular direction and/or mandate a minimum amount of resources allocated to a direction so that the portion corresponding to a direction is updated at least infrequently or at specific times when action is occurring in a portion of the environment such as a rear area during an event intermission.

Maximum supportable data rate and/or the maximum available bandwidth 1444 is another input to selection step 1504. This information 1444 indicates the maximum bandwidth available for receiving content and/or the maximum supportable data rate that can be used to support the reception of one or a combination of content streams. The user's current head position 1407 and information about the available streams 1405, e.g., stream guide information such as that shown in FIG. 18 are also input to step 1504.

In stream selection step 1504 one or more content streams corresponding to a program or event, e.g., an ongoing real time event in some cases, are selected. The selection of one or more streams is based on the user's current head position, stream information such as stream bandwidth or stream data rate requirements, and/or information about the maximum supportable data rate or maximum supportable bandwidth. The bandwidth and/or data rate constraints 1503 which may be on a viewing direction or a stream priority basis may, and sometimes are, also considered and used in making stream selections in step 1504.

Exemplary stream selection step 1504 includes step 1506 in which content streams are prioritized based on a user's current and/or past head position. This may involve a call to a stream prioritization subroutine such as the one shown in FIG. 16.

Streams corresponding to the same environmental direction are allocated the same priority in some embodiments. Thus, multiple streams corresponding to content which corresponds to the same portion of the environment and/or viewing direction may be, and sometimes are, allocated the same priority. While the streams correspond to the same viewing direction in some cases the streams have different data rates with some streams providing high resolution stereoscopic content at high frame rates with lower resolution streams in some cases providing mono image content and/or low resolution images and/or supporting a low frame (image) rate. Thus while a particular direction may be considered high priority and all the streams providing content corresponding to the high priority direction being the same, a selection is then made in some embodiments on the amount of bandwidth available for receiving content corresponding to a particular direction.

After prioritization of the content streams operation proceeds from step 1506 to step 1508. In step 1508 the maximum bandwidth and/or data rate to be use fro a stream having the highest priority is determined. This determination may be made based on the bandwidth or other constraints 1503 which may indicate a maximum, minimum or portion of available reception resources to be allocated for the highest priority stream. In some embodiments the minimum bandwidth/data rate allocation for the highest priority stream is 50% or more but other allocations are possible.

In step 1510 the maximum bandwidth and/or data rate to be used for each stream having a lower priority is determined. In some embodiments at least 20% of the data rate or bandwidth is used for secondary or lower priority streams.

With the data rates to be used for streams of different priorities having been determined in steps 1508, 1510, operation proceeds to step 1512 in which a check is made to determine if the highest priority stream can be supported based on the maximum bandwidth and/or data rate for the highest priority stream. If any one of the streams corresponding to the highest priority can be supported the decision in step 1512 will be yes and operation proceeds to step 1514 where the highest quality stream corresponding to the highest priority will be selected. This normally involves selecting the highest data rate stream from the set of streams assigned the highest priority. Consider for example if streams in the forward direction are assigned the highest priority the highest data rate forward direction content stream will be selected which can be supported given the data rate available for the highest priority content stream.

Operation proceeds from step 1514 to step 1516. In step 1516 a determination is made as to whether a second highest priority stream can be supported. This involves, in some embodiments, determining how much bandwidth/data is available after the highest priority stream has been selected and how much of that bandwidth/data may be used for the second highest priority stream based on the received constraints. If no constraints have been placed on the second highest priority stream, the full amount of bandwidth/data reception capability can be used for the second highest priority stream. If in step 1516 it is determined that a second highest priority stream can be supported operation proceeds to step 1518 in which a second highest priority stream is selected, e.g., from a set of one or more streams assigned the second highest priority. Step 1518 may, and in some embodiments does, involves selecting the highest data rate stream that can be supported that has the second highest priority. For example, if the second highest priority corresponds to the right rear portion of the environment step 1518 would involve selecting the highest data rate stream that can be supported corresponding to the right rear portion of the environment.

While in most cases a highest priority and a secondary stream will be supported, there may be sufficient bandwidth remaining after selection of the two highest priority streams to receive some content corresponding to another portion of the environment, e.g., one not being viewed. Operation proceeds from step 1518 to step 1520 or directly from step 1516 to step 1520 if a second highest priority stream can not be supported.

In step 1520 a check is made as to whether a third highest priority stream can be supported, e.g., using the bandwidth/data reception resources available after the first and/or second priority streams have been selected. If in step 1520 it is determined that a third highest priority stream can be supported, operation proceeds to step 1522 in which a third highest priority stream is selected, e.g., using the remaining bandwidth/data rate that can be supported. Operation proceeds from step 1522 to step 1524, or directly from step 1520 to step 1524, if a third highest priority stream can not be supported given the available bandwidth and/or received data and/or bandwidth allocation constraints.

In step 1524 a check is made to determine if, after the other stream selections there is any bandwidth, e.g., capacity to receive data, remaining that can be used to receive additional content. If additional bandwidth is remaining, operation proceeds to step 1526 in which one or more lower priority streams is selected to use the remaining available bandwidth/data rate. From step 1526 operation proceeds to step 1530. Operation proceeds from step 1524 to return step 1530 if no additional bandwidth is available.

Return step 1530 causes processing to return to the point at which stream selection subroutine 1500 was called, e.g., with the newly selected set of streams having been determined by routine 1500.

Figure 16:
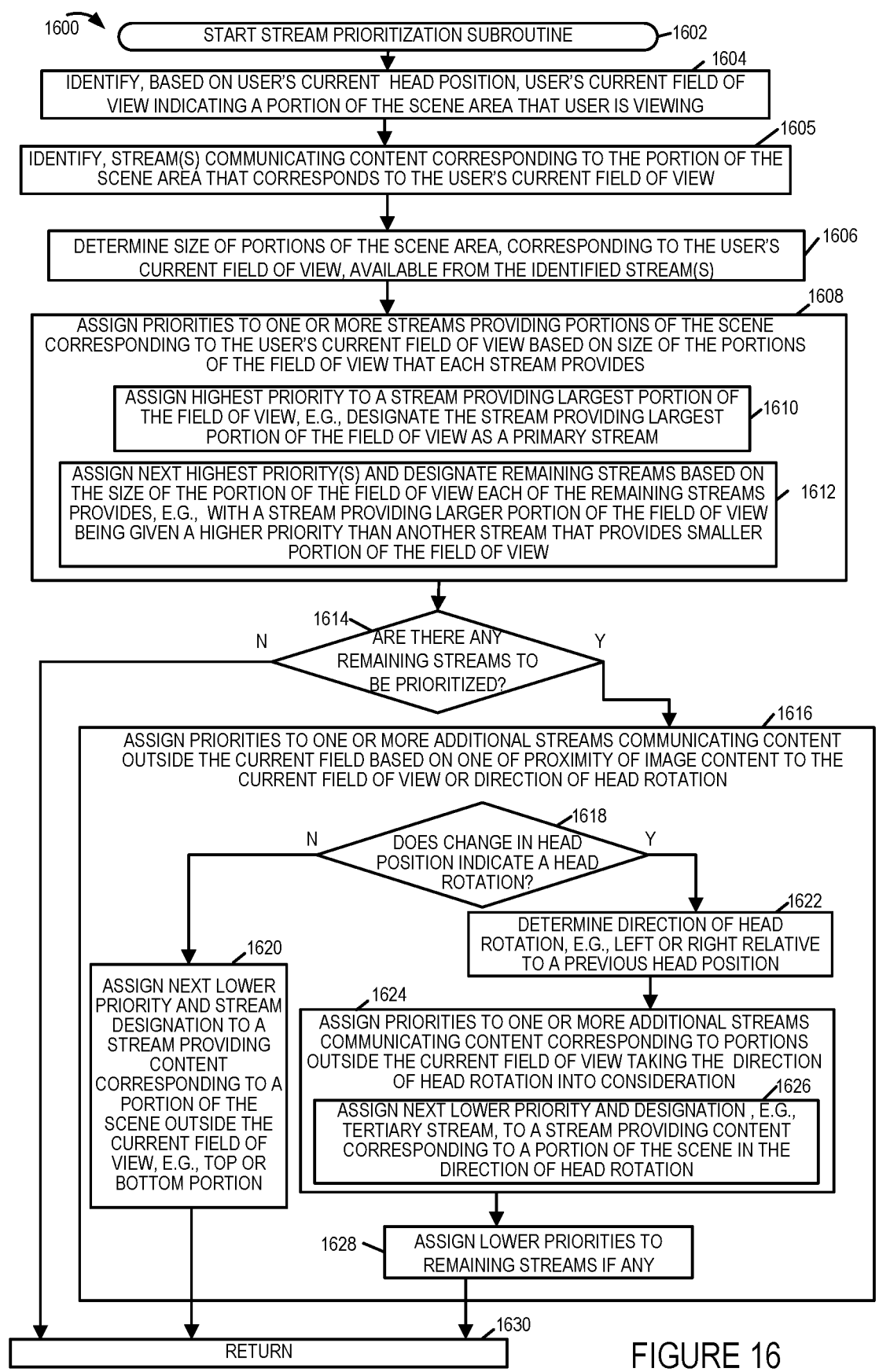
FIG. 16 is a flowchart illustrating the steps of a stream prioritization subroutine in accordance with an exemplary embodiment.

FIG. 16 is a flowchart illustrating the steps of a stream prioritization subroutine in accordance with an exemplary embodiment. FIG. 1600 illustrates an exemplary stream prioritization routine that maybe used, e.g., called, by one or more of the other routines or subroutines described herein. For example step 1506 of FIG. 15 may be implemented by a call to subroutine 1600. Stream prioritization subroutine 1600 begins in step 1602 when the routine is called. Operation proceeds from start step 1602 to step 1604. In step 1604 a user's current field of view is determined based on the user's detected head position. Given that a user's field of view is less than 180 degrees, the current field of view may correspond to a portion of the environment captured from a single camera position, e.g., the forward looking camera position. However, when a user moves his head, e.g., rotates it left or right and/or looks up or down, the user's field of view may correspond to portions of the environment captured by cameras located at different camera positions. For example, when looking at a portion of the environment corresponding to the point where images captured by different camera's meet or overlap the users field of view may correspond to content which will be communicated in two different streams. The stream providing images corresponding to the largest portion of the field of view will normally be given the highest priority in some embodiments.

With the user's field of view having been determined in step 1604, operation proceeds to step 1605 in which streams communicating content, e.g., mono images or stereoscopic image pairs including left and right eye images, corresponding to the user's current field of view are identified. Operation then proceeds to step 1606 in which the size of the portion or portions, e.g., image portions, of the scene area, corresponding to the users current field of view that are available from the identified streams. Thus, at the end of step 1606 information on which streams provide image content corresponding to the current field of view and the relative size of the portions is available and can be used to rank, e.g., prioritize the streams.

Operation proceeds from steps 1606 to step 1608. In step 1608 priorities are assigned to one or more streams which provide image content corresponding to the user's current field of view. The prioritization, e.g., ranking, is base don the size of the portion or portions of the user's field of view that a stream provides. For example, a stream providing image content corresponding to 80% of the user's field of view will be ranked higher than a stream providing image content corresponding to 15% of the user's field of view and a stream providing the remaining 5%, e.g., a top or bottom portion, will be assigned a third priority which is lower than the highest priority allocated to the stream providing image(s) corresponding to the 80% portion of the field of view.

Step 1608 may, and in some embodiments does, includes step 1610 and/or step 1612. In step 1610, the highest priority is assigned to a stream providing the largest portion of the field of view. Step 1610 may include designating the stream providing the largest portion of the filed of vie as a primary stream. Step 1612 includes assigning the next highest priority or priorities to streams which contribute portions to the field of view which are outside the portion contributed by the highest priority stream. Such streams are prioritized in step 1612 based on the size of the portion which they can contribute to the current field of view with streams which can contribute smaller portions being assigned lower priorities.

Assuming that multiple streams, e.g., having different data rates, can contribute the same portion to the field of view, albeit at potentially different resolutions or frame rates, multiple streams may be assigned the same priority, e.g., streams corresponding to the forward view may be assigned the same priority, streams providing the left rear view maybe assigned the same priority, e.g., a different priority than assigned to the forward streams and streams providing the right rear view may be provided the same priority, e.g., a different priority than that assigned to the forward or left rear view streams.

Thus, in step 1608 the streams which contribute to the field of view will have been ranked, i.e. prioritized. The prioritization may be expressed by listing the streams in a ranked list with the primary stream(s) being assigned the highest priority and other streams being assigned lower priority.

Not all streams may correspond to the field of view. For example a top or both scene portion may be outside the field of view and thus the streams providing such views may not have been prioritized in step 1608. Operation proceeds from step 1608 to step 1614. In step 1614 a determination is made as to whether there are any remaining streams to be prioritized. If there are no remaining streams to be prioritized, e.g., because they all corresponded to the user's current field of view, operation proceeds to return step 1630. However, if in step 1614 it is determined that one or more streams remain to be prioritized, operation proceeds to step 1616.

In step 1616, priorities are assigned to one or more additional streams communicating content, e.g., streams outside the current filed of view. The prioritization performed in step 161 is based, in some embodiments, on the proximity of content provided by a stream being prioritized to the content visible in the current field of view and/or based on a user's current or past direction of head rotation. For example if a stream provides image content corresponding to a portion of the environment immediately adjacent the current field of view, in some embodiments it will be assigned a higher priority than a stream which provide content corresponding to an image portion further away from the user's current field of view. Similarly, a stream providing image content in the direction of a user's head rotation maybe given a higher priority than content in a direction of rotation away from the user's detected head rotation under the assumption that content in the direction of head rotation is more likely to quickly come into the user's field of view than content in the opposite direction away from the detected direction of head rotation.

In at least one embodiment step 1616 includes step 1618 in which a check is made to determine if a change in head position indicated a head rotation, e.g., a rotation left or right as opposed to a tipping of the head up or down. If no head rotation is detected in step 1618 operation proceeds to step 1620 in which streams are prioritized based on, in some embodiments, which portion of image data they provide relative to the user's current field of view. Streams providing top and/or bottom portions may by default be assigned lower priority than streams providing left or right rear portions when the top and bottom portions as well as the left or right rear portions are out of view. Operation proceeds from step 1620 to return step 1630.

If in step 1618 it is determined that a user head rotation has been detected, operation proceeds to step 1622. In step 1622 the direction of the head rotation is determined, e.g., whether the user's head is turning to the left or right. This allows the direction of head rotation to be taken into consideration since the next portion of the environment to come into the user's view is often more likely to be in the direction of head rotation rather than away from it.

Operation proceeds from step 1622 to step 1624 in which priorities are assigned to one or more content streams, e.g., streams outside the field of view, based on the direction of head rotation. In at least one embodiment step 1624 includes step 1626 in which the next lowest unused priority is assigned to a stream providing content corresponding to a portion of the environment in the direction of head rotation. For example, if a user looking at the forward portion of the environment is turning his head to the right, the stream providing right rear content outside the field of view would be allocated a higher priority than a stream providing left rear content which is also outside the filed of view. Operation proceeds from step 1624 to step 1628 where remaining streams which have not already been prioritized are assigned lower priorities, indicative of lower importance, than streams to which priorities have already been assigned.

Operation proceeds from step 1628 to return step 1630. By the time return step 1630 has been reached, content streams will have been prioritized, e.g., ranked or ordered, according to priority.

Figure 17:
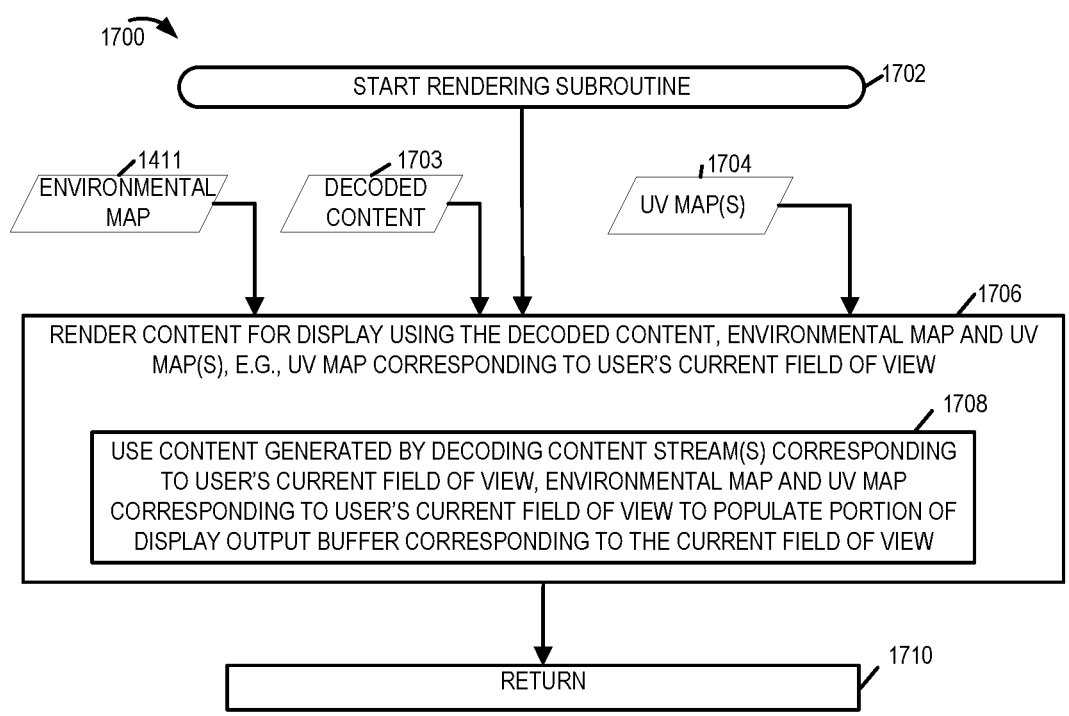
FIG. 17 is a flowchart illustrating the steps of a rendering subroutine in accordance with an exemplary embodiment.

FIG. 17 is a flowchart illustrating the steps 1700 of a rendering subroutine in accordance with an exemplary embodiment.

The rendering subroutine 1700 may be called by one or more routines when image rendering is required. In the case of stereoscopic content a separate image is rendered for each of a user's left and right eyes. In the case of mono content a single image is rendered and used for each of the user's left and right eyes. The rendering often involves the combining of image content form one or multiple streams. Thus while some portions of the environment may be provided as mono content, other portions may be provided as stereoscopic content in which case different left and right eye images may be rendered with some of the content being in stereo and other content being in mono but with a single image being generated for each of the left and right eye images when at least a portion of the environment is being presented as stereoscopic content.

Rendering routine 1700 begins in start step 1702 and proceeds to rendering step 1706. The input to the rendering step 1706 includes an environmental map 1411, decoded image content 1703 corresponding to one or more view, and one or more UV maps 1704 used to map one or more decoded images or images portions onto the surface defined by the environmental map 1411. As discussed above, the environmental map 1411 may default to a sphere with the images being mapped to the inside surface of the sphere, in the case where a more complicated geometry is not provided.

In some embodiments rendering step 1706 includes step 1708 which includes using content generated by decoding images included in one or more content streams corresponding to a user's current filed of view and the environmental map as well as at least one UV map to generate at least one image corresponding to the user's current field of view. In the case of stereoscopic, e.g., 3D image content, rendering will result in left and right eye images being generated in a format that is suitable for display. Differences in the rendered left and right eye images cause, in some embodiments, the user to perceive the images in 3D.

Operation proceeds from step 1706 to step 1710 which is a return step which causes the rendered images to be returned to the program or routine to be supplied to a display device, stored and/or output.

Rendering subroutine 1700 may be called each time a frame or updated version of the filed of view is to be displayed. Thus rendering normally occurs at a rate consistent with the image, e.g., frame, display rate.

FIG. 18 illustrates an exemplary table 1800 including stream information corresponding to a plurality of content streams. The stream information included in the exemplary table 1800 in some embodiments is received as part of guide information, e.g., program guide, providing information on content streams that the playback system may select to receive. Legend 1840 includes information indicating the meaning of various letters used as abbreviations in the information includes in the table 1800.

The information included in the table 1800 can be used to access the content streams to which the information corresponds. As will be discussed in some embodiments the stream information includes, for a plurality of available content streams, one of a multicast address of a multicast group which can be joined to receive a given corresponding content stream, information which can be used to request access to a switched digital video channel used to provide a given content stream, or channel tuning information which can be used to control a tuner of the playback system to tune to a broadcast channel on which a given content stream is broadcast.

In table 1800 each row corresponds to an individual content stream communicating content, with the content stream to which a row corresponds being identified by the stream identifier shown in the corresponding entry in column 1812. Each entry in column 1804 identifies program content communicated by an individual content stream to which the row corresponds. As can be appreciated from table 1800 a first group of rows 1820 corresponds to program content "SOCCER" which may indicate the program/event title as shown in the corresponding entries in the column 1804. There may be a plurality of such groups corresponding to various different programs/events. Each group includes content streams each of which corresponds to a viewing direction and support a given data rate as will be discussed. For simplicity only two groups are shown in the figure with the rows corresponding to the second group 1822 being only partially shown just to illustrate the concept. The second group of rows 1822 corresponds to program content "HI" as indicated by the corresponding entries in the column 1804.

Each entry in the column 1806 indicates a portion of a scene area, e.g., zone of the 360 degree scene area 1200, communicated by a corresponding content stream. Thus the first three rows in the group 1820 while each corresponding to different content stream communicates front scene portion (e.g., which maps to Zone 1 shown in FIG. 12 covering 270° to 90° viewing area). The next three rows in the group 1820 while each corresponding to different content stream communicates rear right scene portion (e.g., which maps to Zone 2 shown in FIG. 12 covering 30° to 210° viewing area). The last three rows in the group 1820 while each corresponding to different content stream communicates rear left scene portion (e.g., which maps to Zone 3 shown in FIG. 12 covering 150° to 330° viewing area).

Each entry in the column 1808 indicates the data rate that the corresponding content stream supports. Each entry in the column 1810 indicates a multicast group identifier/address of a multicast group which can be joined to receive a corresponding content stream identified by the stream identifier shown in the corresponding entry in column 1812. Each entry in the column 1814 includes a stream descriptor for a corresponding content stream identified by the stream identifier shown in the corresponding entry in column 1812. Each entry in the column 1816 includes access information, e.g., tuning parameters and/or other access parameters, which can be used to access or request a corresponding content stream.

As can be appreciated from the exemplary table 1800, in the illustrated example there are multiple, e.g., three, different versions of each content stream corresponding to a given viewing direction that are available for use in playback, with each version of a content stream supporting a different data rate. Thus a playback system may make a selection of one or more streams to use in playback based on one or more factors, e.g., such as supported bandwidth, data rate, user head position etc., in accordance with the features of the present invention as discussed in detail with regard to FIGS. 14-17.

To more clearly understand how the information in table 1800 can be utilized by a playback system to select and/or access one or more content streams, consider the first row in the group 1820 and the first entry in each of the columns 1804, 1806, 1808, 1810, 1812, 1814 and 1816. The first entry of column 1804 indicates that the event/program "SOCCER" communicated by a first content steam which is identified by the stream identifier SID' included in column 1812. The corresponding entry in column 1806 indicates that the first stream communicates content corresponding to the front scene portion (e.g., 270° to 90° viewing area). This viewing area information is used by the playback system to identify the one or more streams which communicate content corresponding to a user/viewer's current head position which corresponds to a current field of view. Continuing with the example, the corresponding first entry in column 1808 indicates that the first content stream supports and/or requires data rate D1. The corresponding entry in column 1810 indicates that the first content stream can be accessed by joining a multicast group M1, with M1 indicating the multicast group address and/or identifier which maps to an address. The corresponding entry in column 1814 includes the stream descriptor "$V_1C_1D_1F_1$" corresponding to the first content stream which indicates a camera viewing angle ($V_1$) to which the first stream corresponds, a codec type ($C_1$), a supported data rate ($D_1$) and frame rate ($F_1$) corresponding to the first stream. The corresponding entry in the last column 1816 indicates access tuning parameters and/or other access parameters (shown as A123) which can be used to access or request the first content stream.

With such information discussed above regarding available content streams that can be used, a playback system such as playback system 1900 can select and access one or more content streams for use in playback in accordance with the features of the invention. For better understanding consider one simple example where playback system determines that the user head position indicates that user is looking at the front portion of a 360 degree scene. In such a case in one embodiment the playback system selects at least one content stream communicating the front scene portion. Depending on various other factors as discussed with regard to FIGS. 14-17 such as available bandwidth, supportable data rate, stream bandwidth and/or data rate constraints the playback system can select a stream out of the three different available streams ($S_1D_1$, $S_1D_2$, $S_1D_3$) which communicate the front scene portion. If constraints permit, the playback system will select highest quality stream out of the three corresponding from the plurality of content streams corresponding to the front scene portion, e.g., stream $S_1D_1$. The information provided in table 1800 facilitates selection of the appropriate stream for use in playback since at least some of the information that can be used to make the selection is provided by the stream information 1800. After stream selection, the playback system can again use the stream information 1800 to initiate content delivery, e.g., content receipt, by joining the multicast group, e.g., M1, corresponding to the selected stream or by using the access information to obtain the content stream.

FIG. 19 illustrates a playback system 1900 implemented in accordance with the present invention which can be used to receive, decode, store and display imaging content received from a content delivery system. The system 1900 can be implemented is a single playback device 1900' which includes a display 1902 or as a combination of elements such as an external display, e.g., a head mounted display 1905, coupled to a computer system 1900'.

The playback system 1900, in at least some embodiments includes a 3D head mounted display. The head mounted display maybe implemented using the OCULUS RIFT™ VR (virtual reality) headset which may include the head mounted display 1905. Other head mounted displays may also be used. In some embodiments a head mounted helmet or other head mounting device in which one or more display screens are used to display content to a user's left and right eyes is used as device 1905. By displaying different images to the left and right eyes on a single screen with the head mount being configured to expose different portions of the single screen to different eyes, a single display can be used to display left and right eye images which will be perceived separately by the viewers left and right eyes. In some embodiments a cell phone screen is used as the display of the head mounted display device. In at least some such embodiments a cell phone is inserted into the head mounting device and the cell phone is used to display images. In some embodiments the display device 1905 may be part of a 3D display apparatus such as the Oculus Rift.

The playback system 1900 has the ability to decode received encoded image data, e.g., left and right eye images and/or mono (single images) corresponding to different portions of an environment or scene and generate 3D image content for display to the customer, e.g., by rendering and displaying different left and right eye views which are perceived by the user as a 3D image. The playback system 1900 in some embodiments is located at a customer premise location such as a home or office but may be located at an image capture site as well. The system 1900 can perform signal reception, decoding, display and/or other operations in accordance with the invention.

The system 1900 includes a display 1902, a display device interface 1903, input device 1904, input/output (I/O) interface 1906, a processor 1908, network interface 1910 and a memory 1912. The various components of the system 1900 are coupled together via bus 1909 which allows for data to be communicated between the components of the system 1900 and/or by other connections or through a wireless interface. While in some embodiments display 1902 is included as an optional element as illustrated using the dashed box, in some embodiments an external display device 1905, e.g., a head mounted stereoscopic display device, can be coupled to the playback device via the display device interface 1903.

For example, in a case where a cell phone processor is used as the processor 1908 and the cell phone generates and displays images in a head mount, the system may include as part of the head mount device the processor 1908, display 1902 and memory 1912. The processor 1908, display 1902 and memory 1912 may all be part of the cell phone. In other embodiments of the system 1900, the processor 1908 may be part of a gaming system such as an XBOX or PS4 with the display 1905 being mounted in a head mounting device and coupled to the gaming system. Whether the processor 1908 or memory 1912 are located in the device which is worn on the head or not is not critical and, as can be appreciated, while in some cases it may be convenient to co-locate the processor in the headgear, from a power, heat and weight perspective it can be desirable to in at least some cases to have the processor 1908 and memory coupled to the head gear which includes the display.

While various embodiments contemplate a head mounted display 1905 or 1902, the methods and apparatus can also be used with non-head mounted displays which can support 3D image. Accordingly, while in many embodiments the system 1900 includes a head mounted display, it can also be implemented with a non-head mounted display.

The operator of the playback system 1900 may control one or more parameters via input device 1904 and/or select operations to be performed, e.g., select to display 3D scene. Via the I/O interface 1906, the system 1900 can be coupled to external devices and or exchange signals and/or information with other devices. In some embodiments via the I/O interface 1906 the system 1900 can receive images captured by various cameras which may be part of a camera rig such as camera rig 900.

The processor 1908, e.g., a CPU, executes routines 1914 and uses the various modules to control the playback system 1900 to operate in accordance with the invention. The processor 1908 is responsible for controlling the overall general operation of the playback system 1900. In various some embodiments the processor 1908 is configured to perform functions that have been discussed as being performed by a playback device.

Via the network interface 1610 the system 1900 communicates and/or receives and/or signals and/or information (e.g., including images and/or video content) to various external devices over a communications network, e.g., such as communications network 105. The network interface 1910 includes a receiver 1911 and a transmitter 1913 via which the receiving and transmitting operations are performed. In some embodiments the system receives one or more selected content streams via the network interface 1910 from a content provider. In some embodiments the system 1900 receives, via the receiver 1911 of interface 1910, one or more selected content streams to use for playback. The received content stream may be received as encoded data, e.g., encoded scene portions 1952. The receiver 1911 is further configured to receive stream information 1946 and/or initialization data, e.g., as part of a program guide. The system 1900 further receives, e.g., via the receiver 1911, bandwidth and/or data rate allocation control information 1952 which includes bandwidth constraints for different viewing directions, individual bandwidth constraints specifying a maximum bandwidth to be used for receiving one or more content streams providing content corresponding to a viewing direction corresponding to the individual bandwidth constraint. In some embodiments the receiver 1911 is further configured to receive at least one environmental map, e.g., 3D depth map defining 3D surface, and one or more UV maps to be used for mapping image content onto at least a portion of the 3D surface, e.g., during the initialization phase or other time. In some embodiments receiver 1911 receives a first UV map corresponding to a first portion of a scene environment, a second UV map corresponding to a second portion of the scene environment, a third UV map corresponding to a third portion, a fourth UV corresponding to a fourth portion and a fifth map corresponding to a fifth portion of the scene environment. In some embodiments during the initialization the system 1900 receives, e.g., via the receiver of interface 1910, content, e.g., an image, corresponding to the one or more of the first, second, third, fourth and fifth portions of the scene.

The memory 1912 includes various modules, e.g., routines, which when executed by the processor 1908 control the playback system 1900 to perform decoding and output operations in accordance with the invention. The memory 1912 includes control routines 1914, a head position determination module 1916, a current viewing position initialization module 1918, a decoder module 1920, a current selected stream initialization module 1922, a content delivery initiation module 1924, image buffer(s) 1926, image buffer update module 1928, image rendering module 1930 also referred to as a image generation module, available bandwidth and/or supported data rate determination module 1932, head position change determination module 1934, available bandwidth and/or supported data rate change determination module 1936, stream selection module 1938, selected stream set change determination module 1940, selected stream set update module 1942, a stream(s) termination module 1944, and data/information including received stream information 1946, received bandwidth and/ or data rate allocation information 1948, determined current maximum available bandwidth and/or supportable data rate 1950, received encoded image content 1952, received environmental map 1954, received UV map(s) 1956, decoded image content 1958, and generated 3D content 1960.

The control routines 1914 include device control routines and communications routines to control the operation of the system 1900. The head position determination module 1916 is configured to determine a current head position of the user, e.g., position of the head mounted display. The head position determination module 1916 maybe integrated with and/or work in coordination with a position sensor which may be, e.g., on the headgear including the head mounted display. The current viewing position initialization module 1918 is configured to initialize, e.g., during an initialization phase, a current viewing position of the user to be the forward (0 degree) environmental viewing position by the setting the detected user's current head position to be the forward (zero degree) viewing position.

The decoder module 1920 is configured to decode encoded image content 1952 received from the content delivery system 700 to produce decoded image data 1958. The decoded image data 1958 may include decoded stereoscopic scene and/or decoded scene portions. The decoded content is stored in one or more image buffer(s) 1926 in some embodiments. The current selected stream initialization module 1922 is configured to initialize a current set of selected one or more content streams to be received. The current selected stream initialization module 1922 is configured to set a current selected set of streams to be a first steam communicating content corresponding to the forward/front portion of the environment/scene.

The content delivery initiation module 1924 is configured to initiate delivery of selected content stream(s). In some embodiments the content delivery initiation module 1924 initiates delivery of content streams in the selected set which are not already being received. In some embodiments the content delivery initiation module 1924 is configured to send a request signal to join a multicast group corresponding to a selected content stream, e.g., multicast group(s) corresponding to content streams communicating content corresponding to the current selected set of streams. In some other embodiments the content delivery initiation module 1924 is configured to generate and send a request, to a device in a network, requesting delivery of a switched digital channel on which a selected content stream is communicated.

The image buffer update module 1928 is configured to update image buffer(s) 1926 with updated content when updated content, e.g., communicated by selected set of content streams, is received and decoded.

The image rendering module 1930 generates 3D image, e.g., left and right eye images which are displayed in a manner that will be perceived as a 3D image, in accordance with the features of the invention, e.g., using the decoded image content 1958, for display to the user on the display 1902 and/or the display device 1905. In some embodiments the image rendering module 1930 is configured to render content for display using the decoded image content 1958, an environmental map 1954 and a UV map corresponding to current viewing area of the user. Thus in some embodiments the image rendering module 1930 is configured to perform the functions discussed with regard to the steps shown in FIG. 17. The generated image content 1960 is the output of the 3D image generation module 1930. Thus the rendering module 1930 renders the 3D image content 1960 to the display. In some embodiments the image rendering module 1930 is configured to output one or more generated images, e.g., to a display device or to another device. The generated images may be output via network interface 1910 and/or display device interface 1903.

The available bandwidth and/or supported data rate determination module 1932 is configured to determine current maximum available bandwidth and/or current maximum supportable data rate that may be available at a given time, e.g., for receiving content streams. As available bandwidth and/or supportable data rate may change over time due to changes in communications channel conditions or network issues, in some embodiments the determination module 1932 performs monitoring and/or determination on an ongoing basis to detect changes in the available bandwidth and/or supported data rate. The determined current maximum supportable data rate and/or bandwidth 1950 is an output of the determination module 1932 and may be updated when need be.

The head position change determination module 1934 is configured to determine if there has been a change in user's head position, e.g., by checking and comparing changes in the output of the head position determination module 1916. The available bandwidth and/or supported data rate change determination module 1936 is configured to detect if there is any change in the available bandwidth and/or supported data rate compared to the current maximum available bandwidth and/or current maximum supportable data rate determined by the determination module 1932.

Figure 23:
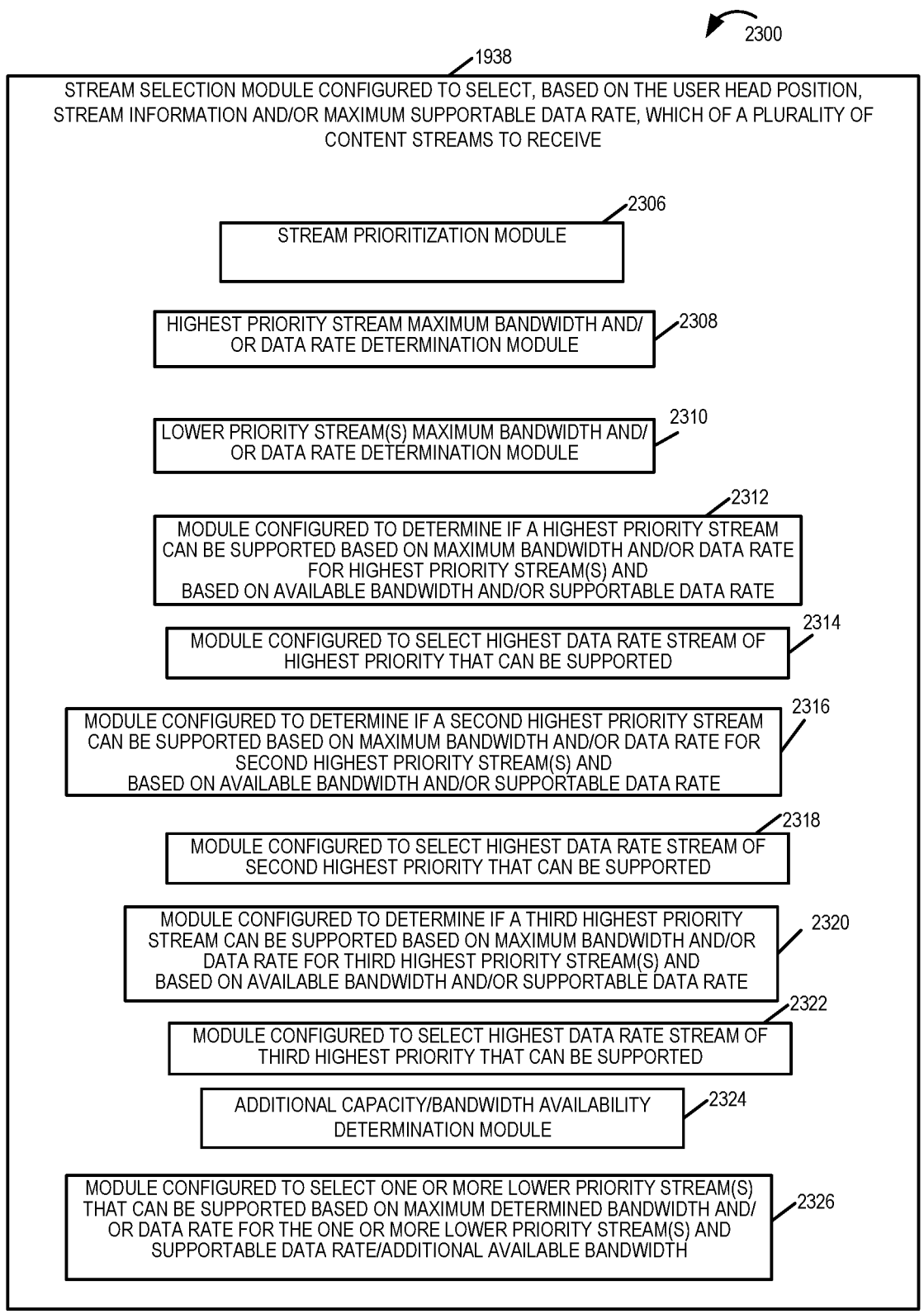
FIG. 23 is a drawing showing an exemplary stream selection module which can be used in the playback system of FIG. 19 in accordance with some embodiments.

The stream selection module 1938 is configured to select, based on a current head position of the user, which of a plurality of content streams to receive for use in playback at a given time. Based on the changes in user's current head position and/or other factors the stream selection module 1938 may select different stream(s) at different times. The current selected set of streams 1961 is the output of the stream selection module 1938 and indicates a set of content streams currently selected for receiving. In some embodiments the stream selection module 1938 includes a plurality of sub-modules which are configured to perform various functions as part of stream selection operation. FIG. 23 illustrates the stream selection module 1938 and the various modules included therein in greater detail and will be discussed later.

The selected stream set change determination module 1940 is configured to determine if there has been a change in the current selected set of streams 1961, e.g., due to the selection module selecting one or more additional content stream an/or due to one or more streams being received having been terminated/stopped. The selected stream set update module 1942 is configured to update the current selected stream set 1961 to reflect any changes to the selected set of streams when there are changes to the selected set of streams, e.g., due to addition or termination of content streams to the selected set of streams 1961. The stream(s) termination module 1944 is configured to terminate/stop receiving one or more content streams which may previously were being received but are no longer in the current selected set of streams 1961, e.g., due to the current selected set of streams 1961 being updated because of changes in the selection of streams.

The stream information 1946 includes information regarding a plurality of content streams that may be available for receiving and use in playback. The information included in stream information 1946 is the same or similar to that shown in FIG. 18 and discussed earlier. The received bandwidth and/or data rate allocation control information 1948 includes bandwidth constraints for different viewing directions and/or information indicating constraints on data rates corresponding to content streams providing content for various different viewing directions. The determined current maximum supportable data rate and/or bandwidth 1950 indicates a maximum supportable data rate and/or bandwidth determined by the playback system 1900 at a given time.

The received environmental map 1954 includes the 3D depth map of the environment defining a 3D surface. One or more such depth maps corresponding to the environment of interest may be received by the playback system 1900 in some embodiments. The received UV map(s) 1956 includes one or more UV maps corresponding to portions of the environment/scene of interest. The decoded data 1958 includes the data decoded in accordance with the invention by the decoder 1920. The decoded data 1958 includes content including scene or scene portions of the environment communicated by the selected set of streams.

In some embodiments the various modules discussed above are implemented as software modules. In other embodiments the modules are implemented in hardware, e.g., as individual circuits with each module being implemented as a circuit for performing the function to which the module corresponds. In still other embodiments the modules are implemented using a combination of software and hardware.

While shown in FIG. 19 example to be included in the memory 1912, the modules shown included in the playback device 1900 can, and in some embodiments are, implemented fully in hardware within the processor 1908, e.g., as individual circuits. The modules can, and in some embodiments are, implemented fully in hardware, e.g., as individual circuits corresponding to the different modules. In other embodiments some of the modules are implemented, e.g., as circuits, within the processor 1908 with other modules being implemented, e.g., as circuits, external to and coupled to the processor 1908. As should be appreciated the level of integration of modules on the processor and/or with some modules being external to the processor may be one of design choice. Alternatively, rather than being implemented as circuits, all or some of the modules may be implemented in software and stored in the memory 1912 of the system 1900, with the modules controlling operation of system 1900 to implement the functions corresponding to the modules when the modules are executed by a processor, e.g., processor 1908. In still other embodiments, various modules are implemented as a combination of hardware and software, e.g., with another circuit external to the processor providing input to the processor 1908 which then under software control operates to perform a portion of a module's function.

FIG. 23 illustrates the stream selection module 1938 used in the playback system 1900 and the various modules included therein in greater detail. The stream selection module is configured to select one or more content streams in accordance with the methods of the present invention as discussed in detail with regard to FIGS. 14-16. In some embodiments the stream selection module is configured to select, based on the user's head position, stream information 1946 and/or maximum supportable data rate, which of a plurality of content streams to receive. In some embodiments the stream selection module 1938 includes a stream prioritization module 2306 configured to prioritize content streams based on the head position of the user. The output of the stream prioritization module 2306 is, e.g., a prioritized list of content streams with assigned priorities. The stream prioritization module 2306 is discussed in further detail with regard to FIG. 24 below.

The stream selection module 1938 further includes a highest priority stream maximum bandwidth and/or data rate determination module 2308 configured to determine maximum bandwidth and/or data rate to be used for a stream having the highest priority, e.g., based on the bandwidth and/or data rate constraints, and a lower priority stream(s) maximum bandwidth and/or data rate determination module 2310 configured to determine maximum bandwidth and/or data rate to be used for each stream having lower priority. The determination modules 2308, 2310 use bandwidth control information 1948 and output of the stream prioritization module 2306 to perform the respective determinations in some embodiments. Thus the stream selection module 1938 may include one or more stream bandwidth determination modules configured to determine bandwidth for at least one content stream based on a bandwidth constraint communicated to the playback system, e.g., from a network device/server.

The stream selection module 1938 further includes a module 2312 configured to determine if a highest priority stream can be supported based on the determined maximum bandwidth and/or data rate for highest priority stream(s) and based on available bandwidth and/or supportable data rate, and a module 2314 configured to select a highest data rate stream of highest priority that can be supported. In some embodiments the selection module 2314 is configured to select one content stream from a plurality of content streams assigned a highest priority, each content stream assigned the highest priority providing content corresponding to the same viewing direction, as part of being configured to select from a plurality of content streams having the same priority. In some embodiments the module 2314 is configured to select from a plurality of content streams having the same priority, e.g., highest priority, based on the determined amount of available bandwidth. Thus in some embodiments when a plurality of stream having the same priority are available, e.g., some with high data rate requirements compared to others which have lower data rate requirements, the selection module 2314 selects the highest quality stream, e.g., high data rate stream, if the available bandwidth and/or supportable data rate and the bandwidth constraints allow for such a selection.

The stream selection module 1938 further includes a module 2316 configured to determine if a second highest priority stream can be supported based on the determined maximum bandwidth and/or data rate for second highest priority stream(s) and based on available bandwidth (e.g., total available or remaining available) and/or supportable data rate, a module 2318 configured to select a highest data rate stream of second highest priority that can be supported, a module 2320 configured to determine if a third highest priority stream can be supported based on the determined maximum bandwidth and/or data rate for third highest priority stream(s) and based on available bandwidth (e.g., total available or remaining available) and/or supportable data rate, and a module 2322 configured to select a highest data rate stream of third highest priority that can be supported. Thus in some embodiments the stream selection module 1938 is configured to select one or more content streams having been assigned highest priorities, e.g., by the prioritization module 2306.

The stream selection module 1938 further includes an additional capacity/bandwidth availability determination module 2324 configured to determine if there is any remaining or additional available bandwidth for receiving additional content streams, e.g., after one or more higher priority streams have been selected for receipt. In some embodiments the stream selection module 1938 further includes a module 2326 configured select one or more lower priority streams that can be supported based on the maximum determined maximum bandwidth and/or data rate for the one or more lower priority streams and based on the available bandwidth and/or supportable data rate.

Figure 24:
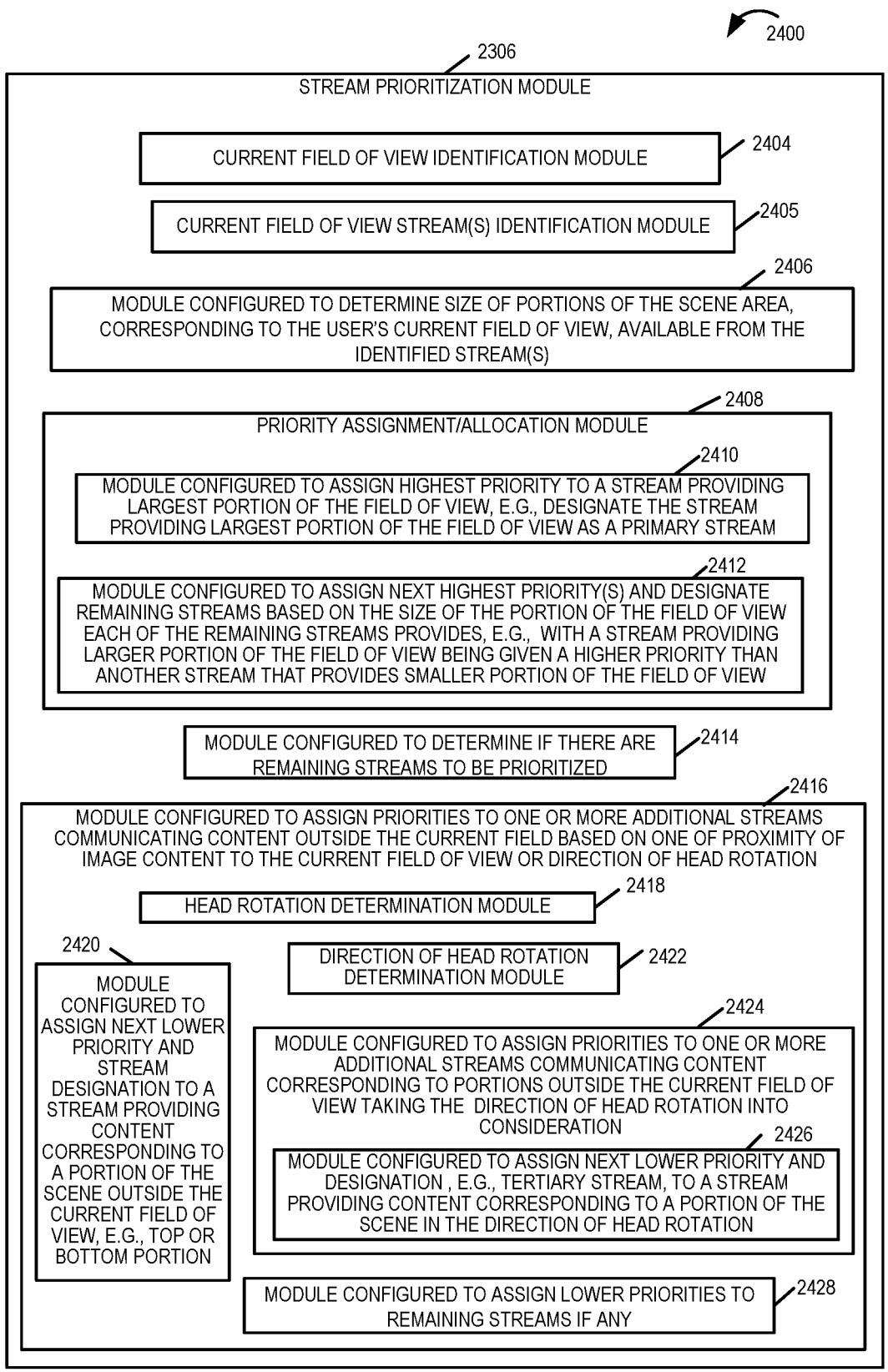
FIG. 24 is a drawing showing an exemplary stream prioritization module which can be implemented as part of the stream selection module of FIG. 23 or as an individual module.

FIG. 24 illustrates the stream prioritization module 2306 that may be implemented as part of, e.g., as a sub-module of, the stream selection module 1938 or as an individual module. The stream prioritization module 2306 configured to prioritize content streams based on the head position of the user. Once the content streams have been prioritized the stream selection module 1938 can perform the stream selection from the prioritized content streams. In some embodiments the stream prioritization module 2306 includes a current field of view identification module 2404 configured to identify user's current field of view indicating a portion of the scene area that the user is viewing based on user's current head position, and a current field of view stream(s) identification module 2404 configured to identify stream(s) communicating content corresponding to portion of the scene area that corresponds to the user's current field of view. The output of the current field of view stream(s) identification module 2404 is a list of identified streams which may be stored in the memory 1912 in some embodiments and the list may be updated as the user's head position and thus field of view changes. Thus in various embodiments in order to prioritize various available content streams first the user's current field of view is identified corresponding to the head position and the streams which communicate content corresponding to the field of view are identified.

In some embodiments the stream prioritization module 2306 further includes a module 2406 configured to determine size of portions of the scene area corresponding to the user's current field of view available from the identified stream(s), and a priority assignment/allocation module 2408 configured to assign priorities to one or more streams providing portions of the scene area corresponding to the user's current field of view based on the size of the portions that each stream provides. In some embodiments the priority assignment/allocation module 2408 includes a module 2410 configured to assign highest priority to a stream providing largest portion of the field of view, e.g., designate the stream providing largest portion of the scene corresponding to the current field of view as a primary stream. In some embodiments the priority assignment/allocation module 2408 further includes a module 2412 configured to assign next highest priority(s) and designate remaining streams (e.g., as secondary, tertiary etc.) based on the size of the portion of the field of view each of the remaining streams provides, e.g., with a stream providing larger portion of the field of view being given a higher priority and designation than another stream that provides smaller portion of the scene corresponding to the current field of view.

In some embodiments the stream prioritization module 2306 further includes a module 2414 configured to determine if there are remaining streams to be prioritized, e.g., streams providing content corresponding to scene area outside current field of view.

In some embodiments the stream prioritization module 2306 further includes a module 2416 configured to prioritize, e.g., assign priorities, to one or more additional streams providing content outside the user's current field of view based on one of proximity of image content to the current field of view or the direction of head rotation. In some embodiments the module 2416 is configured to prioritize one or more additional streams communicating content corresponding to portions outside said current field of view based on proximity of communicated image content to the current field of view, a content stream communicating image content in close proximity to an area of the current field of view being assigned a higher priority than a content stream outside and further away from the current field of view.

In some embodiments the module 2416 includes a head rotation determination module 2418 configured to determine if user's head rotation is detected, e.g., as part of change in the user's head position. In some but not all embodiments when a user looks up towards the sky or roof or down toward the ground, while there is a change in head position from a but such head movement is not considered a head rotation. In some embodiments the module 2416 is configured to prioritizes one or more additional content streams based on the direction of head rotation of the user, a content stream providing image content outside the current field of view but in the direction of head rotation being assigned a higher priority than another content stream providing image content outside the current field of view in a direction away from the direction of head rotation. In some such embodiments the module 2416 further includes a module 2420 configured to assign next lower priority (e.g., after higher priorities have been assigned to streams providing content corresponding to field of view) and stream designation, e.g., tertiary, to a stream providing content corresponding to a portion of the scene outside the current field of view, e.g., top or bottom portion of the scene environment. In some embodiments when it is determined that there is no head rotation, the head rotation determination module provides a control input to the module 2420 to assign priorities to the additional streams.

In some embodiments the module 2416 further includes a head rotation direction determination module 2422 configured to determine the direction of user's head rotation, e.g., to the left or right, relative to the previous head position. In some embodiments the module 2416 further includes a module 2424 configured to assign priorities to one or more additional streams communicating content corresponding to portions outside the current field of view taking the direction of head rotation into consideration. In some embodiments the module 2424 includes a module 2426 configured to assign next lower priority (e.g., next available priority from higher) and designation, e.g., tertiary stream, to a stream providing content corresponding to a portion of the scene in the direction of head rotation. Thus it should be appreciated that if head rotation is detected, then assignment of priorities to streams is performed based on the direction of head rotation in some embodiments. In some embodiments the module 2416 further includes an additional module 2428 configured to assign lower priorities to any of the remaining streams being considered.

While shown in the FIG. 19 embodiment as a single processor, e.g., computer, it should be appreciated that the processor 1908 may be implemented as one or more processors, e.g., computers. When implemented in software the modules include code, which when executed by the processor 1908, configure the processor 1908 to implement the function corresponding to the module. In embodiments where the various modules shown in FIGS. 19, 23 and 24 are stored in the memory 1912, the memory 1912 is a computer program product comprising a computer readable medium comprising code, e.g., individual code for each module, for causing at least one computer, e.g., processor 1908, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIGS. 19, 23 and 24 control and/or configure the system 1900 or elements therein such as the processor 1908, to perform the functions of corresponding steps illustrated and/or described in the method of flowchart 1400 of FIG. 14 and perform the functions of corresponding steps illustrated in FIGS. 15-17.

FIG. 20, comprising the combination of FIG. 20A, FIG. 20B, FIG. 20C, FIG. 20D, and FIG. 20E is a flowchart 2000 of an exemplary method of operating a content playback system in accordance with various exemplary embodiments. The content playback system is, e.g., a content playback device or a computer system coupled to a display, in accordance with various embodiments.

Operation of the exemplary method starts in step 2002 in which the content playback system is powered on and initialized. Operation proceeds from step 2002 to step 2004, in which the content playback system receives a first image corresponding to a first rear view portion of said environment. Operation proceeds from step 2004 to step 2006 in which the content playback system stores said received first image corresponding to said first rear view portion of said environment. Operation proceeds from step 2006 to step 2008 in which the content playback system receives one or more additional images corresponding to said first rear view portion of said environment including at least a second image corresponding to said first rear view portion of said environment. Operation proceeds from step 2008 to step 2010 in which the content playback system stores said received one or more additional images corresponding to said first rear view portion of said environment. Operation proceeds from step 2010 to step 2012.

In step 2012 the content playback system receives a first image corresponding to a second rear view portion of said environment. Operation proceeds from step 2012 to step 2014 in which the content playback system stores said received first image corresponding to said second rear view portion of said environment. Operation proceeds from step 2014 to step 2016 in which the content playback system receives one or more additional images corresponding to said second rear view portion of said environment including at least a second image corresponding to said second rear view portion of said environment. Operation proceeds from step 2016 to step 2018 in which the content playback system stores said received one or more additional images corresponding to said second rear view portion of said environment. Operation proceeds from step 2018 to step 2020.

In step 2020 the content playback system receives one or more images corresponding to a sky view portion of said environment. Operation proceeds from step 2020 to step 2022 in which the content playback system stores said received one or more images corresponding to said sky view portion of said environment. Operation proceeds from step 2022 to step 2024 in which the content playback system receives one or more images corresponding to a ground view portion of said environment. Operation proceeds from step 2024 to step 2026 in which the content playback system stores said received one or more images corresponding to said ground view portion of said environment. In some embodiments, sky view and ground view are used to refer to up and down directions with the respect to the viewer's nominal head direction perspective and apply to indoor environments as well as outdoor environments.

In some embodiments, images may be received corresponding to some but not necessarily all of the first rear view portion, second rear view portion, sky view portion and ground view portion, e.g., depending upon the particular embodiment.

Operation proceeds from step 2026, via connecting node A 2028, to step 2030, to step 2034, and via connecting node B 2036, to steps 2028, 2040, 2042, 2044, 2046, 2048, 2050 and 2052. Returning to step 2030 in step 2030, the content playback system determines a head position of a viewer, said head position corresponding to a current field of view. Operation proceeds from step 2030 to step 2032 in which the content playback system determines a current field of view for said viewer based on the determined head position. Operation proceeds from step 2032 to step 2030. Steps 2030 and 2032 are performed repetitively, e.g., on an ongoing basis with the current field of view being updated, e.g., refreshed. The determined current field of view is available to be used in the generation of output images.

In step 2034 the content playback system receives a first content stream providing content corresponding to a first portion, e.g., a forward portion view, of an environment.

In step 2038 the content playback system receives control information indicating which of a plurality of previously communicated images corresponding to said first rear view portion of said environment should be displayed during a playback time as measured with respect to playback time indicated in said first content stream. In step 2040 the content playback system receives image selection information indicating which of a plurality of images corresponding to said first rear view portion of the environment should be used during a portion of said event.

In step 2042 the content playback system receives control information indicating which of a plurality of previously communicated images corresponding to said second rear view portion of said environment should be displayed during a playback time as measured with respect to playback time indicated in said first content stream. In step 2044 the content playback system receives image selection information indicating which of a plurality of images corresponding to said second rear view portion of the environment should be used during a portion of said event.

In step 2046 the content playback device receives control information indicating which of a plurality of previously communicated images corresponding to said sky view portion of said environment should be displayed during a playback time as measured with respect to playback time indicated in said first content stream. In step 2048 the content playback system receives image selection information indicating which of a plurality of images corresponding to said sky view portion of the environment should be used during a portion of said event.

In step 2050 the content playback system receives control information indicating which of a plurality of previously communicated images corresponding to said ground view portion of said environment should be displayed during a playback time as measured with respect to playback time indicated in said first content stream. In step 2052 the content playback device receives image selection information indicating which of a plurality of images corresponding to said ground view portion of the environment should be used during a portion of said event.

Operation proceeds from step 2032, step 2034, and steps (2038, 2040, 2042, 2044, 2046, 2048, 2050 and 2052) via connecting node C 2054, which may be performed in parallel, via connecting node D 2056, to step 2058.

In some embodiments, control information from steps 2038, 2040, 2042, 2044, 2046, 2048, 2050 and 2052 is sent slightly prior, e.g., in a piecemeal fashion, to corresponding first stream content of step 2034 for which the control information is to be used. In some other embodiments, a block of control information is received prior to or concurrent with the start of the receiving the first content stream.

In step 2058 the content playback system generates one or more output images corresponding to the current field of view based on at least one of: received content from the first content stream corresponding to the first portion view, e.g., forward portion view, of the environment, a stored received image corresponding to a first rear view portion of the environment, a stored received image corresponding to a second rear view portion of the environment, a stored received image corresponding to a sky view portion of the environment, a stored received image corresponding to a ground view portion of the environment, or a synthesized image corresponding to a portion of the current field of view for which an image is not available. Step 2058 includes steps 2060, 2062, 2064, 2066, 2068, 2076, and 2078.

In step 2060 the content playback system determines, based on the current field of view, a set of view portions, e.g., for which there is available data, to be used in generating the one or more output images. Some exemplary determined sets include, e.g., { }, {front view portion}, {first rear view portion}, {second rear view portion}, {sky view portion}, {ground view portion}, {front view portion, sky view portion}, {front view portion, ground view portion}, {front view portion, first rear view portion}, {front view portion, second rear view portion}, {front view portion, first rear view portion, sky portion}, {front view portion, second rear view portion, sky view portion}, {front view portion, first rear view portion, ground view portion}, {front view portion, second rear view portion, ground view portion}, {first rear view portion, sky view portion}, {first rear view portion, ground view portion}, {first rear view portion, second rear view portion}, {first rear view portion, second rear view portion, sky view portion}, {first rear view portion, second rear view portion, ground view portion}, {second rear view portion, sky view portion}, and {second rear view portion, ground view portion}.

Operation proceeds from step 2060 to step 2062. In step 2062 the content playback system determines whether or not the following two conditions are satisfied: (i) the determined set of view portions from step 2060 includes only the first view portion and (ii) there are no portions of the current field of view outside of the first view portion. If the determination is that the determined set only includes the first view portion and there are not portions of the current field of view outside the first view portion, then, operation proceeds from step 2062 to step 2064; otherwise, operation proceeds from step 2062 to step 2066.

In step 2064 the content playback system generates one or more output images corresponding to the current field of view based on received content from the first content stream.

In step 2066 the content playback system determines if there are any portion of said current field of view for which an image is not available. If the content playback system determines that there is at least one portion of the current field of view for which an image is not available, then operation proceeds from step 2066 to step 2076; otherwise, operation proceeds from step 2066 to step 2068.

In step 2068 the content playback system generates one or more output images corresponding to the current field of view based on the determined set of view portion to be used in generating the one or more output images. Step 2068 may, and sometimes does, include step 2070 in which the content playback system generates one or more output images corresponding to the current field of view based on at least some received content included in the first content stream and stored content corresponding to a second portion of said environment. In some embodiments, step 2070 includes one or both of steps 2072 and 2074. In step 2072 the content playback system selects an image corresponding to a second portion view of the environment based on the received image selection information. Operation proceeds from step 2072 to step 2074. In step 2074 the content playback system combines content obtained from said first content stream captured at a second point in time with a first image corresponding to said first point in time, said first and second point in time being different.

In some embodiments, the first image is a first image of a second portion of the environment, and the second portion is one of a first rear view portion of the environment and a second rear view portion or the environment. In some such embodiments, the first point in time corresponds to a time preceding the second point in time. In some such embodiments, the first point in time precedes the time of a live event during which images in the first content stream are captured.

Returning to step 2076, step 2076 is performed for each portion for which an image is not available. In step 2076 the content playback system synthesizes an image for a portion of said current field of view for which an image is not available. Operation proceeds from step 2076 to step 2078. In step 2078 the content playback system generates one or more output images corresponding to the current field of view based on the determined set of view portion of the environment to be used in generating the one or more output images and/or one or more synthesized images. Output images generated by step 2078 may include: a fully synthesized image; an image including content from a synthesized image and content from the first content stream; an image including content from a synthesized image, content from the first content stream, and content from a stored image; and an image including content from a synthesized image and content from a stored image. In various embodiments, step 2078 may, and sometimes does, include one or both of steps 2080 and 2082.

In step 2080 the content playback system generates one or more output images corresponding to the current field of view based on at least some received content included in the first content stream and a synthetic image simulating a portion, e.g., a second portion, of the environment. In step 2082 the content playback device combines a synthesized image with at least a portion of a received image to generate an image corresponding to the current field of view.

It should be appreciated that the current field of view may, and generally does, change over time. In response to changes in the current field of view different sets of view portions, which are to be used to generate an output image, may be determined in step 2060, different images may be needed to be and are synthesized in step 2076, e.g., corresponding to different portion of the field of view for which there is no image. In addition, at different times based on the received control information different stored images may be identified to be used in generating a combined output image at different times.

Operation proceeds from step 2058, via connecting node E 2084, to step 2086 in which the content playback system outputs and/or displays the generated one or more output images. Step 2086 includes step 2088 in which the content playback system outputs and/or displays a first output image, said first output image being one of the one or more generated output images.

In some embodiments, a generated output image, e.g., generated in step 2070, corresponding to a current field of view, may, and sometimes does includes information from a first portion of the environment, a second portion of the environment, and a third portion of the environment. In some embodiments, the first portion of the environment, which corresponds to the first content stream, is a front view portion, a second portion of the environment is one of a first rear view portion, e.g., a right rear view portion, and a second rear view portion, e.g., a left rear view portion, of the environment, and the third portion of the environment is one of a sky view portion and a ground view portion of the environment. In some such embodiments, content corresponding to said first portion includes real time content captured and streamed to said playback system while and event was ongoing, and content corresponding to said second and third portions are non-real time images.

In various embodiments, the combining of content to generate an output image corresponding to a current field of view includes performing filtering, blurring, luminance variations, and/or color variations in one or more boundary areas, e.g., in a boundary area between any two of: a image obtained from a first content stream, corresponding to a front view portion of the environment, a stored image corresponding to a first rear view portion of the environment, a stored image corresponding to a second rear view portion of the environment, a stored image corresponding to a sky view portion of the environment, a stored image corresponding to a ground view portion of the environment, and a synthesized image corresponding to an area in the current field of view for which there is not an image.

In some embodiments, there are some portions of an environment which are not covered by the first, e.g., front view portion, corresponding to the first content stream, and one or more additional portions for which received images are stored. In various embodiments, for those uncovered portions of the environment, an image is synthesized. For example, in one embodiment, there may be no stored image corresponding to the sky view portion, and an image is synthesized when the current field of view includes a portion of the sky view. In another example, there may be a dead spot, e.g., an uncovered region, between the first rear view portion and the second rear view portion. In some embodiments, synthesizing an image includes repeating a portion of an image, e.g., a portion of a stored image or a portion of an image obtained from the received first content stream, corresponding to an adjacent area in the environment.

In some embodiments, the first image content received in step 2034 is stereoscopic image content including a left eye image and a right eye image, e.g., pairs of left and right eyes images are received. In some such embodiments, the images received and stored corresponding to the first rear view portion, the second rear view portion, sky view portion and the ground view portion include left eye images and right eye images, e.g., in pairs. Thus, when generating one or more output images corresponding to a current field of view, e.g., in step 2070, left eye images from the first content stream corresponding to the first view portion, e.g. front view portion, are combined with stored left eye images corresponding to one or more other portions of the environment, and right eye images from the first content stream corresponding to the first view portion, e.g. front view portion, are combined with stored right images corresponding to one or more other portions of the environment.

In some other embodiments, the images received and stored corresponding to the first rear view portion, the second rear view portion, sky view portion, and the ground view portions include one of a left eye image or right eye image from an original pair of images or include a single (mono) image, e.g., from a single camera acting alone to capture a view portion. Thus, in such an embodiment, when generating one or more output image corresponding to a current field of view, e.g., in step 2070, a left eye image from the first content stream and a corresponding right eye image from the first content stream, e.g., corresponding the front view portion, are both combined with same stored image from another view portion.

In still another embodiments, some of the stored images include both left and right eye image pairs, while others include single stored images. For example, received stored received images corresponding to a first rear view portion may include pairs of left and right eye images, while stored received images corresponding to a sky view portion may include single images, e.g., mono images, rather than pairs.

In some embodiments, a first portion of an environment, e.g., corresponding to the received first content stream, is a front view portion, a second portion of an environment is a rear view portion, e.g., a first rear view portion corresponding to the viewer's right rear, or a second rear view portion corresponding to the viewer's left rear, and a third portion of an environment is a sky view portion or a ground view portion. In some such embodiments, images are received at different rates corresponding to first, second, and third portions, more images being received for an event corresponding to said first portion than for said second portion. In some such embodiments, more images are received corresponding to said second portion than for said third portion.

An exemplary method of operating a content playback system, in accordance with some embodiments, includes: determining a head position of a viewer, said head position corresponding to a current field of view; receiving a first content steam providing content corresponding to a first portion of an environment; generating one or more output images corresponding to the current field of view based on at least some received content included in said first content stream and i) stored content corresponding to a second portion of said environment or ii) a synthetic image simulating a second portion of said environment; and outputting or displaying a first output image, said first output image being one of the one or more generated output images. In some embodiments, the content playback system is a content playback device. In some embodiments, the content playback system is a computer system coupled to a display.

In various embodiments, the method further includes: receiving a first image corresponding to said second portion of said environment; and storing said first image corresponding to said second portion of said environment.

In some embodiments, said first image of said second portion of said environment corresponds to a first point in time; and generating one or more output images corresponding to the current field of view includes combining content obtained from said first content stream captured at a second point in time with said first image corresponding to said first point in time, said first and second points in time being different. In some such embodiments, said first point in time corresponds to a time preceding said second point in time. In some such embodiments, said first point in time precedes the time of a live event during which images included in said first content stream are captured.

In various embodiments, the method further includes receiving one or more additional images corresponding said second portion of said environment, said one or more additional images corresponding said second portion of said environment including at least a second image.

In some embodiments, the method includes receiving control information indicating which of a plurality of previously communicated images corresponding to said second portion of said environment should be displayed during a playback time as measured with respect to playback times indicated in said first content stream.

In some embodiments, the second portion of said environment is one of a first rear view portion, a second rear view portion, a sky view portion or a ground view portion. In some such embodiments, the method further includes: receiving one or more images corresponding to a third portion of said environment.

In various embodiments, said first portion of said environment is a front view portion; said third portion is one of a sky view or ground view portion; and images are received at different rates corresponding to said first, second and third portions, more images being received for an event corresponding to said first portion than for said second portion.

In various embodiments, said content corresponding to said first portion includes real time content captured and streamed to said playback device while an event was ongoing; and content corresponding to said images corresponding to said second and third portions are non-real time images. In some such embodiments, receiving image selection information indicating which of a plurality of images corresponding to said second portion of the environment should be used during a portion of said event; and generating one or more output images corresponding to the current field of view based on at least some received content includes selecting an image corresponding to said second portion of the environment based on the received image selection information.

In various embodiments, the exemplary method includes determining that an image is not available for a portion of said current field of view; synthesizing an image to be used for said portion of said current field of view for which an image is not available; and combining the synthesized image with at least a portion of a received image to generate an image corresponding to the current field of view.

In various embodiments, said first image content is stereoscopic image content including a left eye image and a right eye image.

Figure 21:
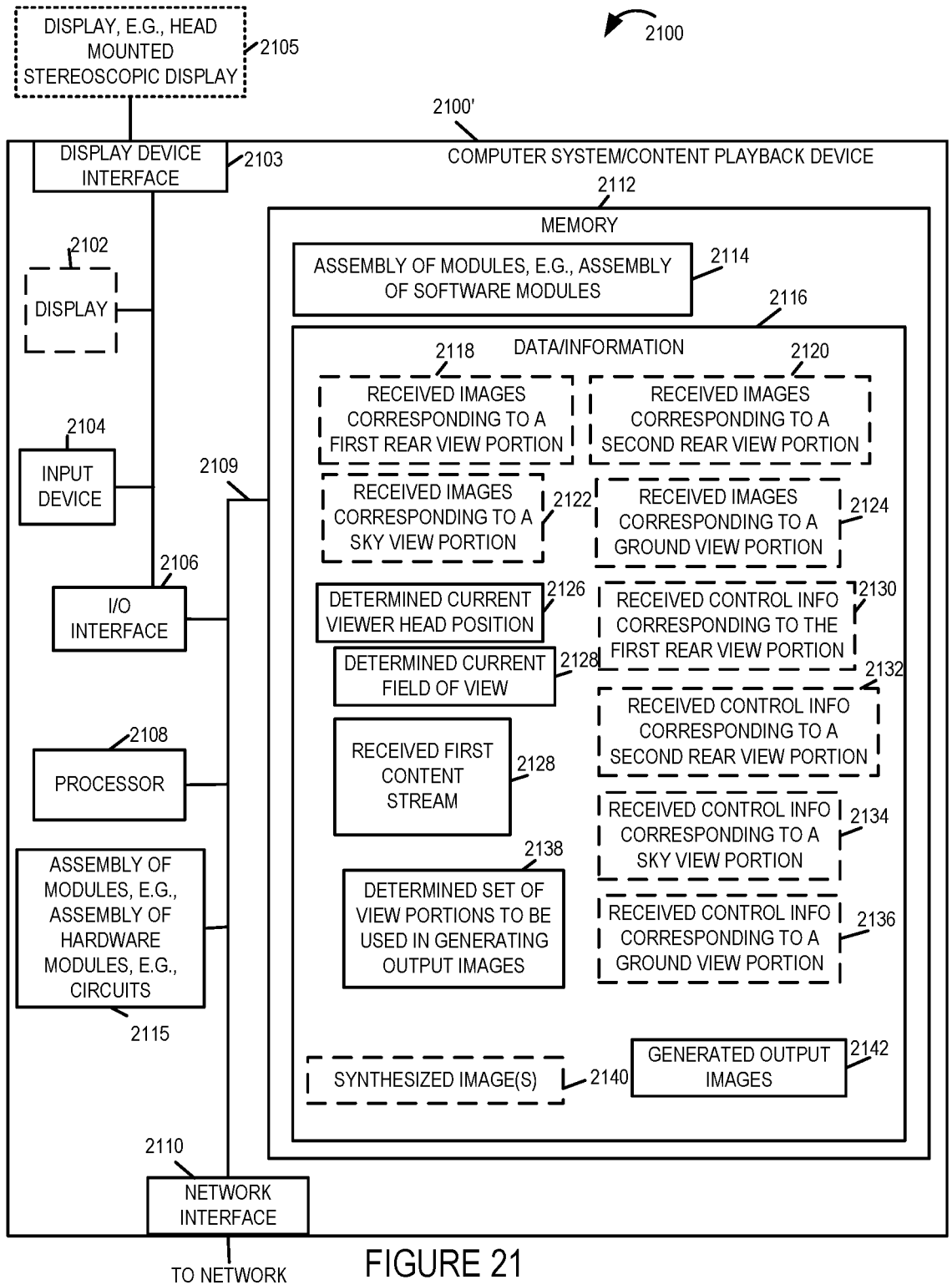
FIG. 21 is a drawing of an exemplary content playback system, e.g., a content playback device or a computer system coupled to a display, in accordance with an exemplary embodiment.

FIG. 21 illustrates an exemplary content playback system 2100 implemented in accordance with the present invention which can be used to receive, decode, store, process, and display imaging content received from a content delivery system such as the one shown in FIGS. 1 and 7. The system 2100 can be implemented as a single playback device 2100' which includes a display 2102 or as a combination of elements such as an external display, e.g., a head mounted display 2105, coupled to a computer system 2100'.

The content playback system 2100, in at least some embodiments includes a 3D head mounted display. The head mounted display maybe implemented using the OCULUS RIFT' VR (virtual reality) headset which may include the head mounted display 2105. In various embodiments head mounted display 2105 is the same as head mounted display 805. Other head mounted displays may also be used. In some embodiments the head mounted helmet or other head mounting device in which one or more display screens are used to display content to a user's left and right eyes. By displaying different images to the left and right eyes on a single screen with the head mount being configured to expose different portions of the single screen to different eyes, a single display can be used to display left and right eye images which will be perceived separately by the viewers left and right eyes. In some embodiments a cell phone screen is used as the display of the head mounted display device. In at least some such embodiments a cell phone is inserted into the head mounting device and the cell phone is used to display images.

The content playback system 2100 has the ability to decode received encoded image data, e.g., left and right eye images and/or mono (single images) corresponding to different portions of an environment or scene and generate 3D image content for display to the customer, e.g., by rendering and displaying different left and right eye views which are perceived by the user as a 3D image. The content playback system 2100 in some embodiments is located at a customer premise location such as a home or office but may be located at an image capture site as well. The content playback system 2100 can perform signal reception, decoding, processing, generation, display and/or other operations in accordance with the invention.

The system 2100 includes a display 2102, a display device interface 2103, input device 2104, input/output (I/O) interface 2106, a processor 2108, network interface 2110, and a memory 2112. The memory 2112 includes an assembly of modules 2114, e.g., an assembly of software modules, and data/information 2116. In some embodiments, system 2100 includes an assembly of modules 2115, e.g., an assembly of hardware modules, e.g., circuits. The various components of the system 2100 are coupled together via bus 2109 which allows for data to be communicated between the components of the system 2100 and/or by other connections or through a wireless interface. While in some embodiments display 2102 is included as an optional element as illustrated using the dashed box, in some embodiments an external display device 2105, e.g., a head mounted stereoscopic display device, can be coupled to the playback device via the display device interface 2103.

For example, in a case where a cell phone processor is used as the processor 2108 and the cell phone generates and displays images in a head mount, the system may include as part of the head mount device the processor 2108, display 2102 and memory 2112. The processor 2108, display 2102 and memory 2112 may all be part of the cell phone. In other embodiments of the system 2100, the processor 2108 may be part of a gaming system such as an XBOX or PS4 with the display 2105 being mounted in a head mounting device and coupled to the gaming system. Whether or not the processor 2108 and/or memory 2112 are located in a device, which is worn on the head, is not critical and, as can be appreciated, while in some cases it may be convenient to co-locate the processor 2108 in the headgear, from a power, heat and weight perspective it can be desirable to, in at least some cases, have the processor 2108 and memory 2112 coupled to the head gear which includes the display.

While various embodiments contemplate a head mounted display 2105 or 2102, the method and apparatus can also be used with non-head mounted displays which can support 3D image. Accordingly, while in many embodiments the system 2100 includes a head mounted display, it can also be implemented with a non-head mounted display.

The memory 2112 includes various modules, e.g., routines, which when executed by the processor 2108 control the content playback system 2100 to perform operations in accordance with the invention. Memory 2112 includes assembly of modules 2114, e.g., an assembly of software modules, and data/information 2116.

Data information 2116 includes one or more of all of: received images corresponding to a first rear view portion 2118, received images corresponding to a second rear view portion 2120, received images corresponding to a sky view portion 2122, and received images corresponding to a ground view portion 2124. Exemplary received images corresponding to a rear view portion 2118 or 2120 include, e.g., an image of an audience or crowd standing, an image of audience or crowd sitting, images with different visible advertising, images of a crowd cheering, etc. Exemplary received images corresponding to a sky view include, e.g., a clear sky, different cloud patterns, different degrees of darkness corresponding to different times, etc. Data information 2116 further includes one or more or all of: received control information corresponding to a first rear view portion 2130, received control information corresponding to a second rear view portion 2132, received control information corresponding to a sky view portion 2134, and received control information corresponding to a ground view portion 2136. Data information 2116 further includes a determined current viewer head position 2126, a determined current field of view 2128, a received first content stream 2128, e.g., including pairs of a right eye image and a left eye image corresponding to a front view portion, a determined set of view portions to be used in generating output images 2138, e.g., corresponding to a current field of view for which there is at least some received content available to combine, synthesized image(s) 2140, and generated output images 2142. Generated output images 2142. Generated output images may, and sometimes do, include a generated output image including combined image content from the first content stream, e.g., corresponding to a first, e.g., forward view portion, and including a portion of a received stored image, e.g., from a rear view portion, a sky portion, or a ground portion, and/or including a synthesized image or a portion of synthesized image.

Figure 22:
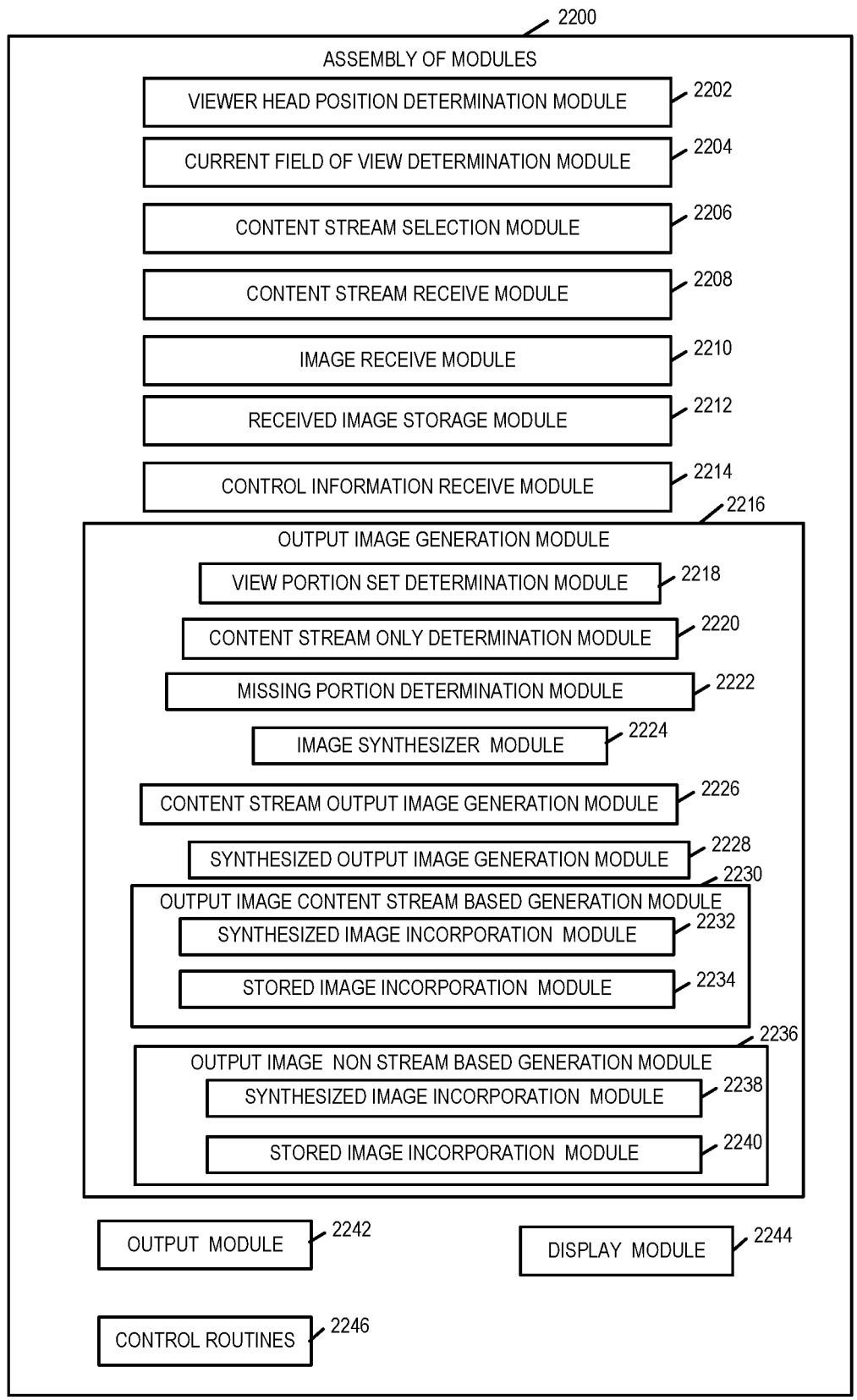
FIG. 22 is a drawing of an exemplary assembly of modules which may be included in the exemplary content playback system of FIG. 21.

FIG. 22 is a drawing of an assembly of modules 2200 which may be included in an exemplary content playback system 2100 of FIG. 21 or system 800 of FIG. 8 in accordance with an exemplary embodiment. The modules in the assembly of modules 2200 can, and in some embodiments are, implemented fully in hardware within the processor 2108, e.g., as individual circuits. The modules in the assembly of modules 2200 can, and in some embodiments are, implemented fully in hardware within the assembly of modules 2115, e.g., as individual circuits corresponding to the different modules. In other embodiments some of the modules are implemented, e.g., as circuits, within the processor 2108 with other modules being implemented, e.g., as circuits within assembly of modules 2115, external to and coupled to the processor 2108. As should be appreciated the level of integration of modules on the processor and/or with some modules being external to the processor may be one of design choice.

Alternatively, rather than being implemented as circuits, all or some of the modules may be implemented in software and stored in the memory 2112 of the system 2100, with the modules controlling operation of system 2100 to implement the functions corresponding to the modules when the modules are executed by a processor, e.g., processor 2108. In some such embodiments, the assembly of modules 2200 is included in the memory 2112 as assembly of modules 2114. In still other embodiments, various modules in assembly of modules 2200 are implemented as a combination of hardware and software, e.g., with another circuit external to the processor providing input to the processor 2108 which then under software control operates to perform a portion of a module's function. While shown in the FIG. 21 embodiment as a single processor, e.g., computer, it should be appreciated that the processor 2108 may be implemented as one or more processors, e.g., computers.

When implemented in software the modules include code, which when executed by the processor 2108, configure the processor 2108 to implement the function corresponding to the module. In embodiments where the assembly of modules 2200 is stored in the memory 2112, the memory 2112 is a computer program product comprising a computer readable medium comprising code, e.g., individual code for each module, for causing at least one computer, e.g., processor 2108, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 22 control and/or configure the system 2100 or elements therein such as the processor 2108, to perform the functions of corresponding steps illustrated and/or described in the method of flowchart 2000 of FIG. 20. Thus the assembly of modules 2200 includes various modules that perform functions corresponding to one or more steps of FIG. 20.

Assembly of modules 2200 includes a viewer head position determination module 2202, a current field of view determination module 2204, a content stream selection module 2206, a content stream receive module 2208, an image receive module 2210, a received image storage module 2212, a control information receive module 2214, an output image generation module 2216, an output module 2242, a display module 2244, and control routines 2246.

Viewer head position determination module 2202 is configured to determine a head position of a viewer, said head position corresponding to a current field of view. Current field of view determination module 2204 is configured to determine a current field of view for said viewer based on said determined head position.

Content stream selection module 2206 is configured to select a content stream, e.g., from among a plurality of alternative content streams based on user, e.g., viewer, input. Different content streams may correspond to different events. In various embodiments, different content streams corresponding to the same event correspond to different cameras which point in different directions, e.g. to provide the viewer with alternative front view perspectives. In some embodiment, at least some of the image streams, which may be selected, include stereoscopic image content including left eye image and right eye image pairs.

Content stream receive module 2208 is configured to receive a first content stream providing content corresponding to a first portion, e.g., a forward portion view, of an environment. In various embodiments first image content, received in the first content stream, is stereoscopic image content including pairs of a left eye image and a right eye image.

Image receive module 2210 is configured to receive images corresponding to one or more different view portions, e.g., a first rear view portion, a second rear view portion, a sky view portion, and a ground view portion. Image receive module 2210 is configured to receive a first image corresponding to a second portion of said environment. In some such embodiments, image receive module is further configured to receive one or more additional images corresponding to said second portion of the environment, said one or more additional images corresponding to said second portion of the environment including at least a second image. In some embodiments, the second portion of said environment is one of a first rear view portion, a second rear view portion, a sky view portion or a ground view portion. In some embodiments, the second portion of said environment is one of a first rear view portion or a second rear view portion. In some embodiments, the image receive module 2210 is configured to receive one or more images corresponding to a third portion of said environment. In some embodiments, the first portion of the environment is a front view portion and the third portion of the environment is one of a sky view or ground view portion.

In some embodiments, image receive module 2210 is configured to receive a first image corresponding to a first rear view portion of said environment and is further configured to receive one or more additional images corresponding to said first rear view portion of said environment, said one or more additional images corresponding to said first rearview portion including at least a second image corresponding to said first rear view portion. In some embodiments, image receive module 2210 is configured to receive a first image corresponding to a second rear view portion of said environment and is further configured to receive one or more additional images corresponding to said second rear view portion of said environment, said one or more additional images corresponding to said second rearview portion including at least a second image corresponding to said second rear view portion. In some embodiments, image receive module 2210 is configured to receive one or more images corresponding to a sky view portion of said environment. In some embodiments, image receive module 2210 is configured to receive one or more images corresponding to a ground view portion of said environment.

Received image storage module 2212 is configured to store images received by image receive module 2212. Received image storage module 2212 is configured to store a first image corresponding to said second portion of the environment. Received image storage module 2212 is configured to store one or more additional images corresponding to a second portion of the environment. Received image storage module 2212 is configured to store received one or more images corresponding to a third portion of said environment. In various embodiments, received image storage module 2212 is configured to store a first image corresponding to said first rear view portion of said environment, and one or more additional images corresponding to said first rear view portion of said environment. In various embodiments, received image storage module 2212 is configured to store a first image corresponding to said second rear view portion of said environment, and one or more additional images corresponding to said second rear view portion of said environment. In some embodiments, received image storage module 2212 is configured to stored one or more images corresponding to said sky view portion of said environment. In some embodiments, received image storage module 2212 is configured to stored one or more images corresponding to said ground view portion of said environment.

Control information receive module 2214 is configured to receive control information indicating which of a plurality of previously communicated images corresponding to a second portion of said environment should be displayed during a playback time as measured with respect to playback times indicated in the first content stream. In various embodiments, control information receive module 2214 is further configured to receive control information indicating which of a plurality of previously communicated mages corresponding to a third portion of said environment should be displayed during playback time as measured with respect to playback times indicated in the first content stream. In some embodiments, control information receive module 2214 is configured to receive image selection information indicating which of a plurality of images corresponding to a second portion of the environment should be used during a portion of an event. In some embodiments, control information receive module 2214 is configured to receive image selection information indicating which of a plurality of images corresponding to a third portion of the environment should be used during a portion of an event.

In some embodiments, control information receive module 2214 is configured to receive control information indicating which of a plurality of previously communicated images corresponding to said first rear view portion of said environment should be displayed during a playback time as measured with respect to playback time in said first content stream. In some embodiments, control information receive module 2214 is configured to receive image selection information indicating which of a plurality of images corresponding to said first rear view portion of the environment should be used during a portion of an event. In some embodiments, control information receive module 2214 is configured to receive control information indicating which of a plurality of previously communicated images corresponding to said second rear view portion of said environment should be displayed during a playback time as measured with respect to playback time in said first content stream. In some embodiments, control information receive module 2214 is configured to receive image selection information indicating which of a plurality of images corresponding to said second rear view portion of the environment should be used during a portion of an event.

In some embodiments, control information receive module 2214 is configured to receive control information indicating which of a plurality of previously communicated images corresponding to said sky view portion of said environment should be displayed during a playback time as measured with respect to playback time in said first content stream. In some embodiments, control information receive module 2214 is configured to receive image selection information indicating which of a plurality of images corresponding to said sky view portion of the environment should be used during a portion of an event. In some embodiments, control information receive module 2214 is configured to receive control information indicating which of a plurality of previously communicated images corresponding to said ground view portion of said environment should be displayed during a playback time as measured with respect to playback time in said first content stream. In some embodiments, control information receive module 2214 is configured to receive image selection information indicating which of a plurality of images corresponding to said ground view portion of the environment should be used during a portion of an event.

Output image generation module 2216 is configured to generate one or more output images corresponding to the current field of view based on at least one of: received content from the first content stream corresponding to the first portion view of the environment, a stored received image corresponding to a first rear view portion of the environment, a stored received image corresponding to a second rear view portion of the environment, a stored received image corresponding to a sky view portion of the environment, a stored received image corresponding to a ground view portion of the environment, or a synthesized image corresponding to a portion of the current field of view for which an image is not available. Output image generation module 2216 includes a view portion set determination module 2218, a content stream only determination module 2220, a missing portion determination module 2222, an image synthesizer module 2224, a content stream output image generation module 2226. A synthesized output image generation module 2228, an output image content stream based generation module 2230, and an output image non stream based generation module 2236.

View portion set determination module 2218 is configured to determine, based on the current field of view, a set of view portions, e.g. for which there is at least some image content available, of said environment to be used in generating the one or more output images. Some exemplary determined sets include, e.g., { }, {front view portion}, {first rear view portion}, {second rear view portion}, {sky view portion}, {ground view portion}, {front view portion, sky view portion}, {front view portion, ground view portion}, {front view portion, first rear view portion}, {front view portion, second rear view portion}, {front view portion, first rear view portion, sky portion}, {front view portion, second rear view portion, sky view portion}, {front view portion, first rear view portion, ground view portion}, {front view portion, second rear view portion, ground view portion}, {first rear view portion, sky view portion}, {first rear view portion, ground view portion}, {first rear view portion, second rear view portion}, {first rear view portion, second rear view portion, sky view portion}, {first rear view portion, second rear view portion, ground view portion}, {second rear view portion, sky view portion}, and {second rear view portion, ground view portion}.

Content stream only determination module 2220 is configured to determine if one or more output images are to be generated based on the content in the first content stream without having to rely on stored received images from other portion views, e.g., first rear view portion, second rear view portion, sky view portion or ground view portion, or a synthesized image. Content stream only determination module 2220 is configured to check if the determined set includes a single element which is the first, e.g., front, view portion corresponding to the first content stream, and to check if the field of view is within the first, e.g., front view portion.

Missing portion determination module 2222 is configured to determine that an image is not available for a portion of the current field of view, e.g., an image is not available either from the first content stream, corresponding to the front view of the environment or from a received stored image corresponding to another portion of the environment. Image synthesizer module 2224 is configured to synthesize an image to be used for said portion of the current field of view for which an image is not available. In various embodiments, the image synthesize module 2224 generates an synthesized image slightly larger than needed to fill the missing portion, e.g. to allow for some overall on boundaries.

Content stream output image generation module 2226 is configured to generate one or more output images corresponding to the current field of view based only on received content from the first content stream when the determined set only includes the first view portion, e.g., front view portion, and there are no portions of the current field of view outside the first view portion, e.g., as determined by content stream only determination module 2220. In some embodiments, content stream output image generation module 2226 performs a cropping operation on an image obtained from the first content stream.

Output image content stream based generation module 2230 is configured to generate one or more output images corresponding to the current field of view based on at least some received content included in the first content stream, e.g., the content stream corresponding to a front view, and i) stored content corresponding to a second portion of the environment, e.g., a stored image corresponding to a first rear view, a second rear view, a sky view or aground view, or ii) a synthetic image simulating a second portion of the environment, e.g., a synthetic image simulating a portion of the field of view for which an image is not available. The stored content corresponding to a second portion of the environment is, e.g., a stored image which was stored by received image storage module 2212. The synthetic image is, e.g., an image generated by module 2224. In some embodiments, output image content stream based generation module 2230 is configured select an image corresponding to said second portion of the environment based on the received image selection information, as part of being configured to generate one or more output images corresponding to the current field of view.

Output image content stream based generation module 2230 includes a synthesized image incorporation module 2232 configured to incorporate one or more synthesized image into a output image which is being generated. Synthesized image incorporation module 2232 is configured to combine a synthesized image with at least a portion of a received image, e.g., a received image from the first, e.g., front view portion, obtained from the received first content stream, or a stored received image corresponding to one of the first rear view portion, second rear view portion, sky view portion or ground view portion, to generate an image corresponding to the current field of view. Stored imaged incorporation module 2134 is configured to incorporate a portion of one or more stored images into a output image which is being generated. As part of generating an output image, module 2230, module 2232 and/or module 2234 performs blending at the boundaries areas. In various embodiments, the blending includes filtering, blurring, luminance variations, and/or color variations.

Output image non stream based generation module 2236 is configured to generate one or more output images corresponding to the current field of view based on at least one of: i) stored content corresponding to a portion of the environment, e.g., a stored image corresponding to a first rear view, a second rear view, a sky view or a ground view, or ii) a synthetic image simulating a portion of the environment, e.g., a synthetic image simulating a portion of the field of view for which an image is not available. Module 2236 generates one or more images when the current field of view is outside the area corresponding to the first, e.g., front view, portion corresponding to the first content stream. In some embodiments, output image non content stream based generation module 2236 is configured select an image corresponding to said second portion of the environment based on the received image selection information, as part of being configured to generate one or more output images corresponding to the current field of view.

Output image non stream based generation module 2236 includes a synthesized image incorporation module 2238 configured to incorporate one or more synthesized images into a output image which is being generated. Synthesized image incorporation module 2238 is configured to combine a synthesized image with at least a portion of a received image, e.g., a received image from a first rear view portion, a second rear view portion, a sky view portion, or a ground view portion, to generate an image corresponding to the current field of view. Stored imaged incorporation module 2240 is configured to incorporate a portion of one or more stored images into a output image which is being generated. As part of generating an output image, module 2236, module 2232 and/or module 2234 performs blending at the boundaries areas. In various embodiments, the blending includes filtering, blurring, luminance variations, and/or color variations.

Output module 2242 is configured to output one or more generated output images, e.g., generated by output image content stream based generation module 2130, content stream output image generation module 2130, and output image non-content stream based generation module 2236, said one or more output images including a first output image. Output module is configured to output the first output image, e.g., via network interface 2110 and/or display device interface 2103.

Display module 2244 is configured to display one or more generated output images, e.g., generated by output image content stream based generation module 2230, content stream output image generation module 2230, and output image non-content stream based generation module 2136, said one or more output images including a first output image. Display module 2244 is configured to display the first output image, e.g., via display 2102 and/or display 2105.

The control routines 2246 include device control routines and communications routines to control the operation of the system 2100.

An exemplary content playback system, e.g., system 2100 of FIG. 21, in accordance with some embodiment, comprises: a viewer head position determination module 2202 configured to determine a head position of a viewer, said head position corresponding to a current field of view; a content stream receive module configured to receive a first content steam providing content corresponding to a first portion of an environment; an output image content stream based generation module 2230 configured to generate one or more output images corresponding to the current field of view based on at least some received content included in said first content stream and i) stored content corresponding to a second portion of said environment or ii) a synthetic image simulating a second portion of said environment; and at least one of: an output module 2242 configured to output a first output image or a display module 2244 configured to display a first output image, said first output image being one of the one or more generated output images.

In some embodiments, said content playback system 2100 is a content playback device 2100'. In some embodiments, said content playback system 2100 is a computer system 2100' coupled to a display 2105.

In some embodiments, the system further comprising: a image receive module 2210 configured to receive a first image corresponding to said second portion of said environment; and a received image storage module 2212 configured to store said first image corresponding to said second portion of said environment.

In various embodiments, said first image of said second portion of said environment corresponds to a first point in time; and said output image content stream based generation module 2230 is configured to combine content obtained from said first content stream captured at a second point in time with said first image corresponding to said first point in time, said first and second points in time being different. In some such embodiments, said first point in time corresponds to a time preceding said second point in time. In various embodiments, said first point in time precedes the time of a live event during which images included in said first content stream are captured.

In some embodiments, said image receive module 2210 is further configured to receive one or more additional images corresponding said second portion of said environment, said one or more additional images corresponding said second portion of said environment including at least a second image.

In various embodiments, the system further comprises: a control information receive module 2214 configured to receive control information indicating which of a plurality of previously communicated images corresponding to said second portion of said environment should be displayed during a playback time as measured with respect to playback times indicated in said first content stream.

In some embodiments, said second portion of said environment is one of a first rear view portion, a second rear view portion, a sky view portion or a ground view portion. In some such embodiments, said image receive module 2210 is further configured to receive one or more images corresponding to a third portion of said environment.

In some embodiments, said first portion of said environment is a front view portion; said third portion is one of a sky view or ground view portion; and images are received at different rates corresponding to said first, second and third portions, more images being received for an event corresponding to said first portion than for said second portion.

In some embodiments, said content corresponding to said first portion includes real time content captured and streamed to said playback device while an event was ongoing; and said content corresponding to said images corresponding to said second and third portions are non-real time images. In some such embodiments, said control information receive module 2214 is further configured to receive image selection information indicating which of a plurality of images corresponding to said second portion of the environment should be used during a portion of said event; and said output image content stream based generation module 2230 is configured to select an image corresponding to said second portion of the environment based on the received image selection information, as part of being configured to generate one or more output images corresponding to the current field of view.

In various embodiments, the system further comprises a missing portion determination module 2222 configure to determine that an image is not available for a portion of said field of view; an image synthesizer module 2224 configured to synthesize an image to be used for said portion of said field of view for which an image is not available; and a synthesized image incorporation module 2232 configured to combine the synthesized image with at least a portion of a received image to generate an image corresponding to the current field of view.

In various embodiments, said first image content is stereoscopic image content including a left eye image and a right eye image.

In some embodiments, the assembly of modules 2200 is included in content playback system 800 of FIG. 8, e.g., in addition to the other modules shown in FIG. 8. Modules in assembly of modules 2200 may be included in memory 812, in processor 808, and/or as hardware modules external to processor 808, coupled to bus 809, within system 800.

FIG. 23 is a drawing 2300 showing the exemplary stream selection module 1938 which can be used in the playback system 1900 in accordance with some embodiments.

FIG. 24 is a drawing 2400 showing the exemplary stream prioritization module 2306 which can be implemented as part of the stream selection module of FIG. 23 or as an individual module.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed:

1. A method of operating a content delivery system, comprising:
   identifying a plurality of content streams each captured from a different camera of a plurality of cameras each having a different viewing direction, wherein the plurality of cameras are located at a single camera position, such that each content stream comprises a unique portion of the environment from the camera position;
   obtaining, from a playback system including a head mounted display, a selection of one or more particular content streams from the plurality of content streams, wherein the playback system performs the selection based on a viewing direction of a user of the head mounted display; and
   transmitting the one or more particular content streams to the playback system in accordance with the selection;
   wherein content included in at least one of the one or more particular content streams is configured for playback.

2. The method of claim 1, wherein the selection of the one or more particular content streams comprises prioritized content streams based on the viewing direction of the user.

3. The method of claim 2, wherein the prioritized content streams comprise viewing directions within a scene corresponding to a current field of view of the user based on a size of portions of the field of view that each content stream provides.

4. The method of claim 1, further comprising:
   controlling streaming of image content, the image content comprising a plurality of portions of a stereoscopic scene.

5. The method of claim 4, further comprising:
   transmitting the one or more particular content streams to the playback system periodically in accordance with a time interval.

6. The method of claim 5, further comprising:
   receiving a request for imaging content from the playback system, the request for imaging content comprising identification information corresponding to the playback system.

7. The method of claim 6, wherein the request for imaging content further comprises an indication for at least one data rate supported by the playback system and information indicating a current viewing direction of the user.

8. The method of claim 1, further comprising:
   transmitting information regarding the plurality of content streams as part of a program guide.

9. A content delivery system, comprising:
   a transmitter for transmitting content streams; and
   a processor configured to:
   identify a plurality of content streams each captured from a different camera of a plurality of cameras each having a different viewing direction, wherein the plurality of cameras are located at a single camera position, such that each content stream comprises a unique portion of the environment from the camera position;
   obtain, from a playback system including a head mounted display, a selection of one or more particular content streams from the plurality of content streams, wherein the playback system performs the selection based on a viewing direction of a user of the head mounted display; and
   transmit the one or more particular content streams to the playback system in accordance with the selection;
   wherein content included in at least one of the one or more particular content streams is configured for playback.

10. The content delivery system of claim 9, wherein the selection of the one or more particular content streams comprises prioritized content streams based on the viewing direction of the user.

11. The content delivery system of claim 10, wherein the prioritized content streams comprise viewing directions within a scene corresponding to a current field of view of the user based on a size of portions of the field of view that each content stream provides.

12. The content delivery system of claim 9, wherein the processor is further configured to:
   control streaming of image content, the image content comprising a plurality of portions of a stereoscopic scene.

13. The content delivery system of claim 12, wherein the transmitter is further configured to:
   transmit the one or more particular content streams to the playback system periodically in accordance with a time interval.

14. The content delivery system of claim 13, further comprising:
   a receiver that receives a request for imaging content from the playback system, the request for imaging content comprising identification information corresponding to the playback system.

15. The content delivery system of claim 14, wherein the request for imaging content further comprises an indication for at least one data rate supported by the playback system and information indicating a current viewing direction of the user.

16. The content delivery system of claim 9, wherein the transmitter is further configured to:
   transmit information regarding the plurality of content streams as part of a program guide.

* * * * *